United States Patent
Zhao et al.

(10) Patent No.: US 10,306,229 B2
(45) Date of Patent: May 28, 2019

(54) ENHANCED MULTIPLE TRANSFORMS FOR PREDICTION RESIDUAL

(71) Applicant: QUALCOMM Incorporated, San Diego, CA (US)

(72) Inventors: Xin Zhao, San Diego, CA (US); Sungwon Lee, San Diego, CA (US); Jianle Chen, San Diego, CA (US); Li Zhang, San Diego, CA (US); Xiang Li, San Diego, CA (US); Ying Chen, San Diego, CA (US); Marta Karczewicz, San Diego, CA (US); Hongbin Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 15/005,736

(22) Filed: Jan. 25, 2016

(65) Prior Publication Data
US 2016/0219290 A1    Jul. 28, 2016

Related U.S. Application Data

(60) Provisional application No. 62/107,996, filed on Jan. 26, 2015, provisional application No. 62/137,038, filed on Mar. 23, 2015.

(51) Int. Cl.
*H04N 19/12* (2014.01)
*H04N 19/60* (2014.01)
(Continued)

(52) U.S. Cl.
CPC ......... *H04N 19/129* (2014.11); *H04N 19/103* (2014.11); *H04N 19/109* (2014.11);
(Continued)

(58) Field of Classification Search
CPC ...... H04N 19/12; H04N 19/122; H04N 19/60; H04N 19/103; H04N 19/109;
(Continued)

(56) References Cited

U.S. PATENT DOCUMENTS

| 4,894,713 A | 1/1990 | Delogne et al. |
|---|---|---|
| 5,136,371 A | 8/1992 | Savatier et al. |

(Continued)

FOREIGN PATENT DOCUMENTS

| CN | 1289213 A | 3/2001 |
|---|---|---|
| CN | 1662066 | 8/2005 |

(Continued)

OTHER PUBLICATIONS

Amonou et al: "Description of Video coding technology proposal by France Telecom, NTT, NTT DoCoMo, Panasonic and Technicolor", JCT-VC Meeting: Apr. 15-23, 2010; (JointCollaborative Team on Video Coding of ISO/IEC JTC1/SC29/WG11 and ITU-TSG.16); URL: http://wftp3.itu.int/av-arch/jctvc-site/, May 7, 2010, 42 pp.

(Continued)

*Primary Examiner* — David N Werner
(74) *Attorney, Agent, or Firm* — Shumaker & Sieffert, P.A.

(57) ABSTRACT

Example techniques are described to determine transforms to be used during video encoding and video decoding. A video encoder and a video decoder may select transform subsets that each identify one or more candidate transforms. The video encoder and the video decoder may determine transforms from the selected transform subsets.

60 Claims, 9 Drawing Sheets

(51) Int. Cl.
  *H04N 19/70*     (2014.01)
  *H04N 19/103*    (2014.01)
  *H04N 19/109*    (2014.01)
  *H04N 19/112*    (2014.01)
  *H04N 19/122*    (2014.01)
  *H04N 19/129*    (2014.01)
  *H04N 19/136*    (2014.01)
  *H04N 19/157*    (2014.01)
  *H04N 19/159*    (2014.01)
  *H04N 19/167*    (2014.01)
  *H04N 19/176*    (2014.01)

(52) U.S. Cl.
  CPC ........... *H04N 19/112* (2014.11); *H04N 19/12* (2014.11); *H04N 19/122* (2014.11); *H04N 19/136* (2014.11); *H04N 19/157* (2014.11); *H04N 19/159* (2014.11); *H04N 19/167* (2014.11); *H04N 19/176* (2014.11); *H04N 19/60* (2014.11); *H04N 19/70* (2014.11)

(58) Field of Classification Search
  CPC .. H04N 19/112; H04N 19/157; H04N 19/159; H04N 19/129
  See application file for complete search history.

(56) References Cited

U.S. PATENT DOCUMENTS

| | | |
|---|---|---|
| 5,629,779 A | 5/1997 | Jeon |
| 5,684,536 A | 11/1997 | Sugiyama et al. |
| 5,721,822 A | 2/1998 | Agarwal |
| 5,767,909 A | 6/1998 | Jung |
| 5,768,434 A | 6/1998 | Ran |
| 5,815,601 A | 9/1998 | Katata et al. |
| 5,974,181 A | 10/1999 | Prieto |
| 5,995,055 A | 11/1999 | Milroy |
| 6,115,071 A | 9/2000 | Hurst, Jr. et al. |
| 6,157,676 A | 12/2000 | Takaoka et al. |
| 6,345,121 B1 | 2/2002 | Matsumoto et al. |
| 6,476,805 B1 | 11/2002 | Shum et al. |
| 6,654,503 B1 | 11/2003 | Sudharsanan et al. |
| 6,674,910 B1 | 1/2004 | Moon et al. |
| 6,724,818 B1 | 4/2004 | Frojdh et al. |
| 6,795,584 B2 | 9/2004 | Karczewicz et al. |
| 6,917,711 B1 | 7/2005 | Wang et al. |
| 7,142,231 B2 | 11/2006 | Chipchase et al. |
| 7,145,948 B2 | 12/2006 | Ye et al. |
| 7,170,937 B2 | 1/2007 | Zhou |
| 7,190,840 B2 | 3/2007 | Said |
| 7,215,707 B2 | 5/2007 | Lee et al. |
| 7,233,623 B1 | 6/2007 | Pau et al. |
| 7,263,232 B2 | 8/2007 | Srinivasan et al. |
| 7,266,149 B2 | 9/2007 | Holcomb et al. |
| 7,289,674 B2 | 10/2007 | Karczewicz |
| 7,379,501 B2 | 5/2008 | Lainema et al. |
| 7,379,608 B2 | 5/2008 | Marpe et al. |
| 7,529,484 B2 | 5/2009 | Xu et al. |
| 7,664,184 B2 | 2/2010 | Reznic et al. |
| 7,702,013 B2 | 4/2010 | Schwarz et al. |
| 7,706,443 B2 | 4/2010 | Chandramouly et al. |
| 7,751,476 B2 | 7/2010 | Tanizawa et al. |
| 7,751,478 B2 | 7/2010 | Kim et al. |
| 7,751,479 B2 | 7/2010 | Paniconi et al. |
| 7,782,954 B2 | 8/2010 | Liang et al. |
| 7,792,390 B2 | 9/2010 | Prakash et al. |
| 7,847,861 B2 | 12/2010 | Zhai et al. |
| 7,925,107 B2 | 4/2011 | Kim et al. |
| 7,933,337 B2 | 4/2011 | Srinivasan et al. |
| 7,944,965 B2 | 5/2011 | Bhaskaran et al. |
| 7,970,058 B2 | 6/2011 | Suzuki et al. |
| 8,024,121 B2 | 9/2011 | Tang |
| 8,036,264 B2 | 10/2011 | Doshi |
| 8,135,064 B2 | 3/2012 | Tasaka et al. |
| 8,199,819 B2 | 6/2012 | Seo et al. |
| 8,238,428 B2 | 8/2012 | Karczewicz |
| 8,406,299 B2 | 3/2013 | Karczewicz |
| 8,428,133 B2 | 4/2013 | Ye et al. |
| 8,488,668 B2 | 7/2013 | Ye et al. |
| 8,488,672 B2 | 7/2013 | Karczewicz |
| 8,571,104 B2 | 10/2013 | Ye et al. |
| 8,619,853 B2 | 12/2013 | Ye et al. |
| 8,902,984 B2 | 12/2014 | Jeon |
| 9,077,968 B2 | 7/2015 | Sato et al. |
| 9,172,968 B2 | 10/2015 | Karczewicz et al. |
| 9,215,470 B2 | 12/2015 | Karczewicz et al. |
| 2002/0055215 A1 | 5/2002 | Tamura et al. |
| 2003/0081850 A1 | 5/2003 | Karczewicz et al. |
| 2003/0138150 A1 | 7/2003 | Srinivasan |
| 2003/0146936 A1 | 8/2003 | Greer et al. |
| 2003/0223493 A1 | 12/2003 | Ye et al. |
| 2003/0231795 A1 | 12/2003 | Karczewicz |
| 2004/0008771 A1 | 1/2004 | Karczewicz |
| 2004/0120590 A1 | 6/2004 | Fuchs et al. |
| 2004/0151395 A1 | 8/2004 | Kesaniemi et al. |
| 2004/0213348 A1 | 10/2004 | Kim et al. |
| 2005/0025236 A1 | 2/2005 | Yan et al. |
| 2005/0036549 A1 | 2/2005 | He et al. |
| 2005/0078754 A1 | 4/2005 | Liang et al. |
| 2005/0123207 A1 | 6/2005 | Marpe et al. |
| 2005/0152452 A1 | 7/2005 | Suzuki |
| 2005/0157797 A1 | 7/2005 | Gaedke et al. |
| 2005/0243920 A1 | 11/2005 | Murakami et al. |
| 2005/0281334 A1 | 12/2005 | Walker et al. |
| 2005/0281337 A1 | 12/2005 | Kobayashi et al. |
| 2006/0104527 A1 | 5/2006 | Koto et al. |
| 2006/0120456 A1 | 6/2006 | Tasaka et al. |
| 2006/0146936 A1 | 7/2006 | Srinivasan, Sr. et al. |
| 2006/0153295 A1 | 7/2006 | Wang et al. |
| 2006/0218482 A1 | 9/2006 | Ralston et al. |
| 2007/0002945 A1 | 1/2007 | Kim |
| 2007/0005795 A1 | 1/2007 | Gonzalez |
| 2007/0014348 A1 | 1/2007 | Bao et al. |
| 2007/0025631 A1 | 2/2007 | Kim et al. |
| 2007/0036215 A1 | 2/2007 | Pan et al. |
| 2007/0070082 A1 | 3/2007 | Brennan |
| 2007/0160303 A1 | 7/2007 | Guleryuz et al. |
| 2007/0206872 A1 | 9/2007 | Song |
| 2008/0008246 A1 | 1/2008 | Mukherjee et al. |
| 2008/0075171 A1 | 3/2008 | Suzuki |
| 2008/0159389 A1 | 7/2008 | Lee et al. |
| 2008/0232463 A1 | 9/2008 | Lu et al. |
| 2008/0260027 A1 | 10/2008 | Karczewicz |
| 2008/0260030 A1 | 10/2008 | Karczewicz |
| 2008/0260031 A1 | 10/2008 | Karczewicz |
| 2008/0285644 A1 | 11/2008 | Seo et al. |
| 2008/0310504 A1 | 12/2008 | Ye et al. |
| 2008/0310507 A1 | 12/2008 | Ye et al. |
| 2008/0310512 A1 | 12/2008 | Ye et al. |
| 2008/0310745 A1 | 12/2008 | Ye et al. |
| 2009/0052534 A1 | 2/2009 | Wang et al. |
| 2009/0060362 A1 | 3/2009 | Harmanci et al. |
| 2009/0123066 A1 | 5/2009 | Moriya et al. |
| 2010/0020867 A1 | 1/2010 | Wiegand et al. |
| 2010/0054334 A1 | 3/2010 | Yoo et al. |
| 2010/0054615 A1 | 3/2010 | Choi et al. |
| 2010/0118943 A1 | 5/2010 | Shiodera et al. |
| 2010/0128995 A1 | 5/2010 | Drugeon et al. |
| 2010/0172409 A1 | 7/2010 | Reznik et al. |
| 2010/0208802 A1 | 8/2010 | Tsukuba et al. |
| 2010/0284459 A1 | 11/2010 | Jeong et al. |
| 2011/0116539 A1 | 5/2011 | He et al. |
| 2011/0317757 A1 | 12/2011 | Coban et al. |
| 2012/0008675 A1 | 1/2012 | Karczewicz et al. |
| 2012/0008682 A1 | 1/2012 | Karczewicz et al. |
| 2012/0008683 A1 | 1/2012 | Karczewicz et al. |
| 2012/0027079 A1 | 2/2012 | Ye et al. |
| 2012/0099646 A1 | 4/2012 | Coban et al. |
| 2012/0170649 A1 | 7/2012 | Chen et al. |
| 2012/0177120 A1 | 7/2012 | Guo et al. |
| 2012/0300835 A1 | 11/2012 | Karczewicz |
| 2013/0044812 A1 | 2/2013 | Ye et al. |
| 2013/0128974 A1 | 5/2013 | Chien |

(56) References Cited

U.S. PATENT DOCUMENTS

| | | | |
|---|---|---|---|
| 2014/0254675 A1* | 9/2014 | Lee | H04N 19/12 375/240.12 |
| 2015/0181237 A1* | 6/2015 | Tsukuba | H04N 19/44 382/233 |
| 2015/0272658 A1* | 10/2015 | Barrett | A61B 18/14 606/41 |
| 2016/0219302 A1 | 7/2016 | Liu et al. | |
| 2016/0261866 A1* | 9/2016 | Oh | H04N 19/159 |

FOREIGN PATENT DOCUMENTS

| | | |
|---|---|---|
| CN | 1798341 | 7/2006 |
| CN | 1801940 | 7/2006 |
| CN | 101658041 A | 2/2010 |
| EP | 1370087 A1 | 12/2003 |
| EP | 1553782 | 7/2005 |
| EP | 1679903 | 7/2006 |
| EP | 1679903 A2 | 7/2006 |
| EP | 1768415 | 3/2007 |
| EP | 1876838 | 1/2008 |
| EP | 2168381 A2 | 3/2010 |
| JP | 1155678 | 6/1989 |
| JP | 2070127 | 3/1990 |
| JP | 08280032 | 10/1996 |
| JP | 10271505 | 10/1998 |
| JP | 2002135126 | 5/2002 |
| JP | 2002232887 | 8/2002 |
| JP | 2003250157 | 9/2003 |
| JP | 2004007766 | 1/2004 |
| JP | 2005176073 A | 6/2005 |
| JP | 2006191628 | 7/2006 |
| JP | 2006295408 | 10/2006 |
| JP | 2007053561 | 3/2007 |
| JP | 2007074050 | 3/2007 |
| JP | 2007189276 A | 7/2007 |
| JP | 2007267123 A | 10/2007 |
| JP | 2008022405 | 1/2008 |
| JP | 2008154155 A | 7/2008 |
| JP | 2008193627 A | 8/2008 |
| JP | 2009513056 A | 3/2009 |
| JP | 2009118233 A | 5/2009 |
| JP | 2010525675 A | 7/2010 |
| JP | 2010530188 A | 9/2010 |
| JP | 2010530190 A | 9/2010 |
| JP | 2013531445 A | 8/2013 |
| JP | 2013534794 A | 9/2013 |
| KR | 1019980034151 | 8/1998 |
| KR | 20060079087 | 7/2006 |
| KR | 20100029838 A | 3/2010 |
| RU | 2119727 | 9/1998 |
| RU | 2127962 | 3/1999 |
| RU | 2162280 | 1/2001 |
| RU | 2004139081 A | 7/2005 |
| RU | 2258320 | 8/2005 |
| RU | 2004125588 | 1/2006 |
| RU | 2005113308 | 1/2006 |
| RU | 2005137246 | 6/2007 |
| RU | 2314656 C2 | 1/2008 |
| WO | WO-9421083 | 9/1994 |
| WO | WO-9800807 | 1/1998 |
| WO | WO-03063501 | 7/2003 |
| WO | WO-2004032032 | 4/2004 |
| WO | WO-2005107267 | 11/2005 |
| WO | WO-2007010690 | 1/2007 |
| WO | WO-2007046644 | 4/2007 |
| WO | WO-2007063472 | 6/2007 |
| WO | WO-2008044658 A1 | 4/2008 |
| WO | WO-2008084817 | 7/2008 |
| WO | WO-2008088140 | 7/2008 |
| WO | WO-2008131042 A1 | 10/2008 |
| WO | WO-2008131045 | 10/2008 |
| WO | WO-2008157360 A2 | 12/2008 |
| WO | WO-2008157431 A2 | 12/2008 |
| WO | WO-2009080133 A1 | 7/2009 |
| WO | WO-2011031332 A1 | 3/2011 |
| WO | WO-2011163517 A1 | 12/2011 |
| WO | WO-2012006568 A1 | 1/2012 |
| WO | WO-2012006574 A2 | 1/2012 |

OTHER PUBLICATIONS

"Test Model under Consideration", Joint Collaborative Team on Video Coding (JCT-VC) of ITU-T SG16 WP3 and ISO/IEC JTC1/SC29/WG11, Document: JCTVC-B205, Status: Output Document (draft000), Jul. 2010, Internet<URL:http://phenix.int-evry.fr/jct/doc_end_user/documents/20_Geneva/wg11/JCTVC-B205.zip>; 152 pp.

Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pages.

Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.

Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.

Davies, et al., "Suggestion for a Test Model", JCT-VC Meeting, Apr. 15-23, 2010; Dresden, (JointCollaborative Team on Video Coding of ISO/IEC JTCI/SC29/WGII and ITU-TSG.16), May 7, 2010; 30 pp.

Dong et al., "Introduction to Test Model under Consideration (TmuC)"; Jun. 27, 2010, 3 pp.

Han, et al., "Improved Video Compression Efficiency Through Flexible Unit Representation and Corresponding Extension of Coding Tools," IEEE Transactions on Circuits and Systems for Video Technology, vol. 20, No. 12, Dec. 2010, pp. 1709-1720.

ITU-T H.264, Series H: Audiovisual and Multimedia Systems, Infrastructure of audiovisual services—Coding of moving video, Advanced video coding for generic audiovisual services, Mar. 2005, 343 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, High efficiency video coding, The International Telecommunication Union, Apr. 2013, 317 pages.

ITU-T H.265, Series H: Audiovisual and Multimedia Systems, Infrastructure of audiovisual services—Coding of moving video, High efficiency video coding, The International Telecommunication Union, Apr. 2015, 634 pp.

(56) References Cited

OTHER PUBLICATIONS

ITU-T H.265, Series H: Audiovisual and Multimedia Systems, Infrastructure of audiovisual services—Coding of moving video, High efficiency video coding, The International Telecommunication Union, Oct. 2014, 540 pp.

Josh, R., et al., "CE7: Mode Dependent Intra Residual Coding," 5th Meeting, Mar. 16-23, 2011, Document: JCTVC-E098, Mar. 14, 2011; 9 pp.

Karczewicz, et al., "Video coding technology proposal by Qualcomm", JCT-VC Meeting; Apr. 15-23, 2010; Dresden; (Joint Collaborative Team on Video Coding of ISO/IEC JTC1/SC29/WG11 and ITU-TSG.16); URL: http://wftp3.itu.int/av-arch/jctvc-site/, May 18, 2010; XP030007567; 24 pp. 0.

Lee et al., "Adaptive Scanning for H.264/AVC Intra Coding," ETRI Journal, vol. 28, No. 5, pp. 668-671, Oct. 2006.

Lee, et.al., "High-Efficiency Video Compression Framework Based on Flexible Unit Representation," Proceedings of the Second APSIPA Annual Summit and Conference, Dec. 17, 2010, pp. 623-631, [online], URL : http://www.apsipa.org/proceedings_2010/pdf/APSIPA124.pdf.

Li et al., "Prediction Based Adaptive Transform Coefficients Scanning for Inter-Frame Video Coding," pp. 4205-4208 (2010).

Marpe, et al., "Context-based adaptive binary arithmetic coding in the H.264/AVC video compression standard", IEEE Transactions on Circuits and Systems for Video Technology, IEEE Service Center, pp. 620-636, XP011099255, vol. 13, Jul. 2003.

McCann, et al., "Samsung's Response to the Call for Proposals on Video Compression Technology," Joint Collaborative Team on Video Coding (JCT-VC) of ITU-T SG-16 WP3 and ISO/IEC JTC1/SC29/WG11, 1st meeting, Document: JCTVC-A124, Dresden, DE, Apr. 15-23, 2010, 42 pp.

Mrak, et al., "A context modeling algorithm and its application in video compression", Proceedings International Conference on Image Processing (ICIP), Sep. 14, 2003, pp. 845-848, vol. 3, IEEE, XP010669966, ISBN: 978-0/7803-7750-9.

Pan et al., Fast Mode Decision Algorithm for Intraprediction in H.264/AVC Video Coding; vol. 15, No. 7, Jul. 2005, pp. 813-822.

Said "Introduction to Arithmetic Coding—Theory and Practice", Technical Report, Apr. 21, 2004, Retrieved from the Internet: URL: http://www.hpi.hp.com/techreports/2004/HPL-2004-76.pdf., 67 pp.

Saxena et al., "Jointly optimal intra prediction and adaptive primary transform", JCT-VC Meeting; Mpeg Meeting; Oct. 7-15, 2010; Guangzhou; (Joint Collaborative Team on Video Coding of ISO /IECJTC1/SC29/WG11 and ITU-T 56.16); URL: HTTP://WFTP3.ITU.INT/AV-ARCH/JCTVC-SITE/, No. JCTVC-C108, Oct. 2, 2010, ISSN: 0000-0045.

Seregin, et al., "Low-complexity adaptive coefficients scanning", MPEG Meeting; Oct. 7-15, 2010; Guangzhou; (Motion Picture Expert Group or ISO/IEC JTC1/SC29/WG11), No. M18243, Oct. 28, 2010, XP030046833.

Sezer et al., "Robust Learning of 2-D Separable Transforms for Next-Generation Video Coding," Mitsubishi Electric Research Laboratories, Inc., Cambridge, MA, Mar. 2011, 12 pages.

Sohn, et al., "One Dimensional Transform for H.264 Based Intra Coding (Abstract)", Picture Coding Symposium; Nov. 7-9, 2007; Lisbon, Nov. 7, 2007, 4 pp.

Suzuki, et al., "Description of Video Coding Technology Proposal by Sony," Apr. 15-23, 2010, Joint Collaborative Team on Video Coding (JCT-VC) of ITU-T SG16 WP3 and ISO/IEC JTC1/SC29/WG11, Document JCTVC-A103, 1st Meeting: Dresden, DE, Apr. 8, 2010, 51 pp.

Suzuki, "Recent Trend of MPEG-4 Visual," Technical Report of the Information Processing Society of Japan (IPSJ), vol. 2004, No. 25 (2004-AVM-44), IPSJ, Mar. 5, 2004, pp. 85-90, ISSN: 0919-6072. [Partial Translation].

Wang, et al., "A fast transform domain based algorithm for H.264/AVC intra prediction", 2007 IEEE International Conference on Multimedia and Expo, Beijing, CN, Jul. 2-5, 2007, pp. 1563-1566.

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Witten I.A., et al., "Arithmetic Coding for Data Compression", Communications of the ACM, vol. 30, No. 6, pp. 520-540, Jul. 1987.

Xu, et al., "An Overview of Directional Transforms in Image Coding", Circuits and Systems (ISCAS), Proceedings of 2010 IEEE International Symposium on, May 30, 2010-Jun. 2. 2010, pp. 3036-3039.

Ye, et al., "Improved H.264 Intra Coding Based on Bi-Directional Intra Prediction, Directional Transform, and Adaptive Coefficient Scanning," Oct. 2008, pp. 2116-2119.

Ye et al., "Improved intra coding", VCEG Meeting; MPEG Meeting; Oct. 20, 2007; Shenzhen; (Video Coding Experts Group of ITU-T SG.16), No. VCEG-AG11, 6 Pages, ISSN: 0000-0095.

Yeo, et.al., "Choice of Transforms in MDDT for Unified Intra Prediction," [online], Joint Collaborative Team on Video Coding (JCT-VC) of ITU-T SG16 WP3 and ISO/IEC JTC1/SC29/WG11, Oct. 7-15, 2010, Document: JCTVC-0039 (version 1), URL : http://phenix.it-sudparis.eu/jcl/doc_end_user/documents/3_Guangzhou/wg11/JCTVC-C039-m18060-v1-JCTVC-C039.zip; Sep. 30, 2010.

Yeo, et.al., "Mode-Dependent Fast Separable KLT for Block-based Intra Coding," Jul. 21-28, 2010; [online] Joint Collaborative Team on Video Coding (JCT-VC) of ITU-T SG16 WP3 and ISO/IEC JTC1/SC29/WG11, Jul. 28, 2010, Document: JCTVC-B024, URL : http://phenix.it-sudparis.eu/jct/doc_end_user/documents/2_Geneva/wg11/JCTVC-B024.zip., 7 pp.

Yeo et al., "TE7: Results for Mode-Dependent Fast Separable KLT for Block-based Intra Coding," Oct. 7-15, 2010; Joint Collaborative Team on Video Coding (JCT-VC), of ITU-T SG16 WP3 and ISO/IEC JTC1/SC29/WG11, 3rd Meeting: Guangzhou, CN, Jul. 20, 2011, Document: JCTVC-0037, 4 pp.

Zhang et al., "Enhanced Intra Prediction and Transform for Video Coding", 2010 17th IEEE International Conference on Image Processing (ICIP 2010), Hong Kong, Sep. 26-29 2010, IEEE, Sep. 26, 2010, pp. 3381-3384, ISBN: 978-1-4244-7992-4.

Zhao, et al., "Rate-distortion optimized transform for intra-frame coding", Acoustics Speech and Signal Processing (ICASSP) , 2010 IEEE International Conference on, IEEE, Piscataway, NJ, USA, Mar. 14, 2010; pp. 1414-1417, ISBN: 978-1-4244-4295-9.

Zheng, et al., "CE11: Mode Dependent Coefficient Scanning", JCT-VC Meeting; MPEG Meeting; Jan. 20-28, 2011; Daegu; (Joint Collaborative Team on Video Coding of ISO/IEC JTC1/SC29/WG11AND ITU-T SG.16); No. JCTVC-D393, Jan. 16, 2011, 5 pages.

Karczewicz, et al., "Study of Coding Efficiency Improvements beyond HEVC," MPEG Meeting; Oct. 19-23, 2015; Geneva; (Motion Picture Expert Group or ISO/IEC JTC1/SC29/WG11), No. M37102, Oct. 15, 2015, 13 pp.

Karczewicz, et al., "Coding tools investigation for next generation video coding", ITU-T SG16 Doc. COM 16-C806, Feb. 2015., 7 pp.

International Search Report and Written Opinion from International Application No. PCT/US2016/014898, dated Jul. 12, 2016, 21 pp.

Partial International Search Report from International Application No. PCT/US2016/014898, ISA/EPO, dated May 2, 2016, 12 pp.

Response to Written Opinion dated Jul. 12, 2016, from International Application No. PCT/US2016/014898, filed on Nov. 18, 2016, 41 pp.

Zhao, et al. "Video Coding with Rate-Distortion Optimized Transform," IEEE Transactions on Circuits and Systems for Video Technology, vol. 22, No. 1, Jan. 2012, pp. 138-151.

(56) References Cited

OTHER PUBLICATIONS

An, et al., "Non-CE7: Boundary-Dependent Transform for Inter-Predicted Residue," JCTVC-G281, JCT-VC Meeting; Joint Collaborative Team on Video Coding (JCT-VC), of ITU-T SG16 WP3 and ISO/IEC JTC1/SC29/WG11; Nov. 21-30, 2011; document No. JCTVC-G281, Nov. 22, 2011, 10 pp.

An, et al., "Non-CE7: Boundary-Dependent Transform for Inter-Predicted Residue," JCTVC-G281, JCT-VC Meeting; Joint Collaborative Team on Video Coding (JCT-VC), of ITU-T SG16 WP3 and ISO/IEC JTC1/SC29/WG11; Nov. 21-30, 2011; document No. JCTVC-G281_r1, Nov. 22, 2011, 11 pp.

Wang, et al., "High Efficiency Video Coding (HEVC) Defect Report," JCTVC-G281, JCT-VC Meeting; Joint Collaborative Team on Video Coding (JCT-VC), of ITU-T SG16 WP3 and ISO/IEC JTC1/SC29/WG11; Jul. 25-Aug. 2, 2013, document No. JCTVC-N1003_v1; Sep. 27, 2013; 312 pp.

Jain, "A sinusoidal family of unitary transforms", IEEE Transactions on Pattern Analysis and Machine Intelligence, Oct. 1979, pp. 356-365, IEEE Service Center.

Martucci et al., "Symmetric convolution and the discrete sine and cosine transforms," IEEE Transactions on Signal Processing, vol. 42, No. 5, May 1, 1994, pp. 1038-1051, IEEE Signal Processing Society.

Han et. al., "Towards jointly optimal spatial prediction and adaptive transform in video/image coding," IEEE International Conference on Acoustics, Speech and Signal Processing (ICASSP), Mar. 2010, pp. 726-729.

Lim, et al., "Rate-distortion optimized adaptive transform coding," Opt. Eng., vol. 48, No. 8, pp. 087004-1-087004-14, Aug. 2009.

Saxena et al., "DCT/DST-based transform coding for intra prediction in image/video coding," IEEE Trans. Image Processing. vol. 22, No. 10, Oct. 2013, pp. 3974-3981.

Zou, et al., "Rate-Distortion Optimized Transforms Based on the Lloyd-Type Algorithm for Intra Block Coding ," IEEE Journal of Selected Topics in Signal Processing, vol. 7, Issue: 6, Nov. 2013, pp. 1072-1082.

Second Written Opinion from International Application No. PCT/US2016/014898, dated Feb. 28, 2017, 11 pp.

"Text of ISO/IEC 14496-10 FCD Advanced Video Coding," Video Standards and Drafts, Jul. 2002, 207 pp.

Aase et al., "A critique of SVD-based image coding systems," IEEE Circuits and Systems, Florida, vol. 4, May 30, 1999-Jun. 2, 1999, 4 pp.

Fan et al., "A novel coefficient scanning scheme for directional spatial prediction—based image compression," Multimedia and Expo, 2003, Proceedings 2003 International Conference on Jul. 6-9, 2003, vol. 2, pp. 557-560.

Fu, et al., "Diagonal Discrete Cosine Transforms for Image Coding," Nov. 2, 2006, Advances in Multimedia Information Processing—Proceedings of the 7th Pacific Rim Conference on Multimedia, PCM 2006, Nov. 2-4, 2006, pp. 150-158.

Fu, et la., "A Comparative Study of Compensation Techniques in Directional DCT's," IEEE International Symposium on Circuits and Systems (ISCAS) 2007, May 27-30, 2007, pp. 521-524.

Karczewicz, "Improved Intra Coding," ITU-Telecommunications Standardization Sector, Study Group 16, Question 6, Video Coding Experts Group (VCEG), Document No. VCEG-AF15, 32nd meeting; Apr. 20-21, 2007, 4 pp.

Kim et al., "Complexity Reduction Algorithm for Intra Mode Selection in H.264/AVC Video Coding," Advanced Concepts for Intelligent Vision Systems, Lecture Notes in Computer Science, Springer Berlin/Heidelberg, vol. 4179/2006, Oct. 4, 2006, pp. 454-465.

Kurceren et al., Improvements on CABAC, ITU—Telecommunications Standardization Sector Study Group 16 Questions 6 Video Coding Experts Group (VCEG) VCEG-O24, 15th Meeting; Pattaya, Thailand, Dec. 4-6, 2001, 4 pp.

Zhang et al. "Multiple modes intra-prediction in intra coding," Multimedia and Expo, 2004. ICME '04.2004 IEEE International Conference on Taipei, Taiwan Jun. 27-30, 2004, Piscataway, NJ, USA, IEEE,vol. 1, Jun. 27, 2004, pp. 419-422.

Richardson, "H264/MPEG-4 Part 10 White Paper—Prediction of Intra Macroblocks," Internet Citation, Apr. 2003, retrieved from http://www.vcodex.com/h264.html.h264intrapred.pdf, 6 pp.

Richardson: Video Coding H.264 I MPEG-4—New Generation Standards, Moscow, Tekhnosfera, 2005, translation of 2003 publication, pp. 145-183, 233-240, 198 pp.

Robert, et al., "Improving Intra mode coding in H.264/AVC through block oriented transforms," 2006 IEEE 8th Workshop on Multimedia Signal Processing, Oct. 3-6, 2006, pp. 382-386.

Sekiguchi et al., "Results of CE on Separate Prediction Modes for 4:4:4 Coding (CE9)," Joint Video Team (JVT) of ISO/IEC MPEG & ITU-T VCEG (ISO/IEC JTC1/SC29/WG11 and ITU-T SG16 Q.6) Document No. JVT-R031, 28 pp. Jan. 14-20, 2006.

Shiodera, et al., "Bidirectional Intra Prediction," ITU-T Q./SG16 VCEG, VCEG-AE14, Marrakech, Morocco, Jan. 15-16, 2007, document No. VCEG-AE14; 6 pp.

Shiodera, et al., "Simulation Results of Bidirectional Intra Prediction on KTA software version 1.3," ITU-T Q.6/SG16 VCEG, VCEG-AF06, San Jose, USA, Apr. 20-21, 2007; document No. VCEG-AF06, 4 pp.

Tan, et al., "Spatially Compensated Block-Based Transform," Proceedings of the Seventh IASTED International Conference Signal and Image Processing, pp. 92-97, Aug. 15, 2005.

Conklin, et al.: "New Intra Prediction Modes," ITU-Telecommunications Standardization Sector, Study Group 16, Question 6, Video Coding Experts Group (VCEG), Document No. VCEG-N54, 14th Meeting: Santa Barbara, Sep. 24-27, 2001, 10 pp.

Wiegand, "Text of Committee Draft of Joint Video Specification," Joint Video Team (JVT) of ISO/IEC MPEG and ITU-T VCEG, JCT-C167, 3rd Meeting; Fairfax, Virginia, USA, May 6-10, 2002, document: VCEG-P07; 141 pp.

Yu, et al., "Low Complexity Intra Prediction," ITU-Telecommunications Standardization Sector, Study Group 16, Question 6, Video Coding Experts Group (VCEG), Document No. VCEG-Z14r1, Apr. 16-22, 2005, 4 pages.

Zeng et al., "Directional Discrete Cosine Transforms for Image Coding," 2006 IEEE International Conference on Multimedia and Expo, pp. 721-724, Jul. 9-12, 2006.

Ye and Karczewicz, "Complexity Analysis of Improved Intra Coding," ITU-Telecommunications Standardization Sector Study Group 16 Question 6 Video Coding Experts Group (VCEG), 34th Meeting; Antalya Turkey, Jan. 2008, VCEG-AH2O, 6 pp.

Yeo, et al., "Mode-Dependent Transforms for Coding Directional Intra Prediction Residuals," IEEE Transactions on Circuits and Systems for Video Technology, vol. 22, No. 4, Apr. 2012, pp. 545-554.

International Preliminary Report on Patentability from U.S. Appl. No. PCT/US2016/014898, dated May 8, 2017, 15 pp.

Business Communication: "Business Communication", Kabushiki Kaisha Business Communication Sha, vol. 44, No. 6, Jun. 1, 2007, p. 92, ISSN: 0385-695X.

Saito S., et al., "HD-SDI H.264 Very low delay encoder/decoder device 'EHH-1000E/D' and its application," Image Information Industrial, Feb. 2009, Issue vol. 41, No. 2, Sangyo Kaihatsukiko Inc., Feb. 1, 2009, pp. 15-20. [partial translation].

Srinivasan S., et al., "An introduction to HD Photo Technical Design," MPEG document No. wg1n4184m, Apr. 2007, 15 pp.

V.I. Pershikov, V.M. Savinkov, "Tolkovy Slovar po Informatike" (The Explanatory Dictionary of Informatics), Moscow, Finances and Statistics Publishing House, 1995, p. 425.

Xiaopeng, et al., "A novel coefficient scanning scheme for directional spatial prediction-based image compression", Multimedia and EXPO, 2003. Proceedings. 2003 International Conference on Jul. 6-9, 2003, Piscataway, NJ, vol. 2, pp. 557-560, XP010650616.

\* cited by examiner

4x4 DST-VII:

4-point DCT-II:

8-point DCT-II:

16-point DCT-II:

32-point DCT-II:

ENHANCED MULTIPLE TRANSFORMS FOR PREDICTION RESIDUAL

This application claims the benefit of U.S. Provisional Application No. 62/107,996, filed Jan. 26, 2015, and U.S. Provisional Application No. 62/137,038, filed Mar. 23, 2015, the entire content of each of which is incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized.

SUMMARY

This disclosure describes techniques for determining transforms to use for generating a coefficient block from a transform block as part of video encoding and transforms to use for generating a transform block from a coefficient block as part of video decoding. In some examples, a video encoder may determine a plurality of transform subsets. Likewise, a video decoder may determine a plurality of transform subsets. The video encoder and the video decoder may select a transform subset for the plurality of transform subsets using implicit techniques that do not necessarily require additional signaling and determine transforms from the selected transform subsets. In this way, the video encoder and the video decoder may select from a relatively large set of transforms with a minimal increase in the amount of information that needs to be signaled.

In one example, the disclosure describes a method of decoding video data, the method comprising determining a plurality of transform subsets, each subset identifying one or more candidate transforms, wherein at least one transform subset identifies a plurality of candidate transforms, selecting a first transform subset from the plurality of transform subsets for a left transform for a current coefficient block of the video data, selecting a second transform subset from the plurality of transform subsets for a right transform for the current coefficient block of the video data, determining the left transform from the selected first transform subset, determining the right transform from the selected second transform subset, determining a current transform block based on the left transform, right transform, and the current coefficient block, and reconstructing a video block based on the current transform block and a predictive block.

In one example, the disclosure describes a method of encoding video data, the method comprising determining a plurality of transform subsets, each subset identifying one or more candidate transforms, wherein at least one transform subset identifies a plurality of candidate transforms, selecting a first transform subset from the plurality of transform subsets for a left transform for a current transform block of a video block of the video data, selecting a second transform subset from the plurality of transform subsets for a right transform for the transform block of the video block of the video data, determining the left transform from the selected first transform subset, determining the right transform from the selected second transform subset, determining a current coefficient block based on the left transform, right transform, and the current transform block, and generating a video bitstream that includes information indicative of coefficients of the current coefficient block used for reconstruction of the video block.

In one example, the disclosure describes a device for video decoding video data, the device comprising a video data memory configured to store the video data and transform subsets, each subset identifying one or more candidate transforms, wherein at least one transform subset identifies a plurality of candidate transforms, and a video decoder comprising integrated circuitry, the video decoder configured to determine a plurality of transform subsets from the stored transform subsets, select a first transform subset from the plurality of transform subsets for a left transform for a current coefficient block of the video data, select a second transform subset from the plurality of transform subsets for a right transform for the current coefficient block of the video data, determine the left transform from the selected first transform subset, determine the right transform from the selected second transform subset, determine a current transform block based on the left transform, right transform, and the current coefficient block, and reconstruct a video block based on the current transform block and a predictive block.

In one example, the disclosure describes a device for encoding video data, the device comprising a video data memory configured to store the video data and transform subsets, each subset identifying one or more candidate transforms, wherein at least one transform subset identifies a plurality of candidate transforms, and a video encoder configured to determine a plurality of transform subsets from the stored transform subsets, select a first transform subset from the plurality of transform subsets for a left transform for a current transform block of a video block of the video data, select a second transform subset from the plurality of transform subsets for a right transform for the transform block of the video block of the video data, determine the left transform from the selected first transform subset, determine the right transform from the selected second transform subset, determine a current coefficient block based on the left transform, right transform, and the current transform block, and generate a video bitstream that includes information indicative of coefficients of the current coefficient block used for reconstruction of the video block.

In one example, the disclosure describes a device for decoding video data, the device comprising means for determining a plurality of transform subsets, each subset identifying one or more candidate transforms, wherein at least one transform subset identifies a plurality of candidate transforms, means for selecting a first transform subset from the plurality of transform subsets for a left transform for a current coefficient block of the video data, means for selecting a second transform subset from the plurality of transform subsets for a right transform for the current coefficient block of the video data, means for determining the left transform from the selected first transform subset, means for determining the right transform from the selected second transform subset, means for determining a current transform block based on the left transform, right transform, and the current coefficient block, and means for reconstructing a video block based on the current transform block and a predictive block.

In one example, the disclosure describes a non-transitory computer-readable storage medium storing instructions that when executed cause a video decoder of a device for video decoding to determine a plurality of transform subsets, each subset identifying one or more candidate transforms, wherein at least one transform subset identifies a plurality of candidate transforms, select a first transform subset from the plurality of transform subsets for a left transform for a current coefficient block of the video data, select a second transform subset from the plurality of transform subsets for a right transform for the current coefficient block of the video data, determine the left transform from the selected first transform subset, determine the right transform from the selected second transform subset, determine a current transform block based on the left transform, right transform, and the current coefficient block, and reconstruct a video block based on the current transform block and a predictive block.

In one example, the disclosure describes a device for encoding video data, the device comprising means for determining a plurality of transform subsets, each subset identifying one or more candidate transforms, wherein at least one transform subset identifies a plurality of candidate transforms, means for selecting a first transform subset from the plurality of transform subsets for a left transform for a current transform block of a video block of the video data, means for selecting a second transform subset from the plurality of transform subsets for a right transform for the transform block of the video block of the video data, means for determining the left transform from the selected first transform subset, means for determining the right transform from the selected second transform subset, means for determining a current coefficient block based on the left transform, right transform, and the current transform block, and means for generating a video bitstream that includes information indicative of coefficients of the current coefficient block used for reconstruction of the video block.

In one example the disclosure describes, a non-transitory computer-readable storage medium storing instructions that when executed cause a video encoder of a device for video encoding to determine a plurality of transform subsets, each subset identifying one or more candidate transforms, wherein at least one transform subset identifies a plurality of candidate transforms, select a first transform subset from the plurality of transform subsets for a left transform for a current transform block of a video block of the video data, select a second transform subset from the plurality of transform subsets for a right transform for the transform block of the video block of the video data, determine the left transform from the selected first transform subset, determine the right transform from the selected second transform subset, determine a current coefficient block based on the left transform, right transform, and the current transform block, and generate a video bitstream that includes information indicative of coefficients of the current coefficient block used for reconstruction of the video block.

The details of one or more examples are set forth in the accompanying drawings and the description below. Other features, objects, and advantages will be apparent from the description and drawings, and from the claims.

BRIEF DESCRIPTION OF DRAWINGS

FIGS. 1A-1E are tables illustrating examples of transform types.

DETAILED DESCRIPTION

Figure 2:
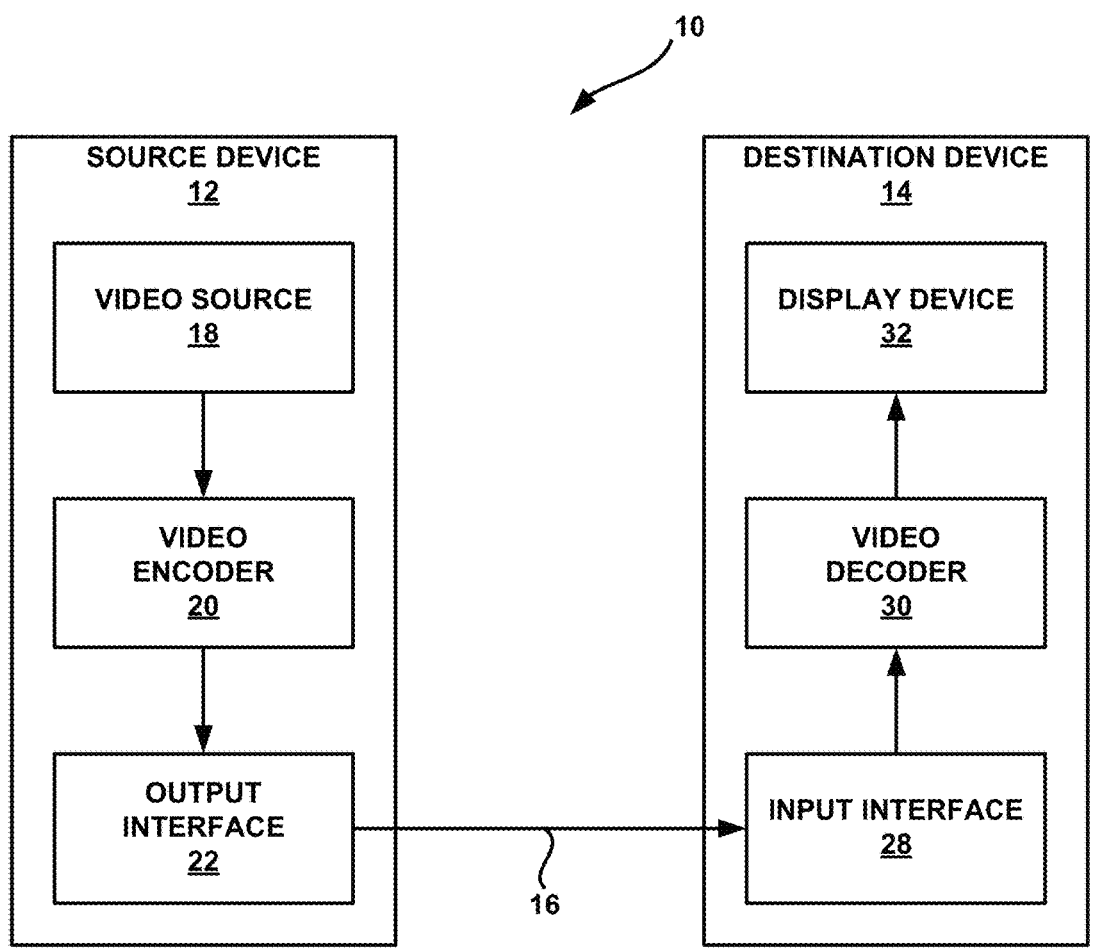
FIG. 2 is a block diagram illustrating an example video coding system that may utilize the techniques described in this disclosure.

This disclosure is related to multiple transforms applied for Intra or Inter prediction residual. The techniques may be used in the context of advanced video codecs, such as extensions of the high efficiency video coding (HEVC) standard or the next generation of video coding standards.

In video coding, a video encoder generates a residual block by subtracting sample values of a current block from sample values of a predictive block. The video encoder divides the residual block into one or more transform blocks and applies a transform (e.g., a discrete frequency transform such as a discrete cosine transform (DCT)) to the one or more transform blocks to transform the residual values in the one or more transform blocks from the pixel domain to the frequency domain. In the frequency domain, the transformed blocks are referred to as coefficient blocks that include one or more transform coefficient values.

During decoding, a video decoder performs the reciprocal process. For instance, the video decoder applies an inverse-transform to a coefficient block to transform the coefficient block to a transform block (e.g., transform from frequency domain to pixel domain). The transform block is one block of a residual block, and the video decoder adds residual values of the residual block to the sample values of the predictive block to reconstruct the current block.

Only for ease of description, this disclosure describes the video encoder and the video decoder as determining a transform used for the encoding and decoding process, respectively. However, it should be understood that the video encoder applies the transform to a transform block to generate a coefficient block and that the video decoder applies an inverse of the transform to the coefficient block to reconstruct the transform block. Accordingly, the transform that the video decoder applies is the inverse of the transform that the video encoder applies. Therefore, in this disclosure, when the video decoder is described as determining a transform and/or applying a transform, it should be understood that the video decoder is determining a transform that is the inverse of the transform determined by the video encoder and/or that the video decoder is applying a transform that is the inverse of the transform applied by the video encoder.

This disclosure describes example techniques for determining the transform that is applied to a transform block of residual values for encoding transform coefficients or applied to a coefficient block of transform coefficients for decoding residual values. For instance, the video encoder and the video decoder may each construct a plurality of transform subsets, each transform subset identifies a plurality of candidate transforms. Candidate transforms refer to different types of transforms such as different types of DCTs and different types of discrete sine transforms (DSTs). The video encoder and the video decoder select transform subset(s) and determine transforms from the selected transform subset(s) that are used for determining a coefficient block from a transform block for video encoding or a transform block from a coefficient block for video decoding.

In this way, the video encoder and the video decoder may determine which transforms to use from a larger set of candidate transforms, allowing for better adaptation to the varying statistics of the transform block without overly burdening the bitstream bandwidth. For instance, some techniques constrain how many transforms are available, which may result in poor coding performance because the statistics of the transform block are such that none of the available transforms perform well. There may be other better transforms but these transforms are unavailable due to the constraints.

In the techniques described in this disclosure, because more transforms are available, the video encoder and the video decoder may use a transform that provides better coding performance than would be possible with a limited set of transforms. Furthermore, as described in more detail, signaling overhead, used to indicate which transform is to be used, is kept low so that coding gains can be achieved while having more transforms available and keeping the impact on bandwidth low.

For example, rather than relying on signaled information in the bitstream, the video decoder may select which transform subset(s) to use based on implicit techniques such as based on intra-prediction mode, location of transform block, etc. The video decoder may then determine which transform(s) to use from the selected transform subset(s) based possibly on one or more transform subset indices, for respective ones of the selected transform subset(s), signaled in the bitstream or other factors including but not limited to number of nonzero coefficients, sum of nonzero coefficients, or position of nonzero coefficients in a coefficient block.

Even where the transform subset index is signaled for respective transform subset(s), the signaling overhead may be kept low because the index value spans only the range of the transform subset rather than spanning all possible transforms. For instance, assume there are up to 16 possible transforms, and that a transform subset includes three candidate transforms. In this case, the index value will range from 0 to 2, whereas an index into a list of all transforms would range from 0 to 15. Signaling smaller values such as 0 to 2 may require fewer bits than signaling larger values.

Prior to describing the manner in which transform subsets are constructed and selected, the following describes video coding standards, DCTs and DSTs in general, different types of DCTs and DSTs, and some existing DCT and DST techniques. The disclosure then describes some problems in existing techniques, followed by example techniques that may overcome the problems.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. In addition, a new video coding standard, namely High Efficiency Video Coding (HEVC), has recently been developed by the Joint Collaboration Team on Video Coding (JCT-VC) of ITU-T Video Coding Experts Group (VCEG) and ISO/IEC Motion Picture Experts Group (MPEG). The final HEVC draft specification, and referred to as HEVC WD hereinafter, is available from http://phenix.int-evey.fr/jct/doc_end user/documents/14_Vienna/wg11/JCTVC-N1003-v1.zip. The final draft of the HEVC standard is: ITU-T H.265, Series H: Audiovisual and Multimedia Systems, Infrastructure of audiovisual services—Coding of moving video, Advanced video coding for generic audiovisual services, The International Telecommunication Union, October 2014, and is available from http://www.itu.int/rec/T-REC-H.265-201410-Fen.

The following is a description of discrete sine and cosine transforms. Transform indicates the process of deriving an alternative representation of the input signal. For example, the transform converts values from the pixel domain to the frequency domain (e.g., in video encoding) or from frequency domain to pixel domain (e.g., in video decoding). Given an N-point vector $x=[x_0, x_1, \ldots, x_{N-1}]^T$ and a set of given vectors $\{\Phi_0, \Phi_1, \ldots, \Phi_{M-1}\}$, x can be approximated or exactly represented using a linear combination of $\Phi_0, \Phi_1, \ldots, \Phi_{M-1}$, which can be formulated as follows, $$\hat{x} = \sum_{i=0}^{M-1} f_i \cdot \phi_i$$

where $\hat{x}$ can be an approximation or equivalent of x, vector $f=[f_0, f_1, f_2, \ldots, f_{M-1}]$ is called the transform coefficient vector and $\{\Phi_0, \Phi_1, \ldots, \Phi_{M-1}\}$ are the transform basis vectors.

In the scenario of video coding, transform coefficients are roughly non-correlated and sparse, i.e., the energy of the input vector x is compacted only on a few transform coefficients, and the remaining majority transform coefficients are typically close to 0. For instance, when a video encoder transforms a transform block to a coefficient block, the nonzero coefficient values in the coefficient block tend to be grouped together at a top-left corner of the coefficient block, and a majority of the coefficient values are zero. The nonzero coefficients grouped near the top-left corner of the coefficient block reflect low frequency components, whereas coefficient values near the bottom-right corner of the coefficient block, which tend to be zero, reflect high frequency components.

Given the specific input data, the optimal transform in terms of energy compaction is the so-called Karhunen-Loeve transform (KLT), which uses the eigen vectors of the covariance matrix of the input data as the transform basis vectors. Therefore, KLT is actually a data-dependent transform and does not have a general mathematical formulation. However, under certain assumptions, e.g., the input data forms a first-order stationary Markov process, it has been proven in the literature that the corresponding KLT is actually a member of the sinusoidal family of unitary transforms, which is described in Jain, A. K., A sinusoidal family of unitary transforms, IEEE Trans. on Pattern Analysis and Machine Intelligence, 1, 356, 1979. The sinusoidal family of unitary transforms indicates transforms using transform basis vectors formulated as follows:

$$\Phi_m(k) = A \cdot e^{ike} + B \cdot e^{-ike}$$

where e is the base of the natural logarithm approximately equal to 2.71828, A, B, and θ are complex in general, and depend on the value of m.

Several well-known transforms including the discrete Fourier, cosine, sine, and the KLT (for first-order stationary Markov processes) are members of this sinusoidal family of unitary transforms. According to S. A. Martucci, "Symmetric convolution and the discrete sine and cosine transforms," IEEE Trans. Sig. Processing SP-42, 1038-1051 (1994), the complete discrete cosine transform (DCT) and discrete sine transform (DST) families include totally 16 transforms based on different types, i.e., different values of A, B, and θ, and a complete definition of the different types of DCT and DST are given below.

Assume the input N-point vector is denoted as $x = [x_0, x_1, \ldots, x_{N-1}]^T$, and it is transformed to another N-point transform coefficient vector denoted as $y = [y_0, y_1, \ldots, y_{N-1}]^T$ by multiplying a matrix, the process of which can be further illustrated according to one of the following transform formulation, wherein k ranges from 0 through N−1, inclusive:

DCT Type-I (DCT-1):

$$y_k = \sum_{n=0}^{N-1} \sqrt{\frac{2}{N-1}} \cos\left(\frac{\pi \cdot n \cdot k}{N-1}\right) \cdot w_0 \cdot w_1 \cdot x_n,$$

where $w_0 = \begin{cases} \frac{1}{\sqrt{2}}, & \text{if } n = 0 \text{ or } n = N-1 \\ 1, & \text{otherwise} \end{cases}$, $w_1 = \begin{cases} \frac{1}{\sqrt{2}}, & \text{if } k = 0 \text{ or } k = N-1 \\ 1, & \text{otherwise} \end{cases}$ -continued DCT Type-II (DCT-2):

$$y_k = \sum_{n=0}^{N-1} \sqrt{\frac{2}{N}} \cos\left(\frac{\pi \cdot (n + 0.5) \cdot k}{N-1}\right) \cdot w_0 \cdot x_n,$$

where $w_0 = \begin{cases} \frac{1}{\sqrt{2}}, & \text{if } k = 0 \\ 1, & \text{otherwise} \end{cases}$ DCT Type-III (DCT-3):

$$y_k = \sum_{n=0}^{N-1} \sqrt{\frac{2}{N}} \cos\left(\frac{\pi \cdot n \cdot (k + 0.5)}{N}\right) \cdot w_0 \cdot x_n,$$

where $w_0 = \begin{cases} \frac{1}{\sqrt{2}}, & \text{if } n = 0 \\ 1, & \text{otherwise} \end{cases}$ DCT Type-IV (DCT-4):

$$y_k = \sum_{n=0}^{N-1} \sqrt{\frac{2}{N}} \cos\left(\frac{\pi \cdot (n + 0.5) \cdot (k + 0.5)}{N}\right) \cdot x_n,$$

DCT Type-V (DCT-5):

$$y_k = \sum_{n=0}^{N-1} \sqrt{\frac{2}{N - 0.5}} \cos\left(\frac{\pi \cdot n \cdot k}{N - 0.5}\right) \cdot w_0 \cdot w_1 \cdot x_n,$$

where $w_0 = \begin{cases} \frac{1}{\sqrt{2}}, & \text{if } n = 0 \\ 1, & \text{otherwise} \end{cases}$, $w_1 = \begin{cases} \frac{1}{\sqrt{2}}, & \text{if } k = 0 \\ 1, & \text{otherwise} \end{cases}$ DCT Type-VI (DCT-6):

$$y_k = \sum_{n=0}^{N-1} \sqrt{\frac{2}{N - 0.5}} \cos\left(\frac{\pi \cdot (n + 0.5) \cdot k}{N - 0.5}\right) \cdot w_0 \cdot w_1 \cdot x_n,$$

where $w_0 = \begin{cases} \frac{1}{\sqrt{2}}, & \text{if } n = N - 1 \\ 1, & \text{otherwise} \end{cases}$, $w_1 = \begin{cases} \frac{1}{\sqrt{2}}, & \text{if } k = 0 \\ 1, & \text{otherwise} \end{cases}$ DCT Type-VII (DCT-7):

$$y_k = \sum_{n=0}^{N-1} \sqrt{\frac{2}{N - 0.5}} \cos\left(\frac{\pi \cdot n \cdot (k + 0.5)}{N - 0.5}\right) \cdot w_0 \cdot w_1 \cdot x_n,$$

where $w_0 = \begin{cases} \frac{1}{\sqrt{2}}, & \text{if } n = 0 \\ 1, & \text{otherwise} \end{cases}$, $w_1 = \begin{cases} \frac{1}{\sqrt{2}}, & \text{if } k = N - 1 \\ 1, & \text{otherwise} \end{cases}$ -continued DCT Type-VIII (DCT-8):

$$y_k = \sum_{n=0}^{N-1} \sqrt{\frac{2}{N+0.5}} \cos\left(\frac{\pi \cdot (n+0.5) \cdot (k+0.5)}{N+0.5}\right) \cdot x_n,$$

DST Type-I (DST-1):

$$y_k = \sum_{n=0}^{N-1} \sqrt{\frac{2}{N+1}} \sin\left(\frac{\pi \cdot (n+1) \cdot (k+1)}{N+1}\right) \cdot x_n,$$

DST Type-II (DST-2):

$$y_k = \sum_{n=0}^{N-1} \sqrt{\frac{2}{N}} \sin\left(\frac{\pi \cdot (n+0.5) \cdot (k+1)}{N}\right) \cdot w_0 \cdot x_n,$$

where $w_0 = \begin{cases} \frac{1}{\sqrt{2}}, & \text{if } k = N-1 \\ 1, & \text{otherwise} \end{cases}$ DST Type-III (DST-3):

$$y_k = \sum_{n=0}^{N-1} \sqrt{\frac{2}{N}} \sin\left(\frac{\pi \cdot (n+1) \cdot (k+0.5)}{N}\right) \cdot w_0 \cdot x_n,$$

where $w_0 = \begin{cases} \frac{1}{\sqrt{2}}, & \text{if } n = N-1 \\ 1, & \text{otherwise} \end{cases}$ DST Type-IV (DST-4):

$$y_k = \sum_{n=0}^{N-1} \sqrt{\frac{2}{N}} \sin\left(\frac{\pi \cdot (n+0.5) \cdot (k+0.5)}{N}\right) \cdot x_n,$$

DST Type-V (DST-5):

$$y_k = \sum_{n=0}^{N-1} \sqrt{\frac{2}{N+0.5}} \sin\left(\frac{\pi \cdot (n+1) \cdot (k+1)}{N+0.5}\right) \cdot x_n,$$

DST Type-VI (DST-6):

$$y_k = \sum_{n=0}^{N-1} \sqrt{\frac{2}{N+0.5}} \sin\left(\frac{\pi \cdot (n+0.5) \cdot (k+1)}{N+0.5}\right) \cdot x_n,$$

DST Type-VII (DST-7):

$$y_k = \sum_{n=0}^{N-1} \sqrt{\frac{2}{N+0.5}} \sin\left(\frac{\pi \cdot (n+1) \cdot (k+0.5)}{N+0.5}\right) \cdot x_n,$$

DST Type-VIII (DST-8):

$$y_k = \sum_{n=0}^{N-1} \sqrt{\frac{2}{N-0.5}} \sin\left(\frac{\pi \cdot (n+0.5) \cdot (k+0.5)}{N-0.5}\right) \cdot w_0 \cdot w_1 \cdot x_n,$$

where $w_0 = \begin{cases} \frac{1}{\sqrt{2}}, & \text{if } n = N-1 \\ 1, & \text{otherwise} \end{cases}$, $w_1 = \begin{cases} \frac{1}{\sqrt{2}}, & \text{if } k = N-1 \\ 1, & \text{otherwise} \end{cases}$ The above provides examples of different DCT and DST types, all-in-all there are 16 transform types. The transform type is specified by the mathematical formulation of the transform basis function. The transform type and the transform size should not be confused. The transform type refers to basis function, whereas the transform size refers to the size of the transform. For instance, a 4-point DST-VII and 8-point DST-VII have the same transform type, regardless of the value of N (e.g., 4-point or 8-point).

Without loss of generality, all the above transform types can be represented using the below generalized formulation:

$$y_m = \sum_{n=0}^{N-1} T_{m,n} \cdot x_n,$$

where T is the transform matrix specified by the definition of one certain transform, e.g., DCT Type-I~DCT Type-VIII, or DST Type-I~DST Type-VIII, and the row vectors of T, e.g., $[T_{i,0}, T_{i,1}, T_{i,2}, \ldots, T_{i,N-1}]$ are the $i^{th}$ transform basis vectors. A transform applied on the N-point input vector is called an N-point transform.

It is also noted that, the above transform formulations, which are applied on the 1-D input data x, can be represented in matrix multiplication form as below $$y = T \cdot x$$

where T indicates the transform matrix, x indicates the input data vector, and y indicates the output transform coefficients vector.

For instance, the video encoder may perform the matrix multiplication $y = T \cdot x$ to generate the transform coefficient vector. The video decoder may perform the inverse matrix multiplication to generate the transform vector from the transform coefficient vector.

The transforms as introduced above are applied on 1-D input data, and transforms can be also extended for 2-D input data sources. Supposing X is an input M×N data array. The typical methods of applying transform on 2-D input data include the separable and non-separable 2-D transforms.

A separable 2-D transform applies 1-D transforms for the horizontal and vertical vectors of X sequentially, formulated as below:

$$Y = C \cdot X \cdot R^T$$

where C and R denotes the given M×M and N×N transform matrices, respectively.

From the formulation, it can be seen that C applies 1-D transforms for the column vectors of X, while R applies 1-D transforms for the row vectors of X. In the later part of this disclosure, for simplicity denote C and R as left (vertical) and right (horizontal) transforms and they both form a transform pair. There are cases when C is equal to R and is an orthogonal matrix. In such a case, the separable 2-D transform is determined by just one transform matrix.

A non-separable 2-D transform first reorganized all the elements of X into a single vector, namely X', by doing the following mathematical mapping as an example:

$$X_{(i \cdot N + j)}' = X_{i,j}$$

Then a 1-D transform T' is applied for X' as below:

$$Y = T' \cdot X$$

where T' is an (M*N)×(M*N) transform matrix.

In video coding, separable 2-D transforms are always applied since it requires much less operation (addition, multiplication) counts as compared to 1-D transform. As described in more detail below, this disclosure describes example techniques with which a video encoder and a video decoder select the left and right transforms.

For instance, the video encoder and the video decoder may determine a plurality of transform subsets, each transform subset identifying a plurality of candidate transforms. As an example of the 16 possible transforms (e.g., DCT-1 to DCT-8 and DST-1 to DST-8), the video encoder and the video decoder may determine three transform subsets and each of the transform subsets includes two or more of the 16 transforms. The video encoder and the video decoder may select one of the three transform subsets and determine the left transform (e.g., C) from the selected transform subset and select one of the three transform subsets and determine the right transform (e.g., R) from the selected transform subset. The selected transform subsets may be different subsets or the same subsets.

The following is a description of transform types applied in HEVC. In conventional video codecs, such as H.264/AVC, an integer approximation of the 4-point and 8-point Discrete Cosine Transform (DCT) Type-II is always applied for both Intra and Inter prediction residual. Intra prediction residual refers to the residual from intra-prediction and Inter prediction residual refers to the residual from inter-prediction. The residual, inter-predication, and intra-prediction are all described in more detail below. In general, the residual block is divided into a plurality of transform blocks. In video encoding, the transforms are applied to each of the transform blocks to generate coefficient blocks. In video decoding, the transforms are applied to each of the coefficient blocks to generate the transform blocks and reconstruct the residual block.

To better accommodate the various statistics of residual samples, more flexible types of transforms other than DCT Type-II are utilized in the new generation video codec. For example, in HEVC, an integer approximation of the 4-point Type-VII Discrete Sine Transform (DST) is utilized for Intra prediction residual, which is both theoretically proved and experimentally validated that DST Type-VII is more efficient than DCT Type-II for residuals vectors generated along the Intra prediction directions, e.g., DST Type-VII is more efficient than DCT Type-II for row residual vectors generated by the horizontal Intra prediction direction. See, for example, J. Han, A. Saxena and K. Rose, "Towards jointly optimal spatial prediction and adaptive transform in video/image coding," IEEE International Conference on Acoustics, Speech and Signal Processing (ICASSP), March 2010, pp. 726-729.

Figures 1A, 1B, 1C, 1D:
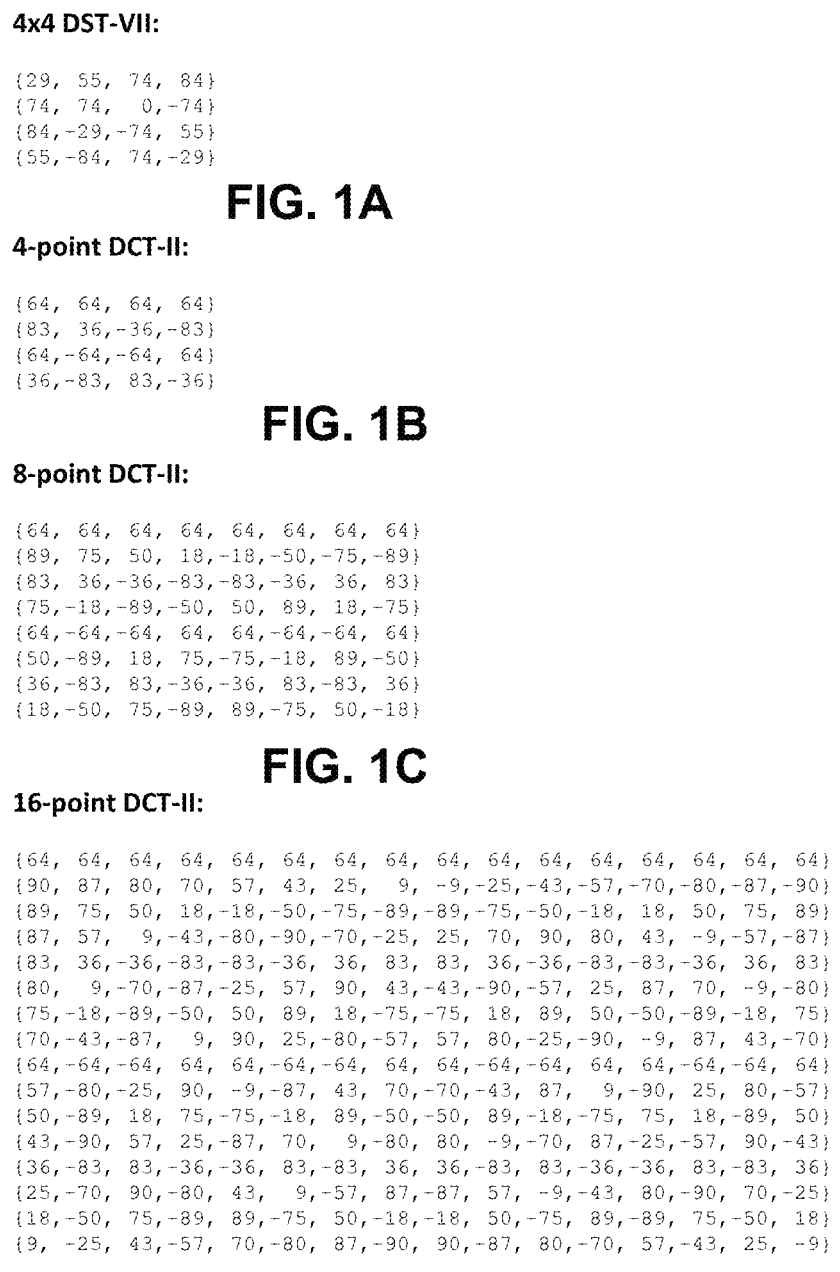

In HEVC, an integer approximation of 4-point DST Type-VII is applied only for 4×4 luma Intra prediction residual blocks (luma intra prediction residual blocks are described in more detail below). The 4-point DST-VII used in HEVC is shown in FIG. 1A.

Figure 1E:
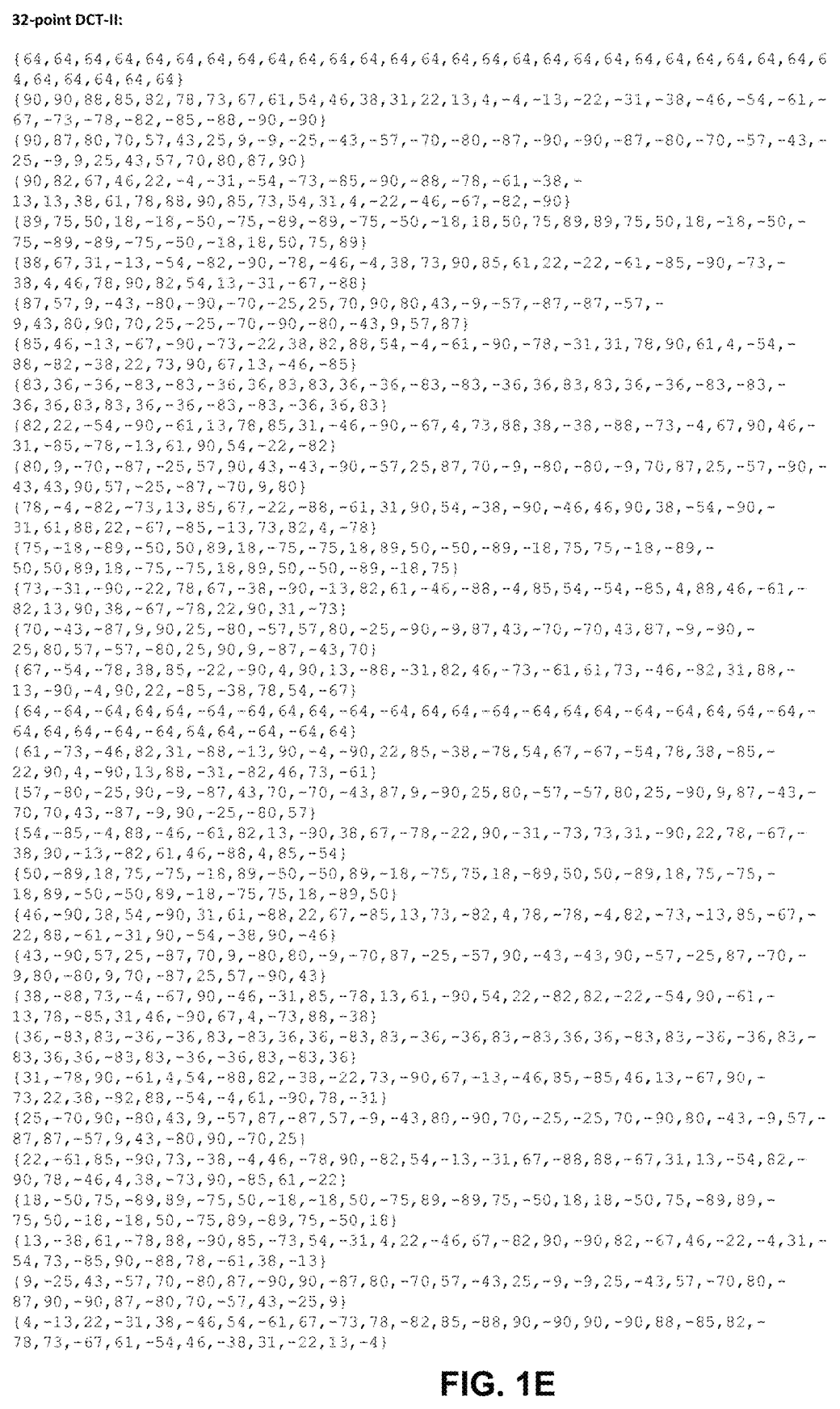

In HEVC, for residual blocks that are not 4×4 luma Intra prediction residual blocks, integer approximations of the 4-point, 8-point, 16-point and 32-point DCT Type-II are also applied. FIG. 1B illustrates an example of the 4-point DCT-II; FIG. 1C illustrates an example of the 8-point DCT-II; FIG. 1D illustrates an example of the 16-point DCT-II; and FIG. 1E illustrates an example of the 32-point DCT-II. FIGS. 1A-1E illustrate examples of differently sized DCTs of type II, and like FIGS. 1A-1E, there are examples of N-point DCTs and DSTs of different types.

FIG. 2 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Video encoder 20 and video decoder 30 of video coding system 10 represent examples of devices that may be configured to perform techniques for enhanced multiple transforms for prediction residual in accordance with various examples described in this disclosure.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 2 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 2, source device 12 includes a video source 18, a video encoder 20, and an output interface 22. In some examples, output interface 22 may include a modulator/demodulator (modem) and/or a transmitter. Video source 18 may include a video capture device (e.g., a video camera), a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 2, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as HEVC standard mentioned above, extensions of HEVC, or possibly a next generation of video coding standards in development. For ease of understanding only, the following provides some information regarding the HEVC standard. However, the techniques described in this disclosure should not be considered limited to the HEVC standard.

In HEVC and other video coding standards, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate (e.g., determine) the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate (e.g., determine) the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU. As described in more detail, this disclosure describes example ways in which video encoder 20 determines the transforms to use for generating the coefficient blocks.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use MVs of PUs to determine predictive blocks for the PUs of a current CU. In addition, video decoder 30 may inverse quantize transform coefficient blocks associated with TUs of the current CU.

Video decoder 30 may perform inverse transforms on the transform coefficient blocks to reconstruct transform blocks associated with the TUs of the current CU. This disclosure describes example techniques for the way in which video decoder 30 determines the transforms that are used to perform the inverse transforms on the transform coefficient blocks.

Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

As described above, a CU includes one or more TUs. The following describes transform scheme based on residual quadtree in HEVC. To adapt the various characteristics of the residual blocks, a transform coding structure using the residual quadtree (RQT) is applied in HEVC, which is briefly described in http://www.hhi.fraunhofer.de/fields-of-competence/image-processing/research-groups/image-video-coding/hevc-high-efficiency-video-coding/transform-coding-using-the-residual-quadtree-rqt.html.

As described above, each picture is divided into CTUs, which are coded in raster scan order for a specific tile or slice. A CTU is a square block and represents the root of a quadtree, i.e., the coding tree. The CTU size may range from 8×8 to 64×64 luma samples, but typically 64×64 is used. Each CTU can be further split into smaller square blocks called coding units (CUs). After the CTU is split recursively into CUs, each CU is further divided into prediction units (PU) and transform units (TU). The partitioning of a CU into TUs is carried out recursively based on a quadtree approach, therefore the residual signal of each CU is coded by a tree structure namely, the residual quadtree (RQT). The RQT allows TU sizes from 4×4 up to 32×32 luma samples.

Figure 3:
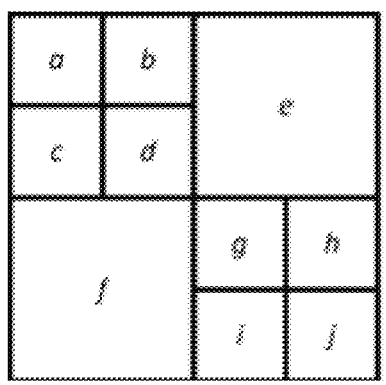
FIG. 3 is a conceptual diagram illustrating an example of a transform scheme based on residual quadtree in high efficiency video coding (HEVC).
Figure 3:
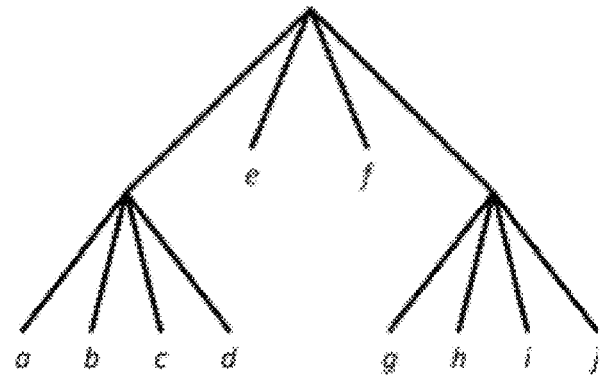

FIG. 3 shows an example where a CU includes 10 TUs, labeled with the letters "a" to "j," and the corresponding block partitioning. Each node of the RQT is actually a transform unit (TU). The individual TUs are processed in depth-first tree traversal order, which is illustrated in FIG. 3 as alphabetical order, which follows a recursive Z-scan with depth-first traversal. The quadtree approach enables the adaptation of the transform to the varying space-frequency characteristics of the residual signal. Typically, larger transform block sizes, which have larger spatial support, provide better frequency resolution. However, smaller transform block sizes, which have smaller spatial support, provide better spatial resolution. The trade-off between the two, spatial and frequency resolutions, is chosen by the encoder mode decision (e.g., by video encoder 20), for example, based on rate-distortion optimization technique. The rate-distortion optimization technique calculates a weighted sum of coding bits and reconstruction distortion, i.e., the rate-distortion cost, for each coding mode (e.g., a specific RQT splitting structure), and select the coding mode with least rate-distortion cost as the best mode.

Three parameters are defined in the RQT: the maximum depth of the tree, the minimum allowed transform size, and the maximum allowed transform size. The minimum and maximum transform sizes can vary within the range from 4×4 to 32×32 samples, which correspond to the supported block transforms mentioned in the previous paragraph. The maximum allowed depth of the RQT restricts the number of TUs. A maximum depth equal to zero means that a CB (coding block) cannot be split any further if each included TB (transform block) reaches the maximum allowed transform size, e.g., 32×32.

All these parameters interact and influence the RQT structure. Consider a case, in which the root CB size is 64×64, the maximum depth is equal to zero and the maximum transform size is equal to 32×32. In this case, the CB has to be partitioned at least once, since otherwise it would lead to a 64×64 TB, which is not allowed. In HEVC, larger size transforms, e.g., 64×64 transforms, are not adopted mainly due to its limited benefit considering and relatively high complexity for relatively smaller resolution videos.

The RQT parameters, i.e., maximum RQT depth, minimum and maximum transform size, are transmitted in the bitstream at the sequence parameter set level. Regarding the RQT depth, different values can be specified and signaled for intra and inter coded CUs (i.e., intra-predicted encoded CUs or inter-predicted decoded CUs or intra-predicted encoded CUs or inter-predicted CUs).

The quadtree transform is applied for both Intra and Inter residual blocks. Typically the DCT-II transform of the same size of the current residual quadtree partition is applied for a residual block. However, if the current residual quadtree block is 4×4 and is generated by Intra prediction, the above 4×4 DST-VII transform is applied.

Figure 4:
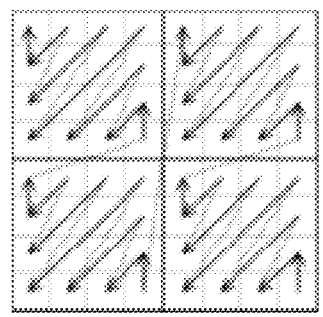
FIG. 4 is a conceptual diagram illustrating an example of a coefficient scan based on coding group in HEVC.

The following describes coefficient coding in HEVC. Regardless of the TU size, the residual of the transform unit is coded with non-overlapped coefficient groups (CG), and each contains the coefficients of a 4×4 block of a TU. For example, a 32×32 TU has totally 64 CGs, and a 16×16 TU has totally 16 CGs. The CGs inside a TU are coded according to a certain pre-defined scan order. When coding each CG, the coefficients inside the current CG are scanned and coded according to a certain pre-defined scan order for 4×4 block. FIG. 4 illustrates the coefficient scan for an 8×8 TU containing 4 CGs.

For each color component, one flag may be firstly signaled to indicate whether current transform unit has at least one non-zero coefficient. If there is at least one non-zero coefficient, the position of the last significant coefficient in the coefficient scan order in a transform unit is then explicitly coded with a coordination relative to the top-left corner of the transform unit. The vertical or horizontal component of the coordination is represented by its prefix and suffix, wherein prefix is binarized with truncated rice (TR) and suffix is binarized with fixed length.

last_sig_coeff_x_prefix specifies the prefix of the column position of the last significant coefficient in scanning order within a transform block. The values of last_sig_coeff_x_prefix shall be in the range of 0 to (log 2TrafoSize<<1)−1, inclusive.

last_sig_coeff_y_prefix specifies the prefix of the row position of the last significant coefficient in scanning order within a transform block. The values of last_sig_coeff_y_prefix shall be in the range of 0 to (log 2TrafoSize<<1)−1, inclusive.

last_sig_coeff_x_suffix specifies the suffix of the column position of the last significant coefficient in scanning order within a transform block. The values of last_sig_coeff_x_suffix shall be in the range of 0 to (1<<((last_sig_coeff_x_prefix>>1)−1))−1, inclusive.

The column position of the last significant coefficient in scanning order within a transform block LastSignificantCoeffX is derived as follows:

If last_sig_coeff_x_suffix is not present, the following applies:
LastSignificantCoeffX=last_sig_coeff_x_prefix
Otherwise (last_sig_coeff_x_suffix is present), the following applies:
LastSignificantCoeffX=(1<<((last_sig_coeff_x_prefix>>1)−1))*(2+(last_sig_coeff_x_prefix & 1))+last_sig_coeff_x_suffix last_sig_coeff_y_suffix specifies the suffix of the row position of the last significant coefficient in scanning order within a transform block. The values of last_sig_coeff_y_suffix shall be in the range of 0 to (1<<((last_sig_coeff_y_prefix>>1)−1))−1, inclusive.

The row position of the last significant coefficient in scanning order within a transform block LastSignificantCoeffY is derived as follows:

If last_sig_coeff_y_suffix is not present, the following applies:
LastSignificantCoeffY=last_sig_coeff_y_prefix
Otherwise (last_sig_coeff_y_suffix is present), the following applies:
LastSignificantCoeffY=(1<<((last_sig_coeff_y_prefix>>1)−1))*(2+(last_sig_coeff_y_prefix & 1))+last_sig_coeff_y_suffix When scanIdx is equal to 2, the coordinates are swapped as follows:
(LastSignificantCoeffX, LastSignificantCoeffY)=Swap (LastSignificantCoeffX, LastSignificantCoeffY)

With such a position coded and also the coefficient scanning order of the CGs, one flag is further signaled for CGs except the last CG (in scanning order), which indicates whether it contains non-zero coefficients. For those CGs that may contain non-zero coefficients, significant flags, absolute values of coefficients and sign information may be further coded for each coefficient according to the pre-defined 4×4 coefficient scan order.

As described above, the techniques described in this disclosure describe ways to determine the transform that video encoder 20 applies to convert a transform block to a coefficient block and ways to determine the transform that video decoder 30 applies (e.g., as an inverse transform) to convert a coefficient block to a transform block. The following describes multiple transform for intra and inter prediction residual (e.g., different transform types for when the residual block is generated from intra-prediction and for when the residual block is generated from inter-prediction).

In some cases, despite the fact that DST Type-VII can efficiently improve the intra coding efficiency compared to the conventional DCT Type-II, the transform efficiency is relatively limited because prediction residuals present various statistics, and fixed usage of DCT Type-II and DST Type-VII cannot efficiently adapt to all the possible cases. Some techniques have been proposed to adapt to different cases.

In S.-C. Lim, D.-Y. Kim, S. Jeong, J. S. Choi, H. Choi, and Y.-L. Lee, "Rate-distortion optimized adaptive transform coding," Opt. Eng., vol. 48, no. 8, pp. 087004-1-087004-14, August 2009, a new transform scheme which adaptively employs integer version of DCT or DST for prediction residue is proposed, for each block it is signaled whether the DCT or DST transform is used for the prediction residue. In Y. Ye and M. Karczewicz, "Improved H.264 intra coding based on bidirectional intra prediction, directional transform, and adaptive coefficient scanning," in Proc. 15th IEEE Int. Conf. Image Process., October 2008, pp. 2116-2119, it has been proposed that each Intra prediction mode can be mapped to a unique pair of transform (C and R), a pre-defined as KLT pair, so that mode dependent transform (MDDT) applies. This way, different KLT transforms can be used for different Intra prediction modes; however, which transform to be used is predefined and dependent on the intra prediction mode.

In X. Zhao, L. Zhang, S. W. Ma, and W. Gao, "Video coding with rate-distortion optimized transform," IEEE Trans. Circuits Syst. Video Technol., vol. 22, no. 1, pp. 138-151, January 2012, however, more transforms can be used and an index to the transforms from a pre-defined set of transform candidates which are derived from off-line training process is explicitly signaled. Similar to MDDT, each Intra prediction direction may have its unique set of pairs of transforms. An index is signaled to specify which transform pair is chosen from the set. For example, there are up to four vertical KLT transforms and up to four horizontal KLT transforms for smallest block sizes 4×4; therefore 16 combinations may be chosen. For larger block sizes, less number of combinations are used. The proposed method in "Video coding with rate-distortion optimized transform" applies to both Intra and Inter prediction residual. For Inter prediction residual, up to 16 combinations of KLT transforms can be chosen and the index to one of the combinations (four for 4×4 and sixteen for 8×8) is signaled for each block.

In A. Saxena and F. Fernandes, "DCT/DST-based transform coding for intra prediction in image/video coding," IEEE Trans. Image Processing and C. Yeo, Y. H. Tan, Z. Li, and S. Rahardja, "Mode-dependent transforms for coding directional intra prediction residuals," IEEE Trans. Circuits Syst. Video Technol., vol. 22, no. 4, pp. 545-554, 2012, multiple transforms are used; however, instead of using KLT transforms (which typically need to be trained), either DCT (DCT-II) or DST (DST-VII) is used for a transform unit (with both left and right transforms (e.g., C and R) being the same) and which one to be used is determined by a signaled flag. In F. Zou, O. C. Au, C. Pang, J. Dai, and F. Lu, "Rate-Distortion Optimized Transforms Based on the Lloyd-Type Algorithm for Intra Block Coding," IEEE Journal of Selected Topics in Signal Processing, Volume: 7, Issue: 6, November 2013, several pre-defined KLT transform pairs are used, and an index to a transform pair is signaled (instead of derived) for a coding unit, so that each transform unit of the coding unit uses the same pair of transforms.

In J. An, X. Zhao, X. Guo and S. Lei, "Non-CE7: Boundary-Dependent Transform for Inter-Predicted Residue," JCTVC-G281, multiple transforms are chosen for inter predicted residual of TUs according to their locations within a CU. Both the C and R transforms are chosen from DST-VII and the flipped version of DST-VII. Therefore, up to four combinations are possible for the TUs within a CU. However, since the combination is fully determined by the location of the PUs, there is no need to signal which combination is being used.

There may be certain problems with techniques related to transforms for residuals (e.g., problems for intra-predicted residuals that result from intra-predication, but may be applicable to inter-predicted residuals that result from inter-prediction as well). The existing methods may use a couple of DST or DCT transforms for Intra predicted residual. However, those transforms cannot cover all the possible distributions of the residual signal.

For example, only DCT Type-II is applied for Intra prediction residual blocks larger than or equal to 8×8 in HEVC, which cannot adapt to the varying statistics of Intra prediction residual. Only DCT Type-II is applied for Inter prediction residual in HEVC, which cannot adapt to the varying statistics of Inter prediction residual. Simply choosing the transform depending on transform block size or Intra prediction modes is not very efficient because the residual statistics may still have large variation even under the same Intra prediction mode or same transform size.

This disclosure describes the following techniques. In some examples, one or more of the following techniques may address one or more of the above mentioned problems. However, it is not a requirement that the following techniques address one or more of the above mentioned problems. The following techniques may be applied individually. In some cases, any combination of the example techniques may be applied. For instance, video encoder 20 and video decoder 30 may apply the techniques individually, or, in some cases, apply any combination of the one or more techniques.

In some examples, in addition to the DCT-II based transform used in HEVC, for each residual block generated by an intra-prediction mode, video encoder 20 and video decoder 30 may select the transforms from two or more candidate transforms from DCT and DST families. As one example, the candidate transforms may belong to the total 16 transforms based on different types of the DCT and DST families, and may include, but are not limited to the DCT-I~DCT-VIII, DST-I~DST-VIII. Alternatively or in addition, video encoder 20 and video decoder 30 may use other sinusoidal unitary transforms, or even other KLT transforms may be used. For each TU, the horizontal and vertical transforms (e.g., right and left transforms) may be the same type. For example, the candidate transforms are DST-VII, DCT-VIII, DST-I and DST-V.

As described above, there are 16 transforms (e.g., DCT-I to DCT-VIII and DST-I to DST-VIII). One way to identify which transforms to use is for video encoder 20 and video decoder 30 to construct a list of these 16 transforms. Video encoder 20 may then signal (e.g., generate in the bitstream) a first index into the list to identify the left transform (e.g., transform C for the equation $Y=C*X*R^T$, where X is the transform block and Y is the resulting coefficient block) and signal (e.g., generate in the bitstream) a second index into the list to identify the right transform (e.g., transform R for the equation $Y=C*X*R^T$). Video decoder 30 would then receive the first index and the second index from the bitstream and determine the transforms C and R that video decoder 30 is to use to inverse transform the coefficient block back to a transform block.

In this example, the value of the first index may range from 0 to 15, and the value of the second index may range from 0 to 15. In general, coding larger numbers requires signaling more bits than coding smaller numbers (e.g., indicating index value 15 requires more bits than indicating index value 2). In the case where the list includes all 16 transforms, there may be signaling overhead that consumes more bandwidth than desirable. However, limiting options as to which transforms can be used, as done in HEVC, may reduce signaling overhead but negatively impact coding efficiency as better transforms are not usable.

In the techniques described in this disclosure, video encoder 20 and video decoder 30 may be able to determine the left and right transform from a relatively large amount of candidate transforms with low impact on signaling overhead. As one example, video encoder 20 and video decoder 30 may each determine a plurality of transform subsets, where each transform subset identifies a plurality of candidate transforms.

For example, video encoder 20 and video decoder 30 may each construct the following three transform subsets and store the transform subsets in memory: transform subset 0: {DST-VII, DCT-VIII}, transform subset 1: {DST-VII, DST-I}, and transform subset 2: {DST-VII, DCT-V}. In some examples, these three transforms may be pre-stored in memory of video encoder 20 and video decoder 30. In any event, video encoder 20 and video decoder 30 may be considered as determining these three transform subsets, where each of the three transform subset identifies a plurality of candidate transforms (e.g., two transforms in this example). The plurality of transform subsets may include more than or less than three transform subsets, and generally includes two or more transform subsets. Each transform subset may include one or more candidate transforms, but at least one identifies a plurality of candidate transforms. For instance, some transform subsets may identify only one transform, and others may identify two or more transforms. In some examples, each transform subset may identify a relatively small number of transforms (e.g., less than or equal to 5).

In the techniques described in this disclosure, video encoder 20 and video decoder 30 may determine corresponding transform subsets. For instance, if the stored transform subsets in video encoder 20 are transform subset 0: {DST-VII, DCT-VIII}, transform subset 1: {DST-VII, DST-I}, and transform subset 2: {DST-VII, DCT-V}, then video decoder 30 may store inverse transform subsets: inverse-transform subset 0: {IDST-VII, IDCT-VIII}, inverse-transform subset 1: {IDST-VII, IDST-I}, and inverse-transform subset 2: {IDST-VII, IDCT-V}. As another example, video decoder 30 may store the same transforms as video encoder 20 and may invert them prior to applying the inverse-transform. In either example, video encoder 20 and video decoder 30 may be considered as storing corresponding transform subsets (e.g., the same subsets or subsets having inverse transforms of each other).

Video encoder 20 and video decoder 30 may utilize implicit techniques to select transform subsets for the left and right transforms. Implicit techniques means that video encoder 20 does not need to signal information to video decoder 30 instructing video decoder 30 about which transform subsets to select. Video encoder 20 and video decoder 30 may be configured to perform the same implicit technique to select transform subsets resulting in video encoder 20 and video decoder 30 selecting the same transform subsets without any increase in the amount of information that needs to be signaled.

As one example, if the transform block is generated from intra-prediction, video encoder 20 and video decoder 30 may determine which transform subsets to select based on the intra-prediction mode. For instance, video encoder 20 and video decoder 30 may each store a table that maps an intra-prediction mode to a transform subset from which the left transform is to be determined and to a transform subset from which the right transform is to be determined.

As an example, video encoder 20 may intra-prediction encode a current block in intra-prediction mode X. In this example, video encoder 20 generates a transform block from the residual block generated from intra-prediction encoding the current block in intra-prediction mode X. Video encoder 20 may select a transform subset for the left transform based on the intra-prediction mode X and select a transform subset for the right transform based on the intra-prediction mode X. Video encoder 20 may determine left and right transforms from respective selected transform subsets, as described in more detail below, and apply the transforms to generate the coefficient block.

Video encoder 20 may generate a video bitstream that includes information indicative of the coefficient values off the coefficient block as well as information indicating that the transform block that is generated from the coefficient block is for a block that was intra-prediction encoded using intra-prediction mode X. Video decoder 30 may generate the coefficient block from the signaled information and determine that the intra-prediction mode was mode X also from the signaled information. Video decoder 30 may select a transform subset for the left transform (which in this case will be an inverse of the transform applied by video encoder 20) and a transform subset for the right transform (which in this case will be an inverse of the transform applied by video encoder 20) based on the intra-prediction mode being mode X.

The stored mapping indicating which transform subsets map to which intra-prediction mode is the same on the video encoder 20 side and the video decoder 30 side. Therefore, video encoder 20 and video decoder 30 select the corresponding transform subsets. Video decoder 30 may determine left and right transforms from respective selected transform subsets, as described in more detail below, and apply the transforms to generate the transform block.

Although the above example is described with respect to intra-prediction modes, the techniques described in this disclosure are not so limited. In some examples, rather than intra-prediction modes, video encoder 20 and video decoder

30 may select respective transform subsets based on other information such as RQT depth, quantized coefficients, and the like.

Also, although the above example is described for intra-prediction, the techniques described in this disclosure may be extended to inter-prediction as well. For example, similar to above, video encoder 20 and video decoder 30 may determine a plurality of transform subsets. These plurality of transform subsets for the inter-prediction case may be the same or different than the plurality of transform subsets for the intra-prediction case. In some cases, the plurality of transform subsets for the inter-prediction case may be the same as some, but not all, of the plurality of transform subset for the intra-prediction case.

For inter-prediction, video encoder 20 and video decoder 30 may store mapping between position of the transform block relative to the PU, CU, or LCU with which it is associated. For instance, the mapping may indicate that if the transform block is at left boundary of PU, CU, or LCU, a first group of the transform subsets is selected (e.g., one transform subset for the left transform and one transform subset for the right transform). If the transform block is at a right boundary of a PU, CU, or LCU, a second group of transform subsets is selected, and so forth for the top and bottom boundaries, where in each case, video encoder 20 and video decoder 30 select one transform subset for the left transform and one transform subset for the right transform.

Video encoder 20 and video decoder 30 may encode and decode blocks of the picture in a particular order. Accordingly, based on the location of the just encoded or decoded block, video encoder 20 and video decoder 30 may determine the location of the transform block in the PU, CU, or LCU. Again, from the perspective of video decoder 30, video decoder 30 is generating the transform block from a coefficient block. However, based on the decoding order, video decoder 30 may be able to determine the location of the transform block that is to be generated from the coefficient block.

In this way, video encoder 20 and video decoder 30 may determine respective transform subsets from which the left transform and right transform are to be determined without any increase in the amount of information that needs to be signaled. In some examples, after video encoder 20 selects the transform subsets, video encoder 20 may signal information (e.g., generate in the video bitstream information) indicating which transform in the selected transform subsets is for the left transform and which transform is for the right transform. Video decoder 30 receives the signaled information and determines the left and right transforms.

For instance, video encoder 20 may signal (e.g., generate in the bitstream) an index into the transform subset selected for the left transform and signal (e.g., generate in the bitstream) an index into the transform subset selected for the right transform. Video decoder 30 may receive the respective indices into the respective transform subsets, and determine the left and right transform.

In this example, there may be an increase in the information that needs to be signaled (e.g., indices to determine the left and right transforms are signaled). However, the increase in the information that needs to be signaled may be minimal. As described above, each of the transform subsets may identify a relatively small number of transforms. Therefore, the range of the index value may be relatively small (e.g., 0 to 4 if the maximum number of transforms that each transform subset identifies is 5).

Accordingly, for a relatively small increase in signaling overhead, the techniques described in this disclosure allow for a relatively large increase in the number of transforms that can be selected. For example, because there are a plurality of transform subsets each including one or more transforms, many, and possibly all, of the 16 example transforms may be identified in one or more of the transforms. Because the transform subsets are selected with implicit techniques there is no increase in signaling overhead and because each transform subset identifies a relatively small number of transforms, identifying a particular transform does not drastically increase the signaling overhead.

In some examples, it may be possible to further reduce the amount of signaling overhead. For instance, in some examples, video encoder 20 and video decoder 30 may select transform subsets as described above, but then be configured to determine a particular transform from each of the respective transform subsets based on certain conditions. In this case, video encoder 20 may not need to signal and video decoder 30 may not need to receive information indicating which transform within the selected transform subsets to use.

As an example, during the encoding process, video encoder 20 may use a particular transform from the selected transform subset (e.g., the first identified transform in the selected transform subset), and after the transform is applied, determine that the number of nonzero coefficients in the resulting coefficient block is less than the threshold. In this case, video decoder 30 may receive the information indicating the coefficient values of the coefficient block and similarly determine that the number of nonzero coefficients is less than the threshold. In some examples, if video decoder 30 determines that the number of nonzero coefficients in the coefficient block is less than the threshold (e.g., 1 or 2), then video decoder 30 may determine that video decoder 30 should use a particular transform from the selected transform subset (e.g., the first identified transform in the selected transform subset).

For instance, assume that based on the intra-prediction mode, video encoder 20 determined that the transform subset for the left transform is subset 0 and for the right transform is subset 1. In this case, video encoder 20 may determine that if the first identified transform in subset 0 is used as the left transform and if the first identified transform in subset 1 is used as the right transform, the number of nonzero coefficients in the resulting coefficient block is less than a threshold value. In this example, video encoder 20 may not signal information indicating that first identified transform in subset 0 and subset 1 is to be used as the left and right transforms, respectively. In other cases, if the first identified transform in subset 0 (or subset 1) is not used as the left transform (or right transform), the number of nonzero coefficients in the resulting coefficient block is less than a threshold value. In this example, video encoder 20 adds a restriction that the identified transforms in subset 0 and subset 1 cannot be used as the left and right transform.

Video decoder 30 may receive the intra-prediction mode and like video encoder 20 determine that transform subset 0 and transform subset 1 are to be selected for the left and right transforms, respectively, based on the intra-prediction mode. Also, after generating the coefficient block from the information indicating the coefficient values, video decoder 30 may also determine that the number of nonzero coefficients in the coefficient block is less than the threshold. Video decoder 30 may determine that a first identified transform in subset 0 and a first identified transform in subset 1 are to be used as the left and right transforms, respectively, without receiving this information from video encoder 20 because the number of nonzero coefficients is less than the threshold.

In the above examples, the transforms subsets are formed from 16 transforms (i.e., eight DCTs and eight DSTs). However, the techniques described in this disclosure are not so limited. Additional examples of transforms include the KLT transforms. Accordingly, the transform subsets may include one or more transforms from the eight DCTs, eight DSTs, KLT transforms, and other transform examples. Solely for ease of description, the examples are described with respect to the eight DCTs and eight DSTs.

As a summary, in some of the examples described in this disclosure, a pre-selection from three or more candidate transforms is performed to formulate a subset of transforms, and the final transform to be used for a current TU is chosen from the subset of transforms. For example, the subset of transforms may composite a subset of left transforms and/or a subset of right transforms. The pre-selection to formulate the subset of transforms (or the subset of left transforms and the subset of right transforms) may be determined by already decoded information such as Intra prediction modes, RQT depth, quantized coefficients, etc.

The number of subsets of transform may be limited to a small integer, e.g., 1, 2, 3 or 4, and different subsets of transform contain different type of transforms. In one example, three subsets of transforms, each containing two transforms, are created. Based on a given Intra prediction mode, the subset of left transforms is set to one of the three subsets and the subset of right transforms is also set to one of the three subsets (may or may not be the same as the subset of left transforms). As an example, the three subsets of transforms are: {DST-VII, DCT-VIII}, {DST-VII, DST-I} and {DST-VII, DCT-V}. Either the subset of left transforms or the subset of right transforms can be one of the above three subsets. Therefore, various Intra prediction modes may correspond to up to 9 different combinations of the subsets for left and right transforms. Alternatively or additionally, the subset of left transforms or the subset of right transforms contain only one transform. Alternatively or additionally, both the subset of left transforms and the subset of right transforms may contain only one transform.

In the examples described above, the transform subsets and the transforms identified in the transform subsets may be the same regardless of the TU size and the number of transforms in the transform subsets may be the same for the different intra-prediction modes. However, the techniques described in this disclosure are not so limited.

In some examples, for different TU sizes, the number of transforms in a subset of left/right transforms can be different, a typical number of may be, but not limited to 2, 3 and 4. For different Intra prediction modes, the number of transforms in a subset of left/right transforms can be different; a typical number of transforms may be, but is not limited to 2, 3 and 4.

As described above, when a subset of transforms has been pre-selected, the final transform to be used may be signaled by an index to the subset of transforms. When a subset of left transforms (or a subset of right transforms) contains two or more transforms, an index to a transform belonging to the subset of left transforms (or the subset of right transforms) is signaled. That means, when the number of the subset of left or right transforms is equal to 1, there is no need to signal the index of transforms.

The above examples described the case where video encoder 20 and video decoder 30 may pre-select to formulate transform subsets. However, the examples described in this disclosure are not so limited. Alternatively or additionally, there may be no need to do the pre-selection to formulate the subsets of transforms and one index to the two or more candidate transforms (as the full set) is directly signaled to indicate the left or the right transform. For example, at video encoder 20, a constraint may be introduced that only some of transforms within the full set may be tested and other transforms are not tested to reduce the encoder complexity. Which transforms to be selected and the indexes of transforms may depend on the Intra prediction mode or other information.

In some examples, for each TU, it may be constrained that for the left transform (right transform), video encoder 20 and video decoder 30 may select the left and right transform from a subset of the candidate transforms. For example, the only one subset of transforms contains DST-VII, DCT-VIII and DCT-II, and the left transform for each TU is always selected from {DST-VII, DCT-VIII and DCT-II}, and the right transform for each TU is also always selected from {DST-VII, DCT-VIII and DCT-II}.

As described above, the example techniques described in this disclosure may be applicable to both intra-prediction and inter-prediction. In HEVC, for a transform block generated from inter-prediction, only the DCT-II based transform was available. In some examples, in addition to the conventional DCT-II based transform as in HEVC, for each residual block generated by an Inter prediction mode, video encoder 20 and video decoder 30 may select the transforms from two or more candidate transforms methods from DCT and DST families or other transforms, e.g., KLT, in addition to that a subset of left transforms and a subset of right transforms are created. Similar to the above example for intra-prediction, video encoder 20 may signal (e.g., generate in the bitstream) and video decoder 30 may receive in the bitstream an index to the subset of left transforms and an index to the subset of right transforms for each TU to determine the left and right transforms.

As one example, two transforms, e.g., DST-VII and DCT-VIII are put in the subset of left transforms and the subset of right transforms. A one-bit index to each of these subsets determines the final left and right transforms of a current TU. The subsets can be either {DST-VII, DCT-VIII} or {DST-VIII, DCT-VII}.

Alternatively or additionally, a pre-selection from three or more candidate transforms is performed to formulate a subset of transforms and the final transform to be used for a current TU is chosen from the subset of transforms. For example, the pre-selection to formulate the subset of transforms (or the subset of left transforms and the subset of right transforms) may be determined by the relative position of current TU to the belonging PU, i.e., whether the current TU is located at the top boundary, left boundary, right boundary, bottom boundary or other position of the belonging PU.

In one example, three subsets of transforms, each containing two transforms, are created. Based on the relative position of the current TU to the belonging PU, the subset of left transforms is set to one of the three subsets and the subset of right transforms is also set to one of the three subsets (may or may not be the same as the subset of left transforms). Alternatively or additionally, the subset of left transforms or the subset of right transforms contain only one transform. Alternatively or additionally, both the subset of left transforms and the subset of right transforms may contain only one transform.

In the above examples, video encoder 20 and video decoder 30 may select transform subsets for each TU of a CU and then determine left and right transforms for each TU as described above. In this example, the determination of which transforms to use is considered to be at the TU level. However, the example techniques described in this disclosure are not so limited.

In some cases, video encoder 20 may determine that the left and right transforms for each TU of a CU should be a same default transform (e.g., DCT-II as one example, but other transform types are possible as well). Also, there may be a default transform for the left transform and a default transform for the right transform, or the default transform for the left transform and the right transform may be the same. In the following description, the term "default transform" should be interpreted to include both the case where the default transform for the left and right transforms is different and where the default transform for the left and right transforms is the same. For instance, the default transform for the left and right transform (e.g., where different or same) may be pre-selected and be the same for video encoder 20 and video decoder 30.

If video encoder 20 determines that each TU of a CU should have the same default transform, video encoder 20 may signal information indicating as such (e.g., generate in the video bitstream information indicating as such). In this example, video encoder 20 may not signal indices into transform subsets, which reduces the amount of information that needs to be signaled, because video decoder 30 may determine that the default transform is to be used for each TU of the CU based on the received information.

As an example, video encoder 20 may signal (e.g., generate in the bitstream) a flag indicating whether each TU of the CU is to apply the same default transform. If the flag is of a first value (e.g., a digital high), then each TU of the CU was applied with the same default transform. If the flag is of a second value (e.g., a digital low), then at least one TU of the CU was applied with a transform other than the default transform. In the case where at least one TU of the CU was applied with a different transform, video encoder 20 may select transform subsets and signal indices in the transform subsets, if needed (e.g., nonzero coefficients greater than threshold), as described above. In the case where each TU of the CU was applied with the same default transform, video encoder 20 may not signal any indices in any of the transform subsets as video decoder 30 may already determine which transform to use.

Video decoder 30 may receive the flag indicating whether each TU of the CU is to apply the same default transform. If the flag is of the first value, video decoder 30 may determine that no transform subsets are to be selected and no indices into transform subsets are to be parsed (e.g., received) from the bitstream. In this case, video decoder 30 may apply the default transform to each coefficient block of the CU. If the flag is of the second value, video decoder 30 may determine that transform subsets are to be selected, determine whether indices are to be received (e.g., based on number of nonzero coefficients), and receive the indices in the selected transform subsets based on the determination that the indices are to be received.

In the above example, the flag indicating whether each TU is to use the same default transform is at the CU level (e.g., indicating that each TU of the CU use the same default transform). In some examples, rather than at the CU level, the flag may be at the CTU level or PU level.

For example, video encoder 20 may signal (e.g., generate in the bitstream) a flag indicating whether all transform blocks of a block are transformed using the same transform. In response to receiving the flag indicating that not all transform blocks of the block are transformed using the same transform, video decoder 30 may select transform subsets and determine indices in the selected transforms as described above. In response to receiving the flag indicting that all transform blocks of the block are transformed using the same transform, video decoder 30 may use that transform for each of the transform block of the block. In this example, the "block" may be one of a CTU, a CU, or a PU, as a few examples.

As a summary, signaling of the transforms to be used for each TU can be done in TU level when the current CU utilizes the additional transforms are used, e.g., as described above. For example, video encoder 20 may send one flag for each CU indicating whether the TUs within it are coded with additional transforms (e.g., using transforms other than those in HEVC). Alternatively or additionally, such indication may be signaled at LCU level (CTU level), CU level, PU level, TU or any other block level.

When the flag indicates that no TU within the CU is coded with additional transforms, all the TUs are coded with one default transform. In one example, the default transform is DCT-II. Alternatively or additionally, the default transform may depend on intra/inter modes, intra prediction mode, block size, TU position within a PU, or any other statistics of the current TU. For example, as described above, video encoder 20 and video decoder 30 may determine the same default transform, and the condition for which default transform to use may be based on factors such as intra/inter modes, intra prediction mode, block size, TU position within a PU, or any other statistics of the current TU. In this way, by using default transforms, the amount of information that needs to be signaled may be reduced.

In addition, indications can be present in different hierarchies. For example, video encoder 20 may first signal (e.g., generate in the bitstream) a one-bit flag at LCU (CTU) level, if the one-bit flag is 0, video encoder 20 and video decoder 30 may only apply DCT-II for each CU, otherwise if the one-bit flag is 1, video encoder 20 may signal another flag at CU level specifying whether TUs within the CU can use multiple transforms or just a default transform.

In this example, video decoder 30 may determine at each hierarchical level whether all TUs within a particular hierarchical level use a default transform. For example, if the flag at the CTU level indicates that all TUs of the CTU are to use the same default transform, then video decoder 30 may use the same default transform for all TUs of the CTU. If the flag at the CTU level indicates that not all TUs of the CTU are to use the same default transform, then video decoder 30 may select transform subsets and determine transforms for each TU of the CTU as described above.

In some cases, rather than stopping at the CTU level and determining transforms for each TU, there may be another flag for each of the CUs of the CTU. For example, video decoder 30 may receive a flag for each CU of the CTU indicating whether all TUs of the CU use the same default transform or do not use the same default transform. If for a CU, video decoder 30 receives a flag indicating that all TUs of the CU use the same default transform, video decoder 30 may apply the default transform. If for a CU, video decoder 30 receives a flag indicating that not all TUs of the CU use the same default transform, video decoder 30 may select transform subsets and determine transforms for each TU of the CU as described above.

In some cases, rather than stopping at the CU level and determining transforms for each TU, there may be another flag for each of the PUs of the CU. For example, video decoder 30 may receive a flag for each PU of the CU indicating whether all TUs of the PU use the same default transform or do not use the same default transform. If for a PU, video decoder 30 receives a flag indicating that all TUs of the PU use the same default transform, video decoder 30 may apply the default transform. If for a PU, video decoder 30 receives a flag indicating that not all TUs of the PU use the same default transform, video decoder 30 may select transform subsets and determine transforms for each TU of the PU as described above.

Alternatively or additionally, furthermore, when the overlapped block motion compensation (OBMC) flag of a CU is signaled as off, the one-bit flag, which indicates whether only one default transform is applied, is not signaled for the current CU and is inferred as a default value (e.g., 0) which indicates a default transform (e.g., DCT-II) is applied. Alternatively or additionally, the CABAC context modeling of the one-bit flag of one block, which indicates whether only one default transform is applied, is dependent on the OBMC flag of the current block when OBMC is allowed for the current slice (e.g., dependent on a value of the OBMC flag).

In one example, when the OBMC flag (either implicitly derived or explicitly signaled) is true (i.e., equal to 1), video encoder 20 and video decoder 30 may use one set of context models for CABAC-encoding or CABAC-decoding the one-bit flag. When the OBMC flag is false (i.e., equal to 0), another set of context models may be used for coding the one-bit flag. Alternatively or additionally, furthermore, the initialized probabilities of the two sets of context models may be different. Alternatively or additionally, the CABAC context modeling of the one-bit flag of one block, which indicates whether only one default transform is applied, is dependent on the value of the corresponding one-bit flag of the spatial neighboring blocks (e.g., a left neighboring block and/or an above neighboring block) or the temporal neighboring blocks (e.g., the co-located block in a reference picture).

When a CU has additional transforms enabled (e.g., meaning more the limited choices of HEVC), for each TU, video encoder 20 may signal and video decoder 30 may receive indices to the transforms from candidate transforms (of a set or subset) as described above. Alternatively or additionally, video encoder 20 may signal such information and video decoder 30 may receive such information at LCU level, CU level, PU level, or any other block level. When video encoder 20 signals the indicator is at LCU level, CU level, PU level or any other block level, all the included TUs within that level may use the same pair of transforms.

For instance, video encoder 20 and video decoder 30 may select transform subsets as described above (e.g., based on intra-prediction mode or based on location of TU for inter-prediction). In some examples, for each transform block, video encoder 20 may signal indices and video decoder 30 may receive indices for each transform block. However, in some examples, rather than receiving indices for each transform block, video encoder 20 may signal one index for the left transform and one index for the right transform for all TUs of a CTU, all TUs of a CU, or all TUs of a PU, as a few examples. In this example, for each transform subset that video decoder 30 selects for the right and left transforms for a TU, video decoder 30 may apply the transform identified by the index for all of the TUs of a block (e.g., of a CUT, CU, or PU).

In other words, in some case, the indices into the transform subsets may be considered as more "global." For example, video encoder 20 may signal indices for the left transform and the right transform. In this case, the indices may be global in the sense that the indices are the same for each TU of a block regardless of the particular transform subsets that are selected, where the block is a CTU, CU, or PU. In such examples, video decoder 30 may determine the left and right transforms from the selected transform subsets from these global indices. For instance, video decoder 30 may not parse indices for each selected transform subset for each transform block, but rather identify the transform for all transform blocks of a block (e.g., CTU, CU, or PU) based on the global indices.

As described above, in some examples, video encoder 20 may not signal indices into selected transform subsets. For example, for certain TUs, the signaling of the additional transforms may be skipped if the energy of the residual signal is limited, e.g., if there is no nonzero coefficient transmitted for the current TU. Similar skipping of additional transform signaling may apply to LCU, CU, PU or any other block level.

Alternatively or additionally, the indicator at a certain block level may be skipped if the total number or the total absolute sum or the sum of squared value of nonzero coefficients transmitted at that certain block level is smaller than a given threshold value. In other words, video encoder 20 may not signal indices into selected transform subsets if the total number or the total absolute sum or the sum of squared value of nonzero coefficients of a coefficient block is smaller than a threshold value. In such examples, if video decoder 30 determines that the total number or the total absolute sum or the sum of squared value of nonzero coefficients is smaller than a given threshold value, then video decoder 30 may determine that indices into the selected transforms subsets is not be received (e.g., parsed) from the bitstream.

In one example, the threshold value of total number of nonzero coefficients is 2. Alternatively or additionally, the threshold value for total number of nonzero coefficients may be different for different block sizes or different Intra prediction modes.

In some examples, when the size of LCU, CU, PU or block is larger than or smaller than a pre-defined threshold value, or within a given threshold value range, video encoder 20 may skip signaling of the indicator (e.g., indices into transform subsets) and video encoder 20 and video decoder 30 may apply only a default transform type. In one example, the default transform is DCT-II. Furthermore, when the CU size is larger than 32×32, video encoder 20 may not signal the indicator and video encoder 20 and video decoder 30 may only apply the DCT-II for each TU.

Video encoder 20 and video decoder 30 may binarize the indicators (e.g., indices into the transform subsets) using, for example, fixed-length code, truncated unary code or exponential Golomb code. Video encoder 20 and video decoder 30 may entropy code (e.g., encode or decode, respectively) indicators using CABC with contexts, and for each bin, one context is applied. In one example, the context model is selected based on the bin index. In another example, furthermore, the intra prediction mode or TU size or TU depth is also considered when selecting the context models. Alternatively or additionally, partial of bins are coded with context models and remaining bins are coded with bypass mode. Alternatively or additionally, indicators may be bypass coded, i.e., no context modeling is applied.

In the example techniques, video encoder 20 may signal various information in the bitstream and video decoder 30 may receive such information from the bitstream. Video encoder 20 may signal such information and video decoder 30 may receive such information from different locations.

As one example, syntax related to the multiple transforms can be present in high-level syntax. Video encoder 20 may signal (e.g., generate in the bitstream) and video decoder 30 may receive the number of candidate transforms, as described above with respect to the transforms being selected from two or more candidate transforms, to be used in the picture parameter set (PPS), sequence parameter set (SPS) or any other places, including even at the slice header. Video encoder 20 may signal (e.g., generate in the bitstream) and video decoder 30 may receive the number of candidate transforms in each subset, as described above with respect to the pre-selection from three or more candidate transforms, at slice header, picture parameter set (PPS), sequence parameter set (SPS) or any other places.

A flag or index can be signaled at slice header, PPS, SPS or any other places to indicate whether the above mentioned multiple transform is applied at block level. As described above, one dedicated value of this flag or index may indicate that all the TUs are coded with one default transform. Additionally or alternatively, one dedicated value of this flag or index may indicate that a flag/index or flags/indexes may be signaled at block level for transform selection at block level. Also, the size of the block for which multiple transforms do not apply (when a size is larger than a signaled size or smaller than a signaled size or in a range of two signaled sizes) may be present in a parameter set, e.g., picture parameter set or sequence parameter set.

To reiterate, the above description utilizes the term "transform." However, it should be understood that video encoder 20 utilizes a transform to generate a transform block of transform coefficient values from a residual block. Video decoder 30, on the other hand, utilizes an inverse-transform to generate a residual block of residual values from the transform block. Accordingly, in the above description, it should be understood that the description of a transform is equally applicable to video decoder 30; however, video decoder 30 utilizes an inverse-transform.

Figure 5:
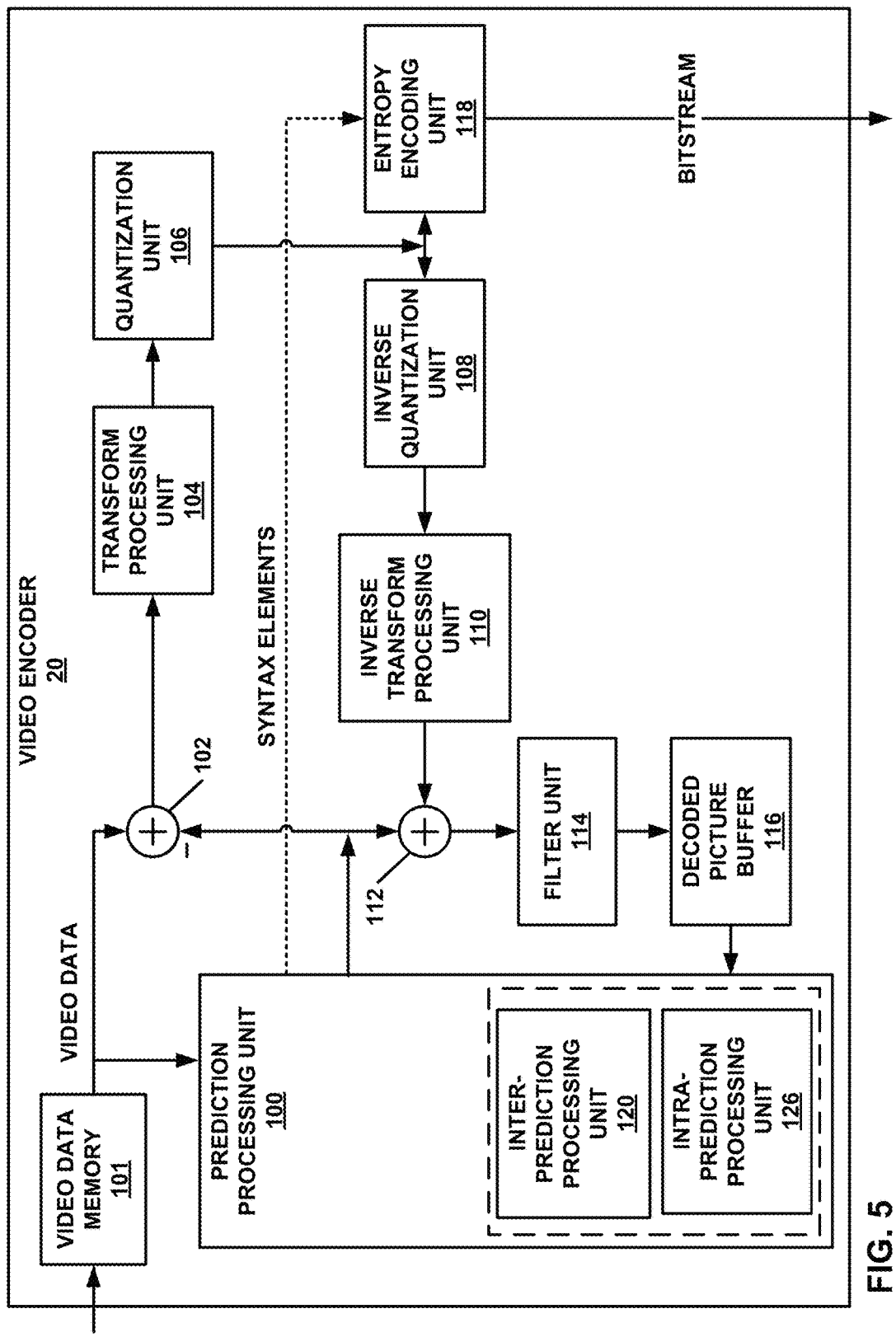
FIG. 5 is a block diagram illustrating an example video encoder that may implement the techniques described in this disclosure.

FIG. 5 is a block diagram illustrating an example video encoder 20 that may implement the techniques of this disclosure. FIG. 5 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods. For example, video encoder 20 may be configured to apply more transforms to the transform block than the limited options provided in HEVC.

In the example of FIG. 5, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). In other examples, video encoder 20 may include more, fewer, or different functional components.

Video data memory 101 may store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU. Thus, for blocks encoded in I-mode, the predicted block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely corresponds to the sample blocks of the PU. The motion estimation unit may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PU. The motion compensation unit of inter-prediction processing unit 120 may generate the predictive blocks of the PU based on actual or interpolated samples at the reference location indicated by the motion vector of the PU.

If a PU is in a B slice, the motion estimation unit of inter-prediction processing unit 120 may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a prediction block of the PU and a reference location associated with the reference region, and one or more prediction direction indicators that indicate whether the reference picture is in RefPicList0 or RefPicList1. The motion compensation unit of inter-prediction processing unit 120 may generate the predictive blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit of inter-prediction processing unit 120 may generate the predictive blocks of the PU based at least in part on actual or interpolated samples at the reference regions indicated by the motion vectors of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 35 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

In the examples described in this disclosure, the techniques are applicable to when a video block is intra-predicted or intra-predicted. For example, when a block is intra-predicted, the intra-prediction mode may be used to determine transform subsets. When a block is inter-predicted, its position may be used to determine transform subsets. Accordingly, the example techniques apply to a video block that is intra-predicted in any of the intra-prediction modes or inter-predicted in uni-direction or bi-direction.

Furthermore, the example techniques are not limited to intra-prediction or inter-prediction, and may be extended to intra-block copy (IBC) mode as well. In IBC mode, a predictive block is in the same picture as the video block being encoded, and is identified by a block vector. In IBC mode, transform subsets may be selected from a position of the video block, position of the predictive block, or the block vector as a few examples.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

In the techniques described in this disclosure, transform processing unit 104 may apply a left transform and a right transform to a transform block of the TU. In some examples, prediction processing unit 100 may determine which transforms to apply using the techniques described in this disclosure.

For example, prediction processing unit 100 may determine a plurality of transform subsets, each subset identifying one or more candidate transforms, where at least one transform subset identifies a plurality of candidate transforms. The candidate transforms are of different transform types, and in some examples, prediction processing unit 100 determines the plurality of transform subsets based on a size of a video block being encoded.

In some examples, video data memory 101 stores the plurality of transform subsets, and prediction processing unit 100 may determine the plurality of transform subsets from the stored transform subsets. In some examples, video data memory 101 may store all of the transforms, and prediction processing unit 100 may construct the transform subsets in a predefined manner. Examples of the candidate transforms include DCT-I to DCT-VIII, DST-I to DST-VIII, KLT transforms, and the like. In some examples, the plurality of transform subsets includes three or more transform subsets.

Prediction processing unit 100 may select a first transform subset from the plurality of transform subsets for a left transform for a current transform block of a video block of the video data and select a second transform subset from the plurality of transform subsets for a right transform for the transform block of the video block of the video data. The current transform block may be the transform block that transform processing unit 104 generates and on which transform processing unit 104 is to apply the transforms.

Prediction processing unit 100 may determine the left transform from the selected first transform subset and determine the right transform from the selected second transform subset. For instance, prediction processing unit 100 may test each of the transforms in the selected transform subsets and determine which transform provides the best video coding. Prediction processing unit 100 may determine the respective transforms that provide the best video coding as the left transform and the right transform.

Transform processing unit 104 may determine a current coefficient block based on the left transform, right transform, and the current transform block. For instance, transform processing unit 104 may perform the following equation: $Y=C*X*R^T$, where C is the left transform, R is the right transform, X is the current transform block, and Y is the resulting current coefficient block.

If the video block (e.g., CU or PU) is intra-prediction encoded, prediction processing unit 100 may determine the intra-prediction mode of the video block. Prediction processing unit 100 may select the first transform subset based on the determined intra-prediction mode, and select the second transform subset based on the determined intra-prediction mode.

If the video block (e.g., CU or PU) is inter-prediction encoded, prediction processing unit 100 may determine a location of the current transform block in the video block (e.g., determine whether transform block is for the residual generated from a particular location in the video block). Prediction processing unit 100 may select the first transform subset based on the determined location of the current transform block, and select the second transform subset based on the determined location of the current transform block.

For intra-prediction or inter-prediction, in some examples, prediction processing unit 100 may cause entropy encoding unit 118 to signal (e.g., generate in the bitstream) a first transform subset index into the first transform subset to identify a transform in the first transform subset used to determine the current coefficient block, and signal (e.g., generate in the bitstream) a second transform subset index into the second transform subset to identify a transform in the second transform subset used to determine the current coefficient block. In some examples, prediction processing unit 100 may determine a number of nonzero coefficients in the current coefficient block. In these examples, prediction processing unit 100 may cause entropy encoding unit 118 to signal the first transform subset index based on the number of nonzero coefficients being greater than a threshold, and signal the second transform subset index based on the number of nonzero coefficients being greater than the threshold. If the number of nonzero coefficients is less than the threshold, prediction processing unit 100 may not cause entropy encoding unit 118 to signal indices in the first and second transform subsets.

In some examples, at least one of the first transform subset or the second transform subset includes a transform that is different than a discrete cosine transform (DCT)-II transform and a discrete sine transform (DST)-VII transform. In some examples, the first transform subset and the second transform subset include different transforms (e.g., at least one transform in the first transform subset is not in the second transform subset or vice-versa).

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information; thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 (e.g., information indicative of coefficients of the current coefficient block used to reconstruct the video block) and may receive syntax elements from prediction processing unit 100 (e.g., indices into the first and second transform subsets). Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

In the example techniques, prediction processing unit 100 determines a predictive block, and generates in the video bitstream, that entropy encoding unit 118 outputs, information indicative of a prediction mode of the video block based on the predictive block. The prediction mode indicates whether the video block is intra-predicted or inter-predicted. For example, the predictive block is a block in the same picture as the video block based on the video block being intra-predicted or in a picture different than the picture that includes the video block based on the video block being inter-predicted. Residual generation unit 102 may determine the current transform block as a residual between the video block and the predictive block.

Figure 6:
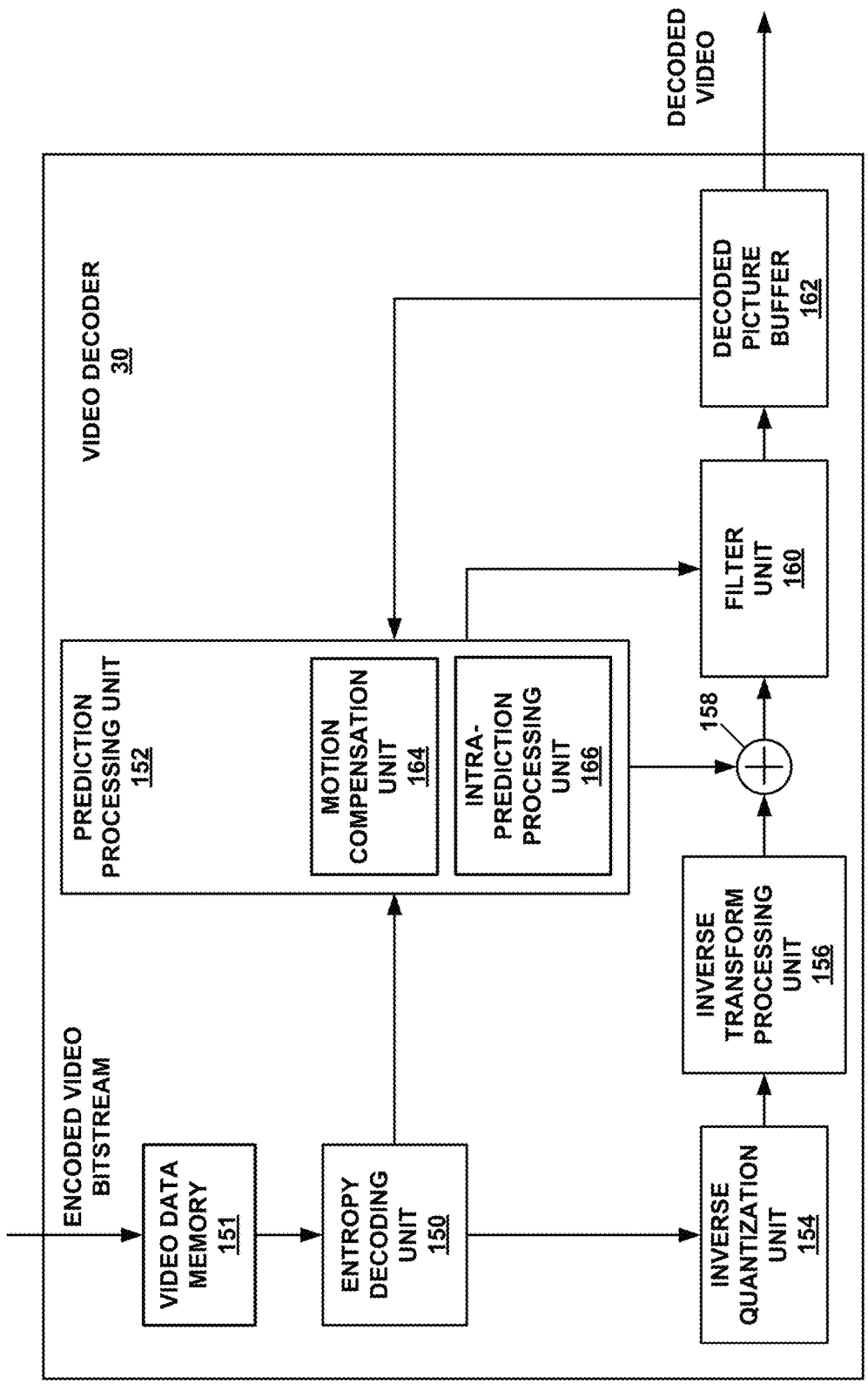
FIG. 6 is a block diagram illustrating an example video decoder that may implement the techniques described in this disclosure.

FIG. 6 is a block diagram illustrating an example video decoder 30 that is configured to implement the techniques of this disclosure. FIG. 6 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Video decoder 30 represents an example of a device that may be configured to perform techniques in accordance with various examples described in this disclosure. In the example of FIG. 6, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components.

A coded picture buffer (CPB) may receive and store encoded video data (e.g., NAL units) of a bitstream. Entropy decoding unit 150 may receive encoded video data (e.g., NAL units) from the CPB and parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

In the techniques described in this disclosure, prediction processing unit 152 may determine the left and right transforms that inverse transform processing unit 156 is to apply. For example, prediction processing unit 152 may determine a plurality of transform subsets, each subset identifying one or more candidate transforms, where at least one transform subset identifies a plurality of candidate transforms. The candidate transforms are of different transform types, and in some examples, prediction processing unit 152 determines the plurality of transform subsets based on a size of a video block being decoded.

In some examples, video data memory 151 stores the plurality of transform subsets, and prediction processing unit 152 may determine the plurality of transform subsets from the stored transform subsets. In some examples, video data memory 151 may store all of the transforms, and prediction processing unit 152 may construct the transform subsets in a predefined manner. In some examples, prediction processing unit 152 may receive information identifying the transform subsets from the bitstream. Examples of the candidate transforms include DCT-I to DCT-VIII, DST-I to DST-VIII, KLT transforms, and the like. In some examples, the plurality of transform subsets includes three or more transform subsets.

Prediction processing unit 152 may select a first transform subset from the plurality of transform subsets for a left transform for a current coefficient block of the video data, and select a second transform subset from the plurality of transform subsets for a right transform for the current coefficient block of the video data. Prediction processing unit 152 may determine the left transform from the selected first transform subset, and determine the right transform from the selected second transform subset.

Inverse transform processing unit 156 may determine a current transform block based on the left transform, right transform, and the current coefficient block. For instance, inverse transform processing unit 156 may perform the inverse of the following equation: $Y=C*X*R^T$, where Y is the coefficient block, C is the left transform, X is the transform block, and R is the right transform. Again, in this disclosure, it should be understood that inverse transform processing unit 156 applies the inverse of the transform that video encoder 20 applied, but for ease video decoder 30 is described as applying a transform.

Prediction processing unit 152 may reconstruct (e.g., intra-prediction or inter-prediction decode) a video block based on the current transform block and a predictive block. For example, if a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

In the examples described in this disclosure, the techniques are applicable to when a video block is intra-predicted or intra-predicted. For example, when a block is intra-predicted, the intra-prediction mode may be used to determine transform subsets. When a block is inter-predicted, its position may be used to determine transform subsets. Accordingly, the example techniques apply to a video block that is intra-predicted in any of the intra-prediction modes or inter-predicted in uni-direction or bi-direction.

Furthermore, the example techniques are not limited to intra-prediction or inter-prediction, and may be extended to intra-block copy (IBC) mode as well. In IBC mode, a reference block used to form a predictive block is in the same picture as the video block being encoded, and is identified by a block vector. In IBC mode, transform subsets may be selected from position of the video block, position of the reference block, or the block vector as a few examples.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs.

In some examples, where the video block is to be intra-prediction decoded, prediction processing unit 152 may determine an intra-prediction mode of the video block. Prediction processing unit 152 may select the first transform subset based on the determined intra-prediction mode, and select the second transform subset based on the determined intra-prediction mode.

Where the video block is to be inter-prediction decoded, prediction processing unit 152 may determine a location of the current transform block in the video block (e.g., determine whether coefficient block is for the residual generated from a particular location in the video block). Prediction processing unit 152 may select the first transform subset based on the determined location of the current transform block, and select the second transform subset based on the determined location of the current transform block.

In some examples, prediction processing unit 152 may receive a first transform subset index into the first transform subset, and receive a second transform subset index into the second transform subset. In these examples, prediction processing unit 152 may determine the left transform based on a transform in the first transform subset identified by the first transform subset index, and determine the right transform based on a transform in the second transform subset identified by the second transform subset index.

However, prediction processing unit 152 may not need to receive indices in the first and second transform subsets. For instance, prediction processing unit 152 may determine that a number of nonzero coefficients in the current coefficient block is less than a threshold. In such cases, prediction processing unit 152 may determine that a first transform identified in the first transform subset is the left transform without receiving a transform subset index into the first transform subset, in response to determining that the number of nonzero coefficients in the current coefficient block is less than the threshold, and determine that a first transform identified in the second transform subset is the right transform without receiving a transform subset index into the second transform subset, in response to determining that the number of nonzero coefficients in the current coefficient block is less than the threshold.

Also, prediction processing unit 152 may not necessarily determine transforms from transform subsets in all cases. In some examples, prediction processing unit 152 may receive a flag indicating that not all transform blocks of a block that includes the current transform block are transformed using the same transform. In such examples, prediction processing unit 152 may select the first and second transforms, and determine the left and right transforms from the respective first and second transforms in response to receiving the flag indicating that not all transform blocks of the block that includes the current transform block are transformed using the same transform. Examples of the block include a coding tree unit (CTU), a coding unit (CU), or a prediction unit (PU).

In some examples, at least one of the first transform subset or the second transform subset includes a transform that is different than a discrete cosine transform (DCT)-II transform and a discrete sine transform (DST)-VII transform. In some examples, the first transform subset and the second transform subset include different transforms (e.g., at least one transform in the first transform subset is not in the second transform subset or vice-versa).

In the example techniques, video decoder 30 may receive from a bitstream information indicating a prediction mode (e.g., whether a video block is intra-predicted or inter-predicted), and receive from the bitstream information indicating coefficients of the current coefficient block. Prediction processing unit 152 may determine the predictive block based on the prediction mode, and inverse transform unit 156 or prediction processing unit 152 may construct the coefficient block based on the received information indicating the coefficients. The prediction mode is one of an inter-prediction mode or an intra-prediction mode, and the current transform block is a residual of the video block and the predictive block.

The techniques described above may be performed by video encoder 20 (FIGS. 4 and 5) and/or video decoder 30 (FIGS. 4 and 6), both of which may be generally referred to as a video coder. Likewise, video coding may refer to video encoding or video decoding, as applicable. In addition, video encoding and video decoding may be generically referred to as "processing" video data.

In following subsections, examples of above techniques will be provided. In practice, any combination of any part of the examples may be used as new example technique.

The following describes examples of constructing an additional candidate transform list. Besides a default transform method which always applies DCT-II for all the included TUs, for each TU, additional candidate transform methods can be constructed given selected transform sets. In one example, the additional candidate transform list for Intra and Inter prediction residuals is constructed as follows: Firstly, a transform set is defined as a collection of transform types, for example, an example transform set can be defined as {DCT-II, DST-VII}, which includes two types of transforms, i.e., DCT-II and DST-VII. Based on two given transform sets, different transform methods can be generated by selecting one transform type from the first transform set as the horizontal transform, and another transform type from the second transform set as the vertical transform. For example, when the transform set 0 {DCT-II, DST-VII} is used for horizontal transform, and the transform set 1 {DCT-VIII, DST-VII} is used for vertical transform, totally four transform methods can be generated as:

TABLE 1

Four transform methods based on the transform set {DCT-II, DST-VII}

|  | Transform Method 1 | Transform Method 2 | Transform Method 3 | Transform Method 4 |
|---|---|---|---|---|
| Horizontal transform | DCT-II | DCT-II | DST-VII | DST-VII |
| Vertical transform | DCT-VIII | DST-VII | DCT-VIII | DST-VII |

For Intra prediction residual, totally three transform subsets are defined, including: Transform Subset 0: {DST-VII, DCT-VIII}, Transform Subset 1: {DST-VII, DST-I}, and Transform Subset 2: {DST-VII, DCT-V}. The selection on the transform set for horizontal and vertical transforms is dependent on the Intra prediction mode, as shown in Table 2 below,

TABLE 2

Mapping table between Intra prediction mode and Transform set

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| RightTransSubsetIdx | 2 | 1 | 0 | 1 | 0 | 1 | 0 | 1 | 0 | 0 | 0 | 0 | 0 | 1 | 0 | 1 | 0 | 1 |
| LeftTransSubsetIdx | 2 | 1 | 0 | 1 | 0 | 1 | 0 | 1 | 2 | 2 | 2 | 2 | 2 | 1 | 0 | 1 | 0 | 1 |

| Intra Mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| RightTransSubsetIdx | 0 | 1 | 0 | 1 | 0 | 1 | 2 | 2 | 2 | 2 | 2 | 1 | 0 | 1 | 0 | 1 | 0 |
| LeftTransSubsetIdx | 0 | 1 | 0 | 1 | 0 | 1 | 0 | 0 | 0 | 0 | 0 | 1 | 0 | 1 | 0 | 1 | 0 |

For example, for Intra mode 10, the candidate transform types for horizontal(right) transform are from transform set 0 including DST-VII and DCT-VIII, and the candidate transform types for vertical(left) transform are from transform set 2 including DST-VII and DCT-V. Therefore, the additional candidate transform list for intra mode 10 is finally constructed as shown in Table 3 in which totally four transform methods are generated

TABLE 3

Example of four transform methods for Intra prediction mode 10 based on Table 2

|  | Transform Method 1 | Transform Method 2 | Transform Method 3 | Transform Method 4 |
|---|---|---|---|---|
| Horizontal transform | DST-VII | DST-VII | DCT-VIII | DCT-VIII |
| Vertical transform | DST-VII | DCT-V | DST-VII | DCT-V |

According to Table 2, for each TU, given an Intra prediction mode, totally four transform methods can be generated. For Inter prediction residual, the same transform set {DST-VII, DCT-VIII} is used for both horizontal and vertical transforms. Therefore, for each TU, the additional candidate transform list is constructed as shown in Table 4.

TABLE 4

Four transform methods for Inter prediction residual

|  | Transform Method 1 | Transform Method 2 | Transform Method 3 | Transform Method 4 |
|---|---|---|---|---|
| Horizontal transform | DST-VII | DST-VII | DCT-VIII | DCT-VIII |
| Vertical transform | DST-VII | DCT-VIII | DST-VII | DCT-VIII |

The following description is an example of indicator signaling. To adaptively fit for different contents, indicators on the transform usage are signaled at both CU-level and TU-level. The CU-level indicator is a one-bit flag indicating whether the default DCT-II is applied for all the TUs included in the current CU. If the one-bit flag is 0, only the default DCT-II can applied for all the TUs included in the current CU; otherwise, a two-bit TU-level indicator may be further signaled for each TU, and the first bit specifies which transform type from the given transform set is applied as the horizontal transform, and the second bit specifies which transform type from the given transform set is applied as the vertical transform.

For Intra prediction residual, the TU-level indicators are signaled after the coefficients, and the TU-level indicator is not signaled and derived as 0 when the total number of nonzero coefficients of the TU is no larger than 2. Otherwise, the TU-level indicator is explicitly signaled. For Inter prediction residual, the TU-level indicators can be signaled either before or after the coefficients, and the TU-level indicator is not signaled when there is no nonzero coefficients in the TU.

The syntax, semantics of the proposed examples based on HEVC are provided below. In the below syntax, italicizing of elements is used to indicate potential changes in the syntax or to otherwise assist with understanding.

Transform Tree Syntax

|  | Descriptor |
|---|---|
| transform_tree( x0, y0, xBase, yBase, log2TrafoSize, trafoDepth, blkIdx ) { | |
|   if( log2TrafoSize <= Log2MaxTrafoSize && | |
|     log2TrafoSize > Log2MinTrafoSize && | |
|     trafoDepth < MaxTrafoDepth && !( IntraSplitFlag && ( trafoDepth == 0 ) ) ) | |
|     split_transform_flag[ x0 ][ y0 ][ trafoDepth ] | ae(v) |
|   if( log2TrafoSize > 2 ) { | |
|     if( trafoDepth == 0 \|\| cbf_cb[ xBase ][ yBase ][ trafoDepth - 1 ] ) | |
|       cbf_cb[ x0 ][ y0 ][ trafoDepth ] | ae(v) |
|     if( trafoDepth == 0 \|\| cbf_cr[ xBase ][ yBase ][ trafoDepth - 1 ] ) | |
|       cbf_cr[ x0 ][ y0 ][ trafoDepth ] | ae(v) |
|   } | |
|   if( split_transform_flag[ x0 ][ y0 ][ trafoDepth ] ) { | |
|     x1 = x0 + ( 1 << ( log2TrafoSize - 1 ) ) | |
|     y1 = y0 + ( 1 << ( log2TrafoSize - 1 ) ) | |
|     if( trafoDepth == 0 ) | |
|       *add_multi_transform_flag[ x0 ][ y0 ]* | ae(v) |
|     transform_tree( x0, y0, x0, y0, log2TrafoSize - 1, trafoDepth + 1, 0 ) | |
|     transform_tree( x1, y0, x0, y0, log2TrafoSize - 1, trafoDepth + 1, 1 ) | |
|     transform_tree( x0, y1, x0, y0, log2TrafoSize - 1, trafoDepth + 1, 2 ) | |
|     transform_tree( x1, y1, x0, y0, log2TrafoSize - 1, trafoDepth + 1, 3 ) | |
|   } else { | |
|     if( CuPredMode[ x0 ][ y0 ] == MODE_INTRA \|\| trafoDepth != 0 \|\| | |
|       cbf_cb[ x0 ][ y0 ][ trafoDepth ] \|\| cbf_cr[ x0 ][ y0 ][ trafoDepth ] ) | |
|       cbf_luma[ x0 ][ y0 ][ trafoDepth ] | ae(v) |
|     if( cbf_luma[ x0 ][ y0 ][ trafoDepth ] && trafoDepth == 0 ) | |
|       *add_multi_transform_flag[ x0 ][ y0 ]* | ae(v) |
|     transform_unit( x0, y0, xBase, yBase, log2TrafoSize, trafoDepth, blkIdx ) | |
|   } | |
| } | |

Alternatively, add_multi_transform_flag may be signaled without dependency to cbf_luma.

| | Descriptor |
|---|---|
| transform_tree( x0, y0, xBase, yBase, log2TrafoSize, trafoDepth, blkIdx ) { | |
|     if( trafoDepth == 0) | |
|         add_multi_transform_flag[ x0 ][ y0 ] | ae(v) |
|     if( log2TrafoSize <= Log2MaxTrafoSize && | |
|         log2TrafoSize > Log2MinTrafoSize && | |
|         trafoDepth < MaxTrafoDepth && !(IntraSplitFlag && ( trafoDepth == 0 ) ) ) | |
|         split_transform_flag[ x0 ][ y0 ][ trafoDepth ] | ae(v) |
| ... | |
| } | |

15

This is equivalent to sending the flag in the coding unit.

| | Descriptor |
|---|---|
| coding_unit( x0, y0, log2CbSize ) { | |
|     if( transquant_bypass_enabled_flag ) | |
|         cu_transquant_bypass_flag | ae(v) |
|     if( slice_type != I ) | |
|         cu_skip_flag[ x0 ][ y0 ] | ae(v) |
|     nCbS = ( 1 << log2CbSize ) | |
|     if( cu_skip_flag[ x0 ][ y0 ] ) | |
|         prediction_unit( x0, y0, nCbS, nCbS ) | |
|     else { | |
|         if( slice_type != I ) | |
|             pred_mode_flag | ae(v) |
|         if( CuPredMode[ x0 ][ y0 ] != MODE_INTRA | | log2CbSize == MinCbLog2SizeY) | |
|             part_mode | ae(v) |
|         if( CuPredMode[ x0 ][ y0 ] == MODE_INTRA ) { | |
|             if( PartMode == PART_2Nx2N && pcm_enabled_flag && log2CbSize >= Log2MinIpcmCbSizeY && | |
|                 log2CbSize <= Log2MaxIpcmCbSizeY ) | |
|                 pcm_flag[ x0 ][ y0 ] | ae(v) |
|             if( pcm_flag[ x0 ][ y0 ] ) { | |
|                 while( !byte_aligned( ) ) | |
|                     pcm_alignment_zero_bit | f(1) |
|                 pcm_sample( x0, y0, log2CbSize ) | |
|             } else { | |
|                 pbOffset = ( PartMode == PART_NxN ) ? ( nCbS / 2 ) : nCbS | |
|                 for( j = 0; j < nCbS; j = j + pbOffset ) | |
|                     for( i = 0; i < nCbS; i = i + pbOffset ) | |
|                         prev_intra_luma_pred_flag[ x0 + i ][ y0 + j ] | ae(v) |
|                 for( j = 0; j < nCbS; j = j + pbOffset ) | |
|                     for( i = 0; i < nCbS; i = i + pbOffset ) | |
|                       if( prev_intra_luma_pred_flag[ x0 + i ][ y0 + j ] ) | |
|                         mpm_idx[ x0 + i ][ y0 + j ] | ae(v) |
|                       Else | |
|                         rem_intra_luma_pred_mode[ x0 + i ][ y0 + j ] | ae(v) |
|                 intra_chroma_pred_mode[ x0 ][ y0 ] | ae(v) |
|             } | |
|         } else { | |
|             if( PartMode == PART_2Nx2N ) | |
|                 prediction_unit( x0, y0, nCbS, nCbS ) | |
|             else if( PartMode == PART_2NxN ) { | |
|                 prediction_unit( x0, y0, nCbS, nCbS / 2 ) | |
|                 prediction_unit( x0, y0 + ( nCbS / 2 ), nCbS, nCbS / 2 ) | |
|             } else if( PartMode == PART_Nx2N ) { | |
|                 prediction_unit( x0, y0, nCbS / 2, nCbS ) | |
|                 prediction_unit( x0 + ( nCbS / 2 ), y0, nCbS / 2, nCbS ) | |
|             } else if( PartMode == PART_2NxnU ) { | |
|                 prediction_unit( x0, y0, nCbS, nCbS / 4 ) | |
|                 prediction_unit( x0, y0 + ( nCbS / 4 ), nCbS, nCbS * 3 / 4 ) | |
|             } else if( PartMode == PART_2NxnD ) { | |
|                 prediction_unit( x0, y0, nCbS, nCbS * 3 / 4 ) | |
|                 prediction_unit( x0, y0 + ( nCbS * 3 / 4 ), nCbS, nCbS / 4 ) | |
|             } else if( PartMode == PART_nLx2N ) { | |
|                 prediction_unit( x0, y0, nCbS / 4, nCbS ) | |
|                 prediction_unit( x0 + ( nCbS / 4 ), y0, nCbS * 3 / 4, nCbS ) | |
|             } else if( PartMode == PART_nRx2N ) { | |
|                 prediction_unit( x0, y0, nCbS * 3 / 4, nCbS ) | |

-continued

| | Descriptor |
|---|---|
|         prediction_unit( x0 + ( nCbS * 3 / 4 ), y0, nCbS / 4, nCbS )<br>      } else { /* PART_NxN */<br>        prediction_unit( x0, y0, nCbS / 2, nCbS / 2 )<br>        prediction_unit( x0 + ( nCbS / 2 ), y0, nCbS / 2, nCbS / 2 )<br>        prediction_unit( x0, y0 + ( nCbS / 2 ), nCbS / 2, nCbS / 2 )<br>prediction_unit( x0 + ( nCbS / 2 ), y0 + ( nCbS / 2 ), nCbS / 2, nCbS / 2 )<br>      }<br>    }<br>    if( !pcm_flag[ x0 ][ y0 ] ) {<br>      if( CuPredMode[ x0 ][ y0 ] != MODE_INTRA &&<br>    !( PartMode = = PART_2Nx2N && merge_flag[ x0 ][ y0 ] ) )<br>        rqt_root_cbf | ae(v) |
|       if( rqt_root_cbf ) {<br>        add_multi_transform_flag | ae(v) |
|         MaxTrafoDepth = ( CuPredMode[ x0 ][ y0 ] = =<br>MODE_INTRA ?<br>                      ( max_transform_hierarchy_depth_intra +<br>IntraSplitFlag ) :<br>                      max_transform_hierarchy_depth_inter )<br>        transform_tree( x0, y0, x0, y0, log2CbSize, 0, 0 )<br>      }<br>    }<br>  } | |

Transform Tree Semantics add_multi_transform_flag[x0][y0] specifies whether enhanced multiple transform is applied for each TU included in the current CU, when add_multi_transform_flag[x0][y0] is 0, DCT-II is always applied for each TU included in the current CU, otherwise, left_trasnform_flag and right_transform_flag may be further signaled for each TU to specify the left transform and the right transform applied for a TU beloing to the current transform tree. When add_multi_transform_flag[x0][y0] is not present, it is inferred to be equal to 0.

Residual Coding Syntax

| | Descriptor |
|---|---|
| residual_coding( x0, y0, log2TrafoSize, cIdx ) {<br>    if( transform_skip_enabled_flag && !cu_transquant_bypass_flag &&<br>        ( log2TrafoSize = = 2 ) )<br>        transform_skip_flag[ x0 ][ y0 ][ cIdx ] | ae(v) |
|     last_sig_coeff_x_prefix | ae(v) |
|     last_sig_coeff_y_prefix | ae(v) |
|     if( last_sig_coeff_x_prefix > 3 )<br>        last_sig_coeff_x_suffix | ae(v) |
|     if( last_sig_coeff_y_prefix > 3 )<br>        last_sig_coeff_y_suffix | ae(v) |
|     lastScanPos = 16<br>    lastSubBlock = ( 1 << ( log2TrafoSize - 2 ) ) * ( 1 << ( log2TrafoSize - 2<br>                          ) ) - 1<br>    do {<br>        if( lastScanPos = = 0 ) {<br>            lastScanPos = 16<br>            lastSubBlock- -<br>        }<br>        lastScanPos- -<br>        xS = ScanOrder[ log2TrafoSize - 2 ][ scanIdx ][ lastSubBlock ][ 0 ]<br>        yS = ScanOrder[ log2TrafoSize - 2 ][ scanIdx ][ lastSubBlock ][ 1 ]<br>        xC = ( xS << 2 ) + ScanOrder[ 2 ][ scanIdx ][ lastScanPos ][ 0 ]<br>        yC = ( yS << 2 ) + ScanOrder[ 2 ][ scanIdx ][ lastScanPos ][ 1 ]<br>    } while( ( xC != LastSignificantCoeffX ) | | ( yC != LastSignificantCoeffY<br>              ) )<br>    for( i = lastSubBlock; i >= 0; i- - ) {<br>        xS = ScanOrder[ log2TrafoSize - 2 ][ scanIdx ][ i ][ 0 ]<br>        yS = ScanOrder[ log2TrafoSize - 2 ][ scanIdx ][ i ][ 1 ]<br>        inferSbDcSigCoeffFlag = 0<br>        if( ( i < lastSubBlock ) && ( i > 0 ) ) {<br>            coded_sub_block_flag[ xS ][ yS ] | ae(v) |
|             inferSbDcSigCoeffFlag = 1<br>        }<br>        for( n = ( i = = lastSubBlock ) ? lastScanPos - 1 : 15; n >= 0; n- - ) {<br>            xC = ( xS << 2 ) + ScanOrder[ 2 ][ scanIdx ][ n ][ 0 ]<br>            yC = ( yS << 2 ) + ScanOrder[ 2 ][ scanIdx ][ n ][ 1 ]<br>            if( coded_sub_block_flag[ xS ][ yS ] && ( n > 0 | |<br>!inferSbDcSigCoeffFlag ) ) {<br>                sig_coeff_flag[ xC ][ yC ] | ae(v) |

-continued

|  | Descriptor |
|---|---|
| ```
            if( sig_coeff_flag[ xC ][ yC ] )
                inferSbDcSigCoeffFlag = 0
        }
    }
    firstSigScanPos = 16
    lastSigScanPos = −1
    numGreater1Flag = 0
    lastGreater1ScanPos = −1
    for( n = 15; n >= 0; n− − ) {
        xC = ( xS << 2 ) + ScanOrder[ 2 ][ scanIdx ][ n ][ 0 ]
        yC = ( yS << 2 ) + ScanOrder[ 2 ][ scanIdx ][ n ][ 1 ]
        if( sig_coeff_flag[ xC ][ yC ] ) {
            if( numGreater1Flag < 8 ) {
                coeff_abs_level_greater1_flag[ n ]
                numGreater1Flag++
                if( coeff_abs_level_greater1_flag[ n ] &&
lastGreater1ScanPos = = −1 )
                    lastGreater1ScanPos = n
            }
            if( lastSigScanPos = = −1 )
                lastSigScanPos = n
            firstSigScanPos = n
        }
    }
    signHidden = ( lastSigScanPos − firstSigScanPos > 3 &&
!cu_transquant_bypass_flag )
    if( lastGreater1ScanPos != −1 )
        coeff_abs_level_greater2_flag[ lastGreater1ScanPos ]
    for( n = 15; n >= 0; n− − ) {
        xC = ( xS << 2 ) + ScanOrder[ 2 ][ scanIdx ][ n ][ 0 ]
        yC = ( yS << 2 ) + ScanOrder[ 2 ][ scanIdx ][ n ][ 1 ]
        if( sig_coeff_flag[ xC ][ yC ] &&
            ( !sign_data_hiding_enabled_flag | | !signHidden | | ( n !=
firstSigScanPos ) ) )
            coeff_sign_flag[ n ]
    }
    numSigCoeff = 0
    sumAbsLevel = 0
    for( n = 15; n >= 0; n− − ) {
        xC = ( xS << 2 ) + ScanOrder[ 2 ][ scanIdx ][ n ][ 0 ]
        yC = ( yS << 2 ) + ScanOrder[ 2 ][ scanIdx ][ n ][ 1 ]
        if( sig_coeff_flag[ xC ][ yC ] ) {
            baseLevel = 1 + coeff_abs_level_greater1_flag[ n ] +
                            coeff_abs_level_greater2_flag[ n ]
            if( baseLevel = = ( ( numSigCoeff < 8 ) ?
                                ( ( n = = lastGreater1ScanPos) ? 3 : 2 ) : 1 ) )
                coeff_abs_level_remaining[ n ]
            TransCoeffLevel[ x0 ][ y0 ][ cIdx ][ xC ][ yC ] =
                ( coeff_abs_level_remaining[ n ] + baseLevel ) * ( 1 − 2 *
coeff_sign_flag[ n ] )
            if( sign_data_hiding_enabled_flag && signHidden ) {
                sumAbsLevel += ( coeff_abs_level_remaining[ n ] + baseLevel )
                if( ( n = = firstSigScanPos ) && ( ( sumAbsLevel % 2 ) = = 1 ) )
                    TransCoeffLevel[ x0 ][ y0 ][ cIdx ][ xC ][ yC ] =
                                −TransCoeffLevel[ x0 ][ y0 ][ cIdx ][ xC ][ yC ]
            }
            numSigCoeff++
        }
    }
}
    if(add_multi_transform_flag[ x0 ][ y0 ] ) {
        if(numSigCoeff>2 | | ( CuPredMode[ x0 ][ y0 ] ! = MODE_INTRA &&
numSigCoeff>0)) {
            left_transform_flag[ x0 ][ y0 ]
            right_transform_flag[ x0 ][ y0 ]
        }
    }
}
``` | <br><br><br><br><br><br><br>ae(v)<br><br><br><br><br><br><br><br><br><br><br><br>ae(v)<br><br><br><br><br><br><br><br>ae(v)<br><br><br><br><br><br><br><br><br>ae(v)<br><br><br><br><br><br><br><br><br><br>ae(v)<br>ae(v) |

Residual Coding Semantics left_transform_flag[x0][y0] specifies the transform index applied for the left transform of the current TU, when not presented, left_transform_flag[x0][y0] is infered as 0.

right_transform_flag[x0][y0] specifies the transform index applied for the right transform of the current TU, when not presented, right_transform_flag[x0][y0] is infered as 0.

Decoding Process for Deriving the Left Transform and Right Transform

If CuPredMode[x0][y0]==MODE_INTRA, given the Intra Mode value IntraPredModeY[xPb][yPb], the value of LeftTransSubsetIdx and RigthTransSubsetIdx is derived based on the following table.

| | Intra Mode | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| RightTransSubsetIdx | 2 | 1 | 0 | 1 | 0 | 1 | 0 | 1 | 0 | 0 | 0 | 0 | 0 | 1 | 0 | 1 | 0 | 1 |
| LeftTransSubsetIdx | 2 | 1 | 0 | 1 | 0 | 1 | 0 | 1 | 2 | 2 | 2 | 2 | 2 | 1 | 0 | 1 | 0 | 1 |
| | Intra Mode | | | | | | | | | | | | | | | | | |
| | 18 | 19 | 20 | 21 | 22 | 23 | 24 | 25 | 26 | 27 | 28 | 29 | 30 | 31 | 32 | 33 | 34 | |
| RightTransSubsetIdx | 0 | 1 | 0 | 1 | 0 | 1 | 2 | 2 | 2 | 2 | 2 | 1 | 0 | 1 | 0 | 1 | 0 | |
| LeftTransSubsetIdx | 0 | 1 | 0 | 1 | 0 | 1 | 0 | 0 | 0 | 0 | 0 | 1 | 0 | 1 | 0 | 1 | 0 | |

Given the value of LeftTransSubsetIdx and left_transform_flag, the left transform is derived using the following table:

| | | LeftTransSubsetIdx | | |
|---|---|---|---|---|
| | | 0 | 1 | 2 |
| left_transform_flag | 0 | DST-7 | DST-7 | DST-7 |
| | 1 | DCT-8 | DST-1 | DCT-5 |

Given the value of RightTransSubsetIdx and right_transform_flag, the left transform is derived using the following table:

| | | RightTransSubsetIdx | | |
|---|---|---|---|---|
| | | 0 | 1 | 2 |
| right_transform_flag | 0 | DST-7 | DST-7 | DST-7 |
| | 1 | DCT-8 | DST-1 | DCT-5 |

Otherwise (CuPredMode[x0][y0]!=MODE_INTRA), the followings are performed:

Given the value of left_transform_flag, the left transform is derived using the following table:

| left_transform_flag | 0 | DCT-8 |
|---|---|---|
| | 1 | DST-7 |

Given the value of right_transform_flag, the right transform is derived using the following table:

| right_transform_flag | 0 | DCT-8 |
|---|---|---|
| | 1 | DST-7 |

The following are examples of applying the enhanced multiple transform and large transform. For the encoding process performed by video encoder 20, in one example, for each CU smaller than (or equal to) 32×32, the current CU is coded twice. In the first pass, the current CU is coded using only DCT-II. The rate-distortion cost for coding the whole CU is recorded as RDcost_CU_DCT; and the rate-distortion cost for coding each Intra prediction mode of PU is recorded as RDcost_PU_DCT[i][p], where i indicates the index of the Intra prediction mode inside the current CU, and p indicates the index of the PU inside the current CU. The optimal Intra prediction mode based on rate-distortion optimization for the current PU indexed by p is denoted as IPM[p].

In the second pass, the current CU is coded again using multiple transforms described as below. For each included PU, indexed by p', of the current CU, the following is performed. For each candidate Intra prediction mode i', if the RDcost_PU_DCT[i'][p']>RDcost_PU_DCT[IPM[p']][p'], the Intra prediction mode i' is skipped and not selected as the optimal Intra prediction mode for the current PU. Otherwise, the following is performed for each TU included in the current PU.

For each TU inside the current PU, given the current candidate Intra prediction mode, according to above example, the 2 candidate right (R) transforms and 2 candidate left (L) transforms are selected, so totally 4 different R and L transform combination. Then, each candidate R and L transform combination is tested using rate-distortion cost. During this process, if one R and L transform combination generates zero coefficient (e.g., zero value or no coefficients), the remaining L and R transform combinations are skipped and not selected as the optimal R and L transform combination. The R and L transform combination with the least rate-distortion cost is selected as the actual transforms to encode the current residual block. Moreover, during the above process of selecting combination R and L transforms, if one candidate R and L transform combination generates no more than 2 nonzero coefficients, it is not selected as the optimal transform combination unless both R and L transform is the DST-VII transform.

After the above process is done for all the PUs inside the current CU, then the rate-distortion cost for coding the whole CU is recorded as RDcost_CU_EMT. If RDcost_CU_DCT is smaller than RDcost_CU_EMT, then one flag add_multi_transform_flag is conditionally signaled as 0 as described in above example, and all the included TUs are encoded using DCT-II. Otherwise, add_multi_transform_flag is conditionally signaled as 1 as described in above example, and for each included TU, a flag left_transform_flag and another flag right_transform_flag is conditionally signaled after the coefficients are signaled as described in above example, to indicate which left transform and right transform are selected for encoding the current TU.

The following describes examples of the decoding process performed by video decoder 30. In one example, for each CU smaller than (or equal to) 32×32, one bit flag add_multi_transform_flag is conditionally signaled as described in above example. This flag is not signaled only when transform depth is 0 and the coded block flag (CBF) value of Luma component is 0, otherwise, the flag is always signaled.

If add_multi_transform_flag is 0, only DCT-2 is applied for all the included TUs, otherwise, the following is performed. For each TU, one bit flag left_transform_flag and another flag right_transform_flag is conditionally signaled after the coefficients are signaled as described in above example. The condition of whether left_transform_flag and right_transform_flag are signaled are described below.

When current CU is Intra coded, when the total number of nonzero coefficients are less than (or equal to) 2, left_transform_flag and right_transform_flag are not signaled. Otherwise, left_transform_flag and right_transform_flag are signaled.

Otherwise, when current CU is not Intra coded, when there is no nonzero coefficient, left_transform_flag and right_transform_flag are not signaled. Otherwise, left_transform_flag and right_transform_flag are signaled.

For each TU, given the signaled left_transform_flag and right_transform_flag, the left and right transforms are derived as described in above example. When the current CU is larger than 32×32, for each TU with same size of 64×64, the transform is performed as described in more detail below with respect to examples for larger sized TUs.

The following are examples of another alternative of constructing an additional transform list based on Intra prediction mode. Besides a default transform method which always applies DCT-II for all the included TUs, for each TU, an additional candidate transform DST-VII can be applied as follows. Given the intra prediction mode of current TU, denoted as IPM, the left and right transform applied on this TU is specified as below. If (IPM & 1) equals 1, DCT-II is applied as both the left and right transform for current TU; otherwise ((IPM & 1) equals 0), DST-VII is applied as both left and right transform for current TU.

The above described example techniques for determining transforms to use. The following describes examples for supporting larger sized transforms. For example, supporting 64×64 transform is beneficial, especially for coding videos with larger resolutions, e.g., 1080p and 4K. To support 64×64 transform while constraining the complexity for both video encoder 20 and video decoder 30 is important, and although various ways can be done to achieve that, a better solution may be available.

The actual applied N×N transform matrices may be an integer-point approximation after the scaling of the original floating-point transform matrices, and the scaling may be larger than $64*\log_2 N$, including but not limited to $s*\log_2 N$, where s can be 128 or 256. In one example, the resulting transform coefficients after the horizontal and vertical transforms are kept within the 16-bit representation by applying additional right shift operations. The additional right shifting operations include, but are not limited to, right shifting the resulting transform coefficients after vertical and horizontal inverse/forward transform by additional $\log_2(s/64)$ bits.

Transform sizes larger than 32-point transform may be applied, including but not limited to 64-point, 128-point, 256-point, on residual blocks. When M-point and N-point transforms are applied for the horizontal and vertical transforms, respectively, where M and N are integers and M could be the same as or different from N, only the top-left X×Y lower frequency coefficients inside the resulting M×N coefficient block, where X<M and Y<N, are signaled and the remaining coefficients are not signaled and derived as 0.

The position of the last nonzero coefficient inside the resulting M×N coefficient block can be coded by reusing the same logic of the last nonzero coefficient position coding used for S×T blocks, where X≤S≤M and Y≤T≤N, in terms of context modeling. To zero out the coefficients beyond X×Y, a constraint may be introduced for LastSignificantCoeffY and LastSignificantCoeffX. For example, the value of LastSignificantCoeffX(LastSignificantCoeffY) may be smaller than X(Y). The value of X and Y may be constant, e.g., 32, or dependent on transform size, e.g., X=M/2, Y=N/2. A typical value of X and Y is 32 for 64-point transform.

In one example, one or more CG (coding group) scan orders for M×N may be pre-defined and used. However, for CGs outside the top-left X×Y region of the resulting M×N coefficient block, the CG-level flags signaling whether there is at least one nonzero coefficient in the each CG are skipped and not coded. Alternatively or additionally, for all the W×H CGs, where a typical value of W and H is 4, the CGs are coded following the scan order for X×Y regions which includes, but not limited to (M/W)×(N/H) diagonal, zigzag, horizontal or vertical scan order. Alternatively or additionally, all the CGs are grouped in units of W'×H', where W' is a multiples of W and H' is a multiples of H, the W'×H' units are coded following the scan order including, but not limited to (M/W')×(N/H') diagonal, zigzag, horizontal or vertical scan order, and the CGs inside each W×H unit are coded following the scan order including, but not limited to, (W'/W)×(H'/H) diagonal, zigzag, horizontal or vertical scan order.

To support coding RQT depth corresponding to transform size of 64×64, 128×128 or 256×256, the CABAC contexts used for coding RQT splitting flags, which depend on transform sizes, can be shared for RQT depth values corresponding to transform size larger than 32×32. For example, for certain RQT depth cases, including but not limited to RQT depth values corresponding to transform size 64×64 and 32×32, the same CABAC context can be applied for coding the RQT splitting flag.

The following are examples of performing 32×32 zero-out for 64×64 transform. There may be a constraint for the last position, where last_sig_coeff_x_suffix specifies the suffix of the column position of the last significant coefficient in scanning order within a transform block. The values of last_sig_coeff_x_suffix shall be in the range of 0 to (1<<((last_sig_coeff_x_prefix>>1)−1))−1, inclusive. The column position of the last significant coefficient in scanning order within a transform block LastSignificantCoeffX is derived as follows. If last_sig_coeff_x_suffix is not present, the following applies: LastSignificantCoeffX=last_sig_coeff_x_prefix, otherwise (last_sig_coeff_x_suffix is present), the following applies LastSignificantCoeffX=(1<<((last_sig_coeff_x_prefix>>1)−1))*(2+(last_sig_coeff_x_prefix & 1))+last_sig_coeff_x_suffix.

The syntax element last_sig_coeff_y_suffix specifies the suffix of the row position of the last significant coefficient in scanning order within a transform block.

The values of last_sig_coeff_y_suffix shall be in the range of 0 to (1<<((last_sig_coeff_y_prefix>>1)−1))−1, inclusive.

The row position of the last significant coefficient in scanning order within a transform block. LastSignificantCoeffY is derived as follows. If last_sig_coeff_y_suffix is not present, the following applies LastSignificantCoeffY=last_sig_coeff_y_prefix, otherwise (last_sig_coeff_y_suffix is present), the following applies LastSignificantCoeffY=(1<<((last_sig_coeff_y_prefix>>1)−1))*(2+(last_sig_coeff_y_prefix & 1))+last_sig_coeff_y_suffix When scanIdx is equal to 2, the coordinates are swapped as follows (LastSignificantCoeffX, LastSignificantCoeffY)= Swap(LastSignificantCoeffX, LastSignificantCoeffY). The value of LastSignificantCoeffX or LastSignificantCoeffY shall be smaller than 32.

The following are conditions for the signaling of significant CG and significant coefficients.

Residual Coding Syntax

| | Descriptor |
|---|---|
| residual_coding( x0, y0, log2TrafoSize, cIdx ) { | |
|   if( transform_skip_enabled_flag && !cu_transquant_bypass_flag && | |
|   ( log2TrafoSize = = 2 ) ) | |
|     transform_skip_flag[ x0 ][ y0 ][ cIdx ] | ae(v) |
|   last_sig_coeff_x_prefix | ae(v) |
|   last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   lastScanPos = 16 | |
|   lastSubBlock = ( 1 << ( log2TrafoSize − 2 ) ) * ( 1 << ( log2TrafoSize − 2 ) ) − 1 | |
|   do { | |
|     if( lastScanPos = = 0 ) { | |
|       lastScanPos = 16 | |
|       lastSubBlock− − | |
|     } | |
|     lastScanPos− − | |
|     xS = ScanOrder[ log2TrafoSize − 2 ][ scanIdx ][ lastSubBlock ][ 0 ] | |
|     yS = ScanOrder[ log2TrafoSize − 2 ][ scanIdx ][ lastSubBlock ][ 1 ] | |
|     xC = ( xS << 2 ) + ScanOrder[ 2 ][ scanIdx ][ lastScanPos ][ 0 ] | |
|     yC = ( yS << 2 ) + ScanOrder[ 2 ][ scanIdx ][ lastScanPos ][ 1 ] | |
|   } while( ( xC != LastSignificantCoeffX ) \|\| ( yC != LastSignificantCoeffY ) ) | |
|   for( i = lastSubBlock; i >= 0; i− − ) { | |
|     xS = ScanOrder[ log2TrafoSize − 2 ][ scanIdx ][ i ][ 0 ] | |
|     yS = ScanOrder[ log2TrafoSize − 2 ][ scanIdx ][ i ][ 1 ] | |
|     inferSbDcSigCoeffFlag = 0 | |
|     if( ( i < lastSubBlock ) && ( i > 0 ) && (xS<32 \|\| yS<32)) { | |
|       coded_sub_block_flag[ xS ][ yS ] | ae(v) |
|       inferSbDcSigCoeffFlag = 1 | |
|     } | |
|     for( n = ( i = = lastSubBlock ) ? lastScanPos − 1 : 15; n >= 0; n− − ) { | |
|       xC = ( xS << 2 ) + ScanOrder[ 2 ][ scanIdx ][ n ][ 0 ] | |
|       yC = ( yS << 2 ) + ScanOrder[ 2 ][ scanIdx ][ n ][ 1 ] | |
|       if( coded_sub_block_flag[ xS ][ yS ] && ( n > 0 \|\| !inferSbDcSigCoeffFlag )) { | |
|         sig_coeff_flag[ xC ][ yC ] | ae(v) |
|         if( sig_coeff_flag[ xC ][ yC ] ) | |
|           inferSbDcSigCoeffFlag = 0 | |
|       } | |
|     } | |
|     firstSigScanPos = 16 | |
|     lastSigScanPos = −1 | |
|     numGreater1Flag = 0 | |
|     lastGreater1ScanPos = −1 | |
|     for( n = 15; n >= 0; n− − ) { | |
|       xC = ( xS << 2 ) + ScanOrder[ 2 ][ scanIdx ][ n ][ 0 ] | |
|       yC = ( yS << 2 ) + ScanOrder[ 2 ][ scanIdx ][ n ][ 1 ] | |
|       if( sig_coeff_flag[ xC ][ yC ] ) { | |
|         if( numGreater1Flag < 8 ) { | |
|           coeff_abs_level_greater1_flag[ n ] | ae(v) |
|           numGreater1Flag++ | |
|           if( coeff_abs_level_greater1_flag[ n ] && lastGreater1ScanPos = = −1 ) | |
|             lastGreater1ScanPos = n | |
|         } | |
|         if( lastSigScanPos = = −1 ) | |
|           lastSigScanPos = n | |
|         firstSigScanPos = n | |
|       } | |
|     } | |
|     signHidden = ( lastSigScanPos − firstSigScanPos > 3 && !cu_transquant_bypass_flag ) | |

-continued

|  | Descriptor |
|---|---|
| ```
            if( lastGreater1ScanPos != −1 )
                coeff_abs_level_greater2_flag[ lastGreater1ScanPos ]
            for( n = 15; n >= 0; n− − ) {
                xC = ( xS << 2 ) + ScanOrder[ 2 ][ scanIdx ][ n ][ 0 ]
                yC = ( yS << 2 ) + ScanOrder[ 2 ][ scanIdx ][ n ][ 1 ]
                if( sig_coeff_flag[ xC ][ yC ] &&
          ( !sign_data_hiding_enabled_flag | | !signHidden | | ( n !=
firstSigScanPos ) ) )
                    coeff_sign_flag[ n ]
            }
            numSigCoeff = 0
            sumAbsLevel = 0
            for( n = 15; n >= 0; n− − ) {
                xC = ( xS << 2 ) + ScanOrder[ 2 ][ scanIdx ][ n ][ 0 ]
                yC = ( yS << 2 ) + ScanOrder[ 2 ][ scanIdx ][ n ][ 1 ]
                if( sig_coeff_flag[ xC ][ yC ] ) {
                    baseLevel = 1 + coeff_abs_level_greater1_flag[ n ] +
                        coeff_abs_level_greater2_flag[ n ]
                    if( baseLevel = = ( ( numSigCoeff < 8 ) ?
                            ( (n = = lastGreater1ScanPos) ? 3 : 2 ) : 1 ) )
                        coeff_abs_level_remaining[ n ]
                    TransCoeffLevel[ x0 ][ y0 ][ cIdx ][ xC ][ yC ] =
             ( coeff_abs_level_remaining[ n ] + baseLevel ) * ( 1 − 2 *
coeff_sign_flag[ n ] )
                    if( sign_data_hiding_enabled_flag && signHidden ) {
                        sumAbsLevel += ( coeff_abs_level_remaining[ n ] +
baseLevel )
                        if( ( n = = firstSigScanPos ) && ( ( sumAbsLevel % 2 )
= = 1 ) )
                            TransCoeffLevel[ x0 ][ y0 ][ cIdx ][ xC ][ yC ] =
                            −TransCoeffLevel[ x0 ][ y0 ][ cIdx ][ xC ][ yC ]
                    }
                    numSigCoeff++
                }
            }
        }
    }
}
``` | ae(v)<br><br><br><br><br><br>ae(v)<br><br><br><br><br><br><br><br><br>ae(v) |

Figure 8A:
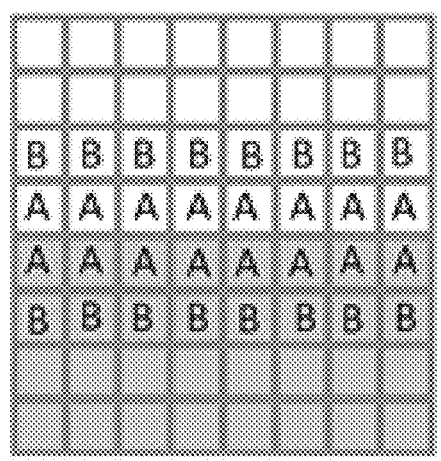
FIGS. 8A and 8B are conceptual diagrams illustrating portions of a block for OBMC.
Figure 8B:
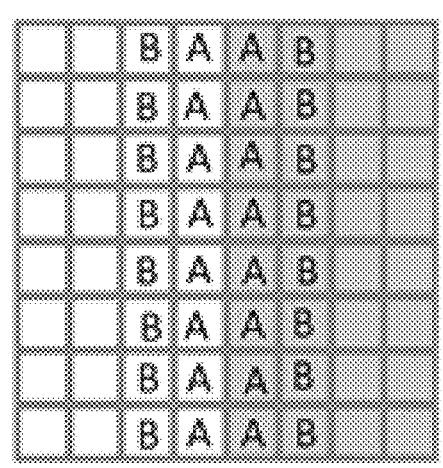

The following describes an example of overlapped block motion compensation (OBMC). OBMC was proposed in the development of ITU-T H.263. See Video Coding for Low Bitrate Communication, document Rec. H.263, ITU-T, April 1995. OBMC is performed on an 8×8 block, and motion vectors of two connected neighboring 8×8 blocks are used for the current block as shown in FIGS. 8A and 8B. For example, for the first 8×8 block in current macroblock, besides its own motion vector, the above and left neighboring motion vector are also applied to generate two additional prediction blocks. In this way, each pixel in the current 8×8 block has three prediction values and a weighted average of these three prediction values is used as the final prediction for the respective pixel.

Figure 7:
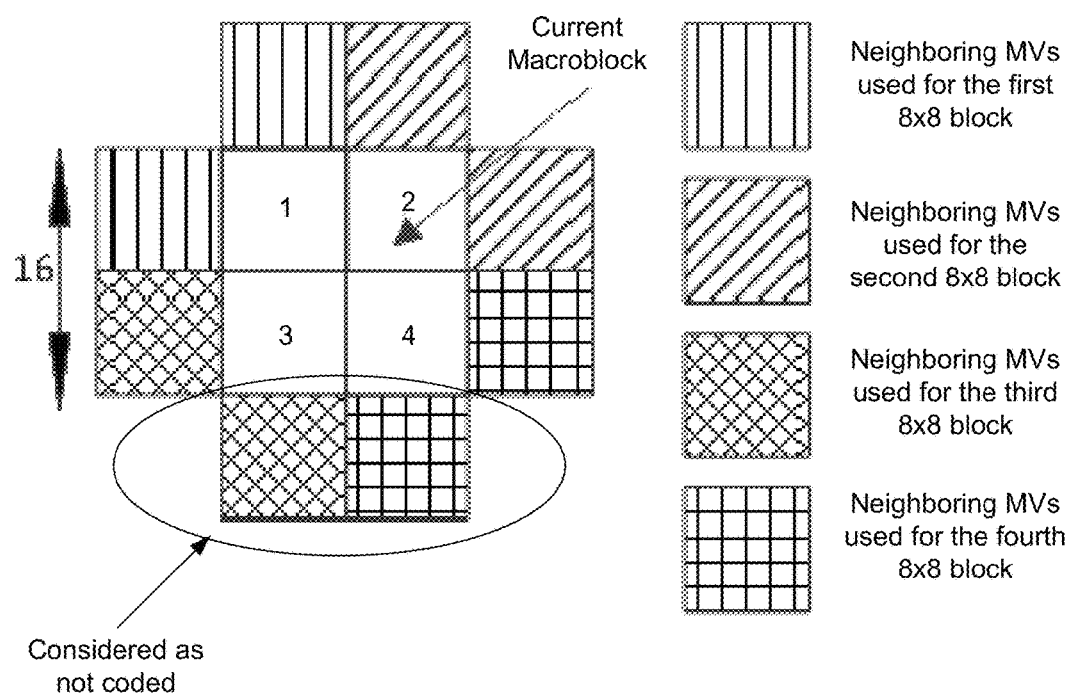
FIG. 7 is a conceptual diagram illustrating an example of overlapped block motion compensation (OBMC) in accordance with the video coding process defined in the ITU-T H.263 standard.

When a neighboring block is not coded or coded as intra, i.e., the neighboring block does not have an available motion vector, the motion vector of the current 8×8 block is used as the neighboring motion vector. Meanwhile, for the third and fourth 8×8 block of a current macroblock (as shown in FIG. 7), the below neighboring block may not be used (e.g., always not used or not always used). In other words, in some examples, for each MB, no motion information from MBs below it will be used to reconstruct the pixels of the current MB during the OBMC.

The following describes OBMC as proposed in HEVC. In HEVC, OBMC was also proposed to smooth the PU boundary in U.S. Provisional Application No. 61/561,783, filed Nov. 18, 2011, U.S. application Ser. No. 13/678,329, filed Nov. 15, 2012, U.S. Provisional Application No. 61/431, 480, filed Jan. 10, 2011, U.S. Provisional Application No. 61/450,532, filed Mar. 8, 2011, and U.S. application Ser. No. 13/311,834, filed Dec. 6, 2011. An example of the method proposed in HEVC is shown in FIGS. 8A and 8B, where the white region is the first prediction unit (PU) denoted by PU0, and the gray region is the second PU denoted by PU1). When a CU contains two (or more) PUs, lines/columns near the PU boundary are smoothed by OBMC. For pixels marked with "A" or "B" in PU0 or PU1, two prediction values are generated, i.e., by applying motion vectors of PU0 and PU1, respectively, and a weighted average of them is used as the final prediction.

Moreover, in U.S. Provisional Application No. 62/107, 964, filed Jan. 26, 2015, and U.S. Provisional Application No. 62/116,631, filed Feb. 16, 2015, a CU-level flag indicating whether OBMC is applied for a current CU, namely OBMC flag, has been proposed.

It is observed that, when OBMC is not applied to one coding unit (e.g., the signaled flag is 0), transforms other than DCT-II are not efficient. Therefore, the additional signaling for indication of usage of multiple transforms is redundant.

As described, video encoder 20 may signal (e.g., generate in the bitstream) a CU-level flag to indicate whether OBMC enabled or not for the current CU. In some examples, when this OBMC flag has been signaled as 1 (indicating OBMC is enabled for the current CU), only the default DCT-II is used for each TU, and therefore video encoder 20 may not signal anything for the transform selection, i.e., neither the CU-level flag nor the TU-level index is signaled.

The following describes examples of optimizing video encoder 20. For instance, the following examples may be for video encoder 20. However, it may be possible for video decoder 30 to perform similar techniques.

At the encoder (e.g., video encoder 20), when the proposed multiple transforms are applied for the current TU, for transform sizes larger than or equal to M×N, only the M'×N' low frequency coefficients are calculated and other coefficients are set as 0 wherein (M'<=M and N'<=N and M'*N'<M*N). In one example, the value of each of M and N is 32 and the value of each of M' and N' is 16. In this example, coefficients positioned at locations greater than M' and/or greater than N' may be considered as higher frequency coefficients. In general, the coefficients further to the right of the TU and further to the bottom of the TU may be considered as higher frequency coefficients.

At the encoder, for a certain coding mode, if the coding cost using the default transform, e.g., DCT-II, is larger than the current smallest coding cost multiplied by a given threshold value, then the proposed multiple transforms are skipped. The coding cost can be the rate-distortion cost, sum of absolute prediction residual, sum of squared prediction residual or sum of absolute transform difference. The threshold value may depend on the coding block size. In one example, the value of the threshold is 1.1.

At the encoder, for a certain Intra prediction direction mode, if the coding cost using the default transform, e.g., DCT-II, is larger than the coding cost of the best Intra prediction direction mode multiplied by a given threshold value, then the proposed multiple transforms are not applied and skipped for this Intra prediction mode. The coding cost can be the rate-distortion cost, sum of absolute prediction residual, sum of squared prediction residual or sum of absolute transform difference. The threshold values may depend on the coding block size. In one example, the value for the thresholds are 1.47, 1.28, 1.12 and 1.06 for 4×4, 8×8, 16×16 and 32×32 block sizes, respectively.

At the encoder, if the coding cost of N×N Intra PU partition using the default transform, e.g., DCT-II, is larger than the coding cost of the 2N×2N Intra PU partition multiplied by a given threshold value, then the proposed multiple transforms are not applied and skipped for N×N Intra PU partition. The coding cost can be the rate-distortion cost, sum of absolute prediction residual, sum of squared prediction residual or sum of absolute transform difference. The threshold values may depend on the coding block size. In one example, the value for the threshold is 1.2.

At the encoder, if the coding cost of 2N×2N Intra PU partition mode using the default transform, e.g., DCT-II, is larger than the coding cost of the best Inter coding modes multiplied by a given threshold value, then the proposed multiple transforms are not applied and skipped for Intra PU modes. The coding cost can be the rate-distortion cost, sum of absolute prediction residual, sum of squared prediction residual or sum of absolute transform difference. The threshold values may depend on the coding block size. In one example, the value for the threshold is 1.4.

At the encoder, if using one of the multiple transform candidates is generating all zero coefficients for the current block, then the remaining transform candidates are not applied and are skipped for the current block. Alternatively or additionally, if using the default transform (e.g., DCT-II) is generating all zero coefficients for the current block, then the multiple transform candidates are not applied and are skipped for the current block, and only the default transform (e.g., DCT-II) is used for coding the current block.

At the encoder, when the OBMC flag has been signaled and it is indicating OBMC off, then the one-bit flag, indicating whether only one default transform is applied, is still signaled as a default value (e.g., 0), which indicates the default transform (e.g., DCT-II) is applied, and the multiple transform candidates are not applied and are skipped for the current block.

Figure 9:
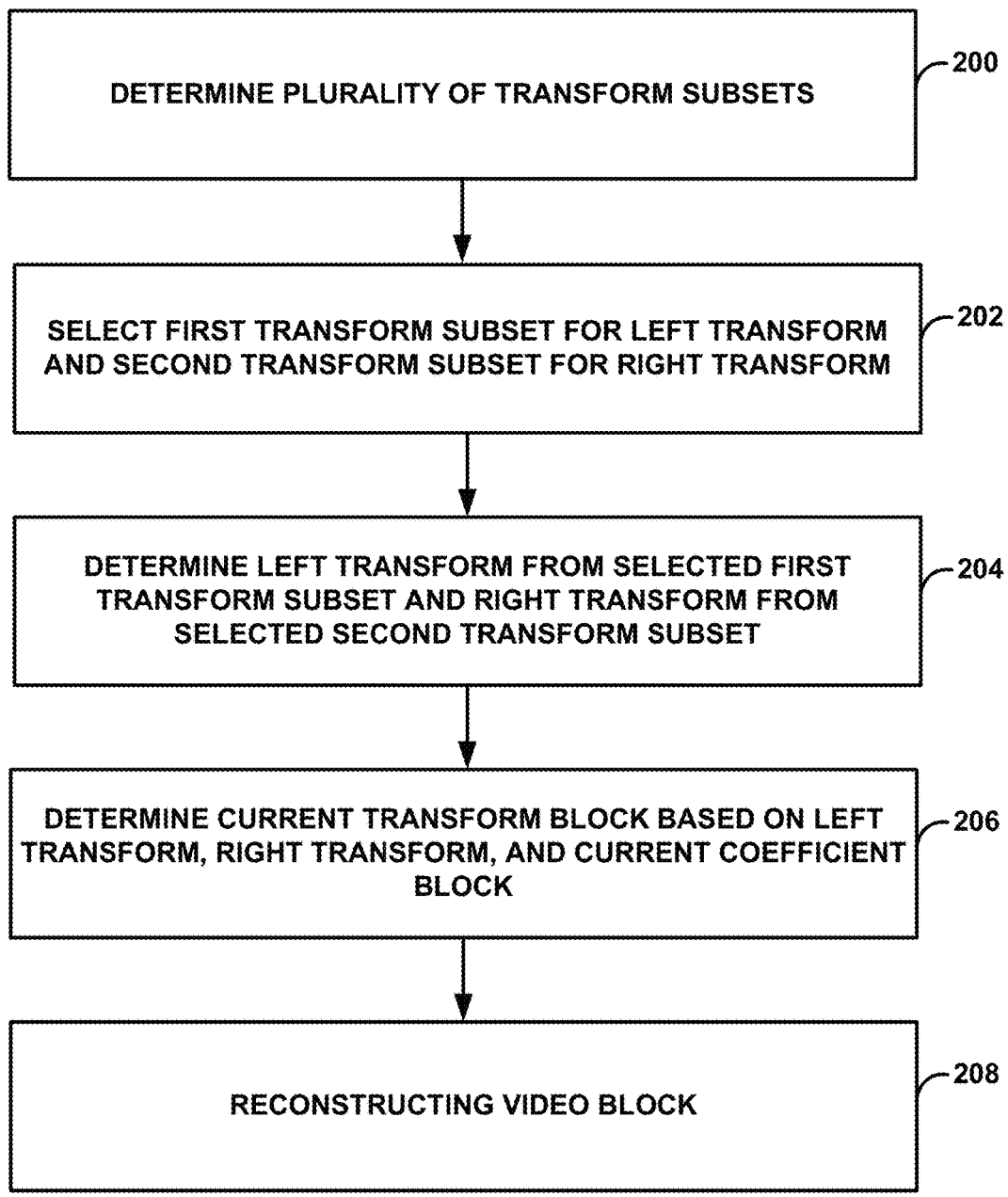
FIG. 9 is a flowchart illustrating an example method of decoding video data.

FIG. 9 is a flowchart illustrating an example method of decoding video data. Video decoder 30 may determine a plurality of transform subsets, each subset identifying one or more candidate transforms, where at least one transform subset identifies a plurality of candidate transforms (200). For example, prediction processing unit 152 may retrieve the plurality of transform subsets from the transform subsets stored in video data memory 151. The plurality of transform subsets may be pre-stored in video data memory 151 or information identifying how to construct the transform subsets may be received from video encoder 20. Video decoder 30 may select a first transform subset from the plurality of transform subsets for a left transform for a current coefficient block of the video data, and select a second transform subset from the plurality of transform subsets for a right transform for the current coefficient block of the video data (202). For example, prediction processing unit 152 may select the first and second transform subsets based on the intra-prediction mode information signaled in the video bitstream or based on a position of the video block being decoded as a few example ways to determine the transform subsets.

Video decoder 30 may determine the left transform from the selected first transform subset, and determine the right transform from the selected second transform subset (204). For example, prediction processing unit 152 may receive information in the bitstream such as indices into the selected transform subsets or may implicitly determine the transforms based on the number of nonzero coefficients. Video decoder 30 may determine a current transform block based on the left transform, right transform, and the current coefficient block (206). For example, inverse transform processing unit 156 may determine the current transform block by applying the left transform and right transform on the coefficient block outputted by inverse quantization unit 154. Video decoder 30 may reconstruct (e.g., intra-prediction or inter-prediction decode) a video block based on the current transform block and a predictive block (208). For example, reconstruction unit 158 may add the current transform block (which is a residual between of the video block and the predictive block) to the predictive block to reconstruct the video block.

Figure 10:
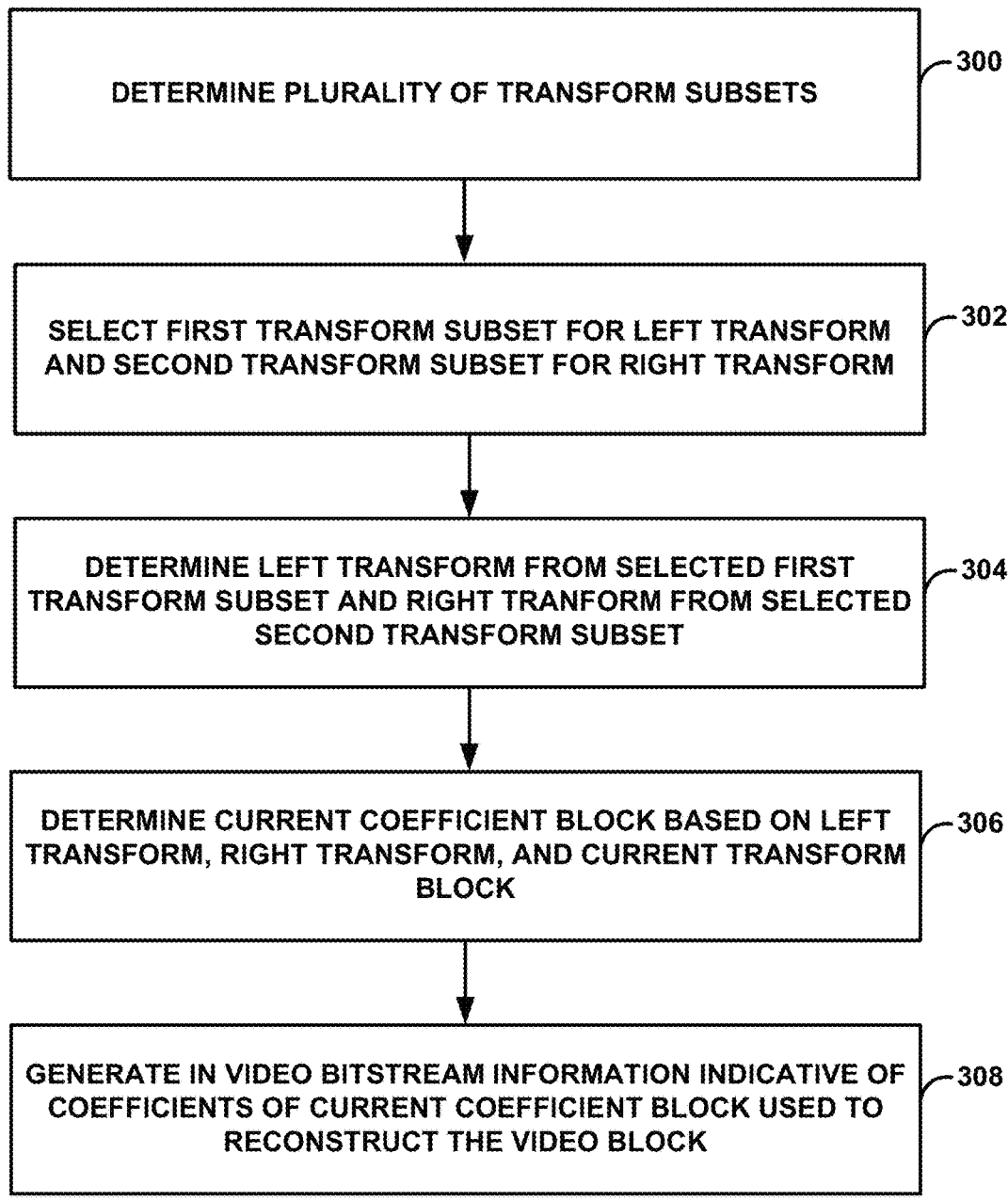
FIG. 10 is a flowchart illustrating an example method of encoding video data.

FIG. 10 is a flowchart illustrating an example method of encoding video data. Video encoder 20 may determine a plurality of transform subsets, each subset identifying one or more candidate transforms, where at least one transform subset identifies a plurality of candidate transforms (300). For example, prediction processing unit 100 may retrieve the plurality of transform subsets from the transform subsets stored in video data memory 101. The plurality of transform subsets may be pre-stored in video data memory 101. Video encoder 20 may select a first transform subset from the plurality of transform subsets for a left transform for a current transform block of a video block of the video data, and select a second transform subset from the plurality of transform subsets for a right transform for the transform block of the video block of the video data (302). For example, prediction processing unit 100 may select the first and second transform subsets based on the intra-prediction mode information that entropy encoding unit 118 generates in the video bitstream or based on a position of the video block being encoded as a few example ways to determine the transform subsets.

Video encoder 20 may determine the left transform from the selected first transform subset, and determine the right transform from the selected second transform subset (304). For example, prediction processing unit 100 may test the various determine transforms to identify the transform that provides good video coding quality. Video encoder 20 may determine a current coefficient block based on the left transform, right transform, and the current transform block (306). For example, transform processing unit 104 may determine the current coefficient block by applying the left transform and right transform on the transform block outputted by reconstruction unit 102. Video encoder 20 may generate a video bitstream with information (e.g., signal information) indicative of coefficients of the current coefficient block used for reconstruction of the video block (308). For example, entropy encoding unit 118 may output information that video decoder 30 uses to reconstruct the video block.

It should be understood that all of the techniques described herein may be used individually or in combination. This disclosure includes several signaling methods which may change depending on certain factors such as block size, slice type etc. Such variation in signaling or inferring the syntax elements may be known to the encoder and decoder a-priori or may be signaled explicitly in the video parameter set (VPS), sequence parameter set (SPS), picture parameter set (PPS), slice header, at a tile level or elsewhere.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a plurality of transform subsets for transforming a current coefficient block of a video block encoded according to one of a plurality of prediction modes, the prediction modes comprising a plurality of intra-prediction modes and a plurality of inter prediction modes, each subset identifying one or more candidate transforms, wherein at least one transform subset identifies a plurality of candidate transforms, wherein determining the plurality of transform subsets comprises determining either a first, same, one of the plurality of transform subsets for each of the intra-prediction modes, or a second, same, one of the plurality of transform subsets for each of the inter-prediction modes, wherein the plurality of transform subsets is the same for each of the intra-prediction modes, and wherein the plurality of transform subsets is the same for each of the inter-prediction modes;
   selecting a first transform subset from the determined plurality of transform subsets for a first transform for the current coefficient block of the video data;

selecting a second transform subset from the determined plurality of transform subsets for a second transform for the current coefficient block of the video data;

determining the first transform from the selected first transform subset;

determining the second transform from the selected second transform subset;

determining a current transform block based on applying, to coefficients in the current coefficient block, a basis function defined by the first transform and a basis function defined by the second transform; and reconstructing the video block based on an addition of values of the current transform block to corresponding values of a predictive block.

2. The method of claim 1, further comprising:

determining an intra-prediction mode of the video block based on a prediction mode of the video block being intra-prediction, wherein selecting the first transform subset comprises selecting the first transform subset based on the determined intra-prediction mode, wherein selecting the second transform subset comprises selecting the second transform subset based on the determined intra-prediction mode, and wherein reconstructing the video block comprises reconstructing the video block based on the determined intra-prediction mode.

3. The method of claim 1, further comprising:

determining a location of the current transform block in the video block based on a prediction mode of the video block being inter-prediction, wherein selecting the first transform subset comprises selecting the first transform subset based on the determined location of the current transform block, and wherein selecting the second transform subset comprises selecting the second transform subset based on the determined location of the current transform block.

4. The method of claim 1, further comprising:

receiving a first transform subset index into the first transform subset; and receiving a second transform subset index into the second transform subset, wherein determining the first transform comprises determining the first transform based on a transform in the first transform subset identified by the first transform subset index, and wherein determining the second transform comprises determining the second transform based on a transform in the second transform subset identified by the second transform subset index.

5. The method of claim 1, further comprising:

determining that a number of nonzero coefficients in the current coefficient block is less than a threshold, wherein determining the first transform comprises determining that a particular transform identified in the first transform subset is the first transform without receiving a transform subset index into the first transform subset, in response to determining that the number of nonzero coefficients in the current coefficient block is less than the threshold, and wherein determining the second transform comprises determining that a particular transform identified in the second transform subset is the second transform without receiving a transform subset index into the second transform subset, in response to determining that the number of nonzero coefficients in the current coefficient block is less than the threshold.

6. The method of claim 1, further comprising:

receiving a flag indicating that not all transform blocks of the video block that includes the current transform block are transformed using the same transform, wherein selecting the first transform subset for the first transform for the current coefficient block of the video data, selecting the second transform subset for the second transform for the current coefficient block of the video data, determining the first transform from the selected first transform subset, and determining the second transform from the selected second transform subset comprise selecting the first transform subset for the first transform for the current coefficient block of the video data, selecting the second transform subset for the second transform for the current coefficient block of the video data, determining the first transform from the selected first transform subset, and determining the second transform from the selected second transform subset, in response to receiving the flag indicating that not all transform blocks of the video block that includes the current transform block are transformed using the same transform.

7. The method of claim 6, wherein the video block comprises one of:

a coding tree unit (CTU), a coding unit (CU), or a prediction unit (PU).

8. The method of claim 1, wherein at least one of the first transform subset or the second transform subset includes a transform that is different than a discrete cosine transform (DCT)-II transform and a discrete sine transform (DST)-VII transform.

9. The method of claim 1, wherein the first transform subset and the second transform subset include different transform types.

10. The method of claim 1, wherein the plurality of transform subsets comprises three or more transform subsets.

11. The method of claim 1, wherein the candidate transforms are different transform types.

12. The method of claim 1, wherein determining the plurality of transform subsets comprises determining the plurality of transform subsets based on a size of the video block.

13. The method of claim 1, further comprising:

receiving from a bitstream information indicating a prediction mode;

receiving from the bitstream information indicating coefficients of the current coefficient block;

constructing the current coefficient block based on the received information indicating the coefficients; and determining the predictive block based on the prediction mode.

14. The method of claim 13, wherein the prediction mode comprises an inter-prediction mode.

15. The method of claim 1, wherein the current transform block is a residual of the video block and the predictive block.

16. A method of encoding video data, the method comprising:

determining a plurality of transform subsets for transforming a current transform block of a video block encoded according to one of a plurality of prediction mode, the prediction modes comprising a plurality of intra-prediction modes and a plurality of inter-prediction modes, each subset identifying one or more candidate transforms, wherein at least one transform subset identifies a plurality of candidate transforms, wherein determining the plurality of transform subsets comprises determining either a first, same, one of the plurality transform subsets for each of the intra-prediction modes, or a second, same, one of the plurality of transform subsets for each of the inter-prediction modes, wherein the plurality of transform subsets is the same for each of the intra-prediction modes, and wherein the plurality of transform subsets is the same for each of the inter-prediction modes;
selecting a first transform subset from the determined plurality of transform subsets for a first transform for the current transform block of the video block of the video data;
selecting a second transform subset from the determined plurality of transform subsets for a second transform for the current transform block of the video block of the video data;
determining the first transform from the selected first transform subset;
determining the second transform from the selected second transform subset;
determining a current coefficient block based on applying, to the current transform block, a basis function defined by the first transform and a basis function defined by the second transform; and
generating a video bitstream that includes information indicative of coefficients of the current coefficient block used for reconstruction of the video block.

17. The method of claim 16, further comprising:
determining an intra-prediction mode of the video block,
wherein selecting the first transform subset comprises selecting the first transform subset based on the determined intra-prediction mode, and
wherein selecting the second transform subset comprises selecting the second transform subset based on the determined intra-prediction mode.

18. The method of claim 16, further comprising:
determining a location of the current transform block in the video block based on the video block being inter-prediction encoded,
wherein selecting the first transform subset comprises selecting the first transform subset based on the determined location of the current transform block, and
wherein selecting the second transform subset comprises selecting the second transform subset based on the determined location of the current transform block.

19. The method of claim 16, further comprising:
generating in the video bitstream a first transform subset index into the first transform subset to identify a transform in the first transform subset used to determine the current coefficient block; and
generating in the video bitstream a second transform subset index into the second transform subset to identify a transform in the second transform subset used to determine the current coefficient block.

20. The method of claim 19, further comprising:
determining a number of nonzero coefficients in the current coefficient block,
wherein signaling the first transform subset index comprises signaling the first transform subset index based on the number of nonzero coefficients being greater than a threshold, and
wherein signaling the second transform subset index comprises signaling the second transform subset index based on the number of nonzero coefficients being greater than the threshold.

21. The method of claim 16, wherein at least one of the first transform subset or the second transform subset includes a transform that is different than a discrete cosine transform (DCT)-II transform and a discrete sine transform (DST)-VII transform.

22. The method of claim 16, wherein the first transform subset and the second transform subset include different transform types.

23. The method of claim 16, wherein the plurality of transform subsets comprises three or more transform subsets.

24. The method of claim 16, wherein the candidate transforms are different transform types.

25. The method of claim 16, wherein determining the plurality of transform subsets comprises determining the plurality of transform subsets based on a size of the video block.

26. The method of claim 16, further comprising:
determining the predictive block; and
generating in the video bitstream information indicative of a prediction mode of the video block based on the predictive block.

27. The method of claim 26, wherein the predictive block is a block in the same picture as the video block based on the video block being intra-predicted or in a picture different than the picture that includes the video block based on the video block being inter-predicted.

28. The method of claim 16, further comprising:
determining the current transform block as a residual between the video block and the predictive block.

29. A device for video decoding video data, the device comprising:
a video data memory configured to store the video data and transform subsets, each subset identifying one or more candidate transforms, wherein at least one transform subset identifies a plurality of candidate transforms; and
a video decoder comprising integrated circuitry, the video decoder configured to:
determine a plurality of transform subsets from the stored transform subsets for transforming a current coefficient block of a video block encoded according to one of a plurality of prediction modes, the prediction modes comprising a plurality of intra-prediction modes and a plurality of inter-prediction modes, wherein to determine the plurality of transform subsets, the video decoder is configured to determine either a first, same, one of the plurality of transform subsets for each of the intra-prediction modes or a second, same, one of the plurality of transform subsets for each of the inter-prediction modes, wherein the plurality of transform subsets is the same for each of the intra-prediction modes, and wherein the plurality of transform subsets is the same for each of the inter-prediction modes;
select a first transform subset from the determined plurality of transform subsets for a first transform for the current coefficient block of the video data;
select a second transform subset from the determined plurality of transform subsets for a second transform for the current coefficient block of the video data;
determine the first transform from the selected first transform subset;
determine the second transform from the selected second transform subset;
determine a current transform block based on applying, to the coefficients in the current coefficient block, a basis function defined by the first transform and a basis function defined by the second transform; and reconstruct the video block based on an addition of values of the current transform block to corresponding values of a predictive block.

30. The device of claim 29, wherein the video decoder is configured to determine an intra-prediction mode of the video block based on a prediction mode of the video block being intra-prediction, wherein to select the first transform subset, the video decoder is configured to select the first transform subset based on the determined intra-prediction mode, wherein to select the second transform subset, the video decoder is configured to select the second transform subset based on the determined intra-prediction mode, and wherein to reconstruct the video block, the video decoder is configured to reconstruct the video block based on the determined intra-prediction mode.

31. The device of claim 29, wherein the video decoder is configured to determine a location of the current transform block in the video block based on a prediction mode of the video block being inter-prediction, wherein to select the first transform subset, the video decoder is configured to select the first transform subset based on the determined location of the current transform block, and wherein to select the second transform subset, the video decoder is configured to select the second transform subset based on the determined location of the current transform block.

32. The device of claim 29, wherein the video decoder is configured to:

receive a first transform subset index into the first transform subset; and receive a second transform subset index into the second transform subset, wherein to determine the first transform, the video decoder is configured to determine the first transform based on a transform in the first transform subset identified by the first transform subset index, and wherein to determine the second transform, the video decoder is configured to determine the second transform based on a transform in the second transform subset identified by the second transform subset index.

33. The device of claim 29, wherein the video decoder is configured to:

determine that a number of nonzero coefficients in the current coefficient block is less than a threshold, wherein to determine the first transform, the video decoder is configured to determine that a particular transform identified in the first transform subset is the first transform without receiving a transform subset index into the first transform subset, in response to determining that the number of nonzero coefficients in the current coefficient block is less than the threshold, and wherein to determine the second transform, the video decoder is configured to determine that a particular transform identified in the second transform subset is the second transform without receiving a transform subset index into the second transform subset, in response to determining that the number of nonzero coefficients in the current coefficient block is less than the threshold.

34. The device of claim 29, wherein the video decoder is configured to:

receive a flag indicating that not all transform blocks of the video block that includes the current transform block are transformed using the same transform, wherein to select the first transform subset for the first transform for the current coefficient block of the video data, select the second transform subset for the second transform for the current coefficient block of the video data, determine the first transform from the selected first transform subset, and determine the second transform from the selected second transform subset, the video decoder is configured to select the first transform subset for the first transform for the current coefficient block of the video data, select the second transform subset for the second transform for the current coefficient block of the video data, determine the first transform from the selected first transform subset, and determine the second transform from the selected second transform subset, in response to receiving the flag indicating that not all transform blocks of the video block that includes the current transform block are transformed using the same transform.

35. The device of claim 34, wherein the video block comprises one of:

a coding tree unit (CTU), a coding unit (CU), or a prediction unit (PU).

36. The device of claim 29, wherein at least one of the first transform subset or the second transform subset includes a transform that is different than a discrete cosine transform (DCT)-II transform and a discrete sine transform (DST)-VII transform.

37. The device of claim 29, wherein the first transform subset and the second transform subset include different transform types.

38. The device of claim 29, wherein the plurality of transform subsets comprises three or more transform subsets.

39. The device of claim 29, wherein the candidate transforms are different transform types.

40. The device of claim 29, wherein to determine the plurality of transform subsets, the video decoder is configured to determine the plurality of transform subsets based on a size of the video block.

41. The device of claim 29, wherein the video decoder is configured to:

receive from a bitstream information indicating a prediction mode;

receive from the bitstream information indicating coefficients of the current coefficient block;

construct the current coefficient block based on the received information indicating the coefficients; and determine the predictive block based on the prediction mode.

42. The device of claim 41, wherein the prediction mode comprises an intra-prediction mode.

43. The device of claim 29, wherein the current transform block is a residual of the video block and the predictive block.

44. A device for encoding video data, the device comprising:

a video data memory configured to store the video data and transform subsets, each subset identifying one or more candidate transforms, wherein at least one transform subset identifies a plurality of candidate transforms; and a video encoder configured to:

determine a plurality of transform subsets from the stored transform subsets for transforming a current transform block of a video block encoded according to one of a plurality of prediction mode, the prediction modes comprising a plurality of intra-prediction modes and a plurality of inter-prediction modes, wherein to determine the plurality of transform subsets the video encoder is configured to determine either a first, same, one of the plurality transform subsets for each of the intra-prediction modes, or a second, same, one of the plurality of transform subsets for each of the inter-prediction modes, wherein the plurality of transform subsets is the same for each of the intra-prediction modes, and wherein the plurality of transform subsets is the same for each of the inter-prediction modes;

select a first transform subset from the determined plurality of transform subsets for a first transform for the current transform block of the video block of the video data;

select a second transform subset from the determined plurality of transform subsets for a second transform for the current transform block of the video block of the video data;

determine the first transform from the selected first transform subset;

determine the second transform from the selected second transform subset;

determine a current coefficient block based on applying, to the current transform block, a basis function defined by the first transform and a basis function defined by the second transform; and generate a video bitstream that includes information indicative of coefficients of the current coefficient block used for reconstruction of the video block.

45. The device of claim 44,
wherein the video encoder is configured to determine an intra-prediction mode of the video block,
wherein to select the first transform subset, the video encoder is configured to select the first transform subset based on the determined intra-prediction mode, and
wherein to select the second transform subset, the video encoder is configured to select the second transform subset based on the determined intra-prediction mode.

46. The device of claim 44,
wherein the video encoder is configured to determine a location of the current transform block in the video block based on the video block being inter-prediction encoded,
wherein to select the first transform subset, the video encoder is configured to select the first transform subset based on the determined location of the current transform block, and
wherein to select the second transform subset, the video encoder is configured to select the second transform subset based on the determined location of the current transform block.

47. The device of claim 44, wherein the video encoder is configured to:
generate in the video bitstream a first transform subset index into the first transform subset to identify a transform in the first transform subset used to determine the current coefficient block; and
generate in the video bitstream a second transform subset index into the second transform subset to identify a transform in the second transform subset used to determine the current coefficient block.

48. The device of claim 47,
wherein the video encoder is configured to determine a number of nonzero coefficients in the current coefficient block,
wherein to generate in the video bitstream the first transform subset index, the video encoder is configured to generate in the video bitstream the first transform subset index based on the number of nonzero coefficients being greater than a threshold, and
wherein to generate the second transform subset index, the video encoder is configured to generate in the video bitstream the second transform subset index based on the number of nonzero coefficients being greater than the threshold.

49. The device of claim 44, wherein at least one of the first transform subset or the second transform subset includes a transform that is different than a discrete cosine transform (DCT)-II transform and a discrete sine transform (DST)-VII transform.

50. The device of claim 44, wherein the first transform subset and the second transform subset include different transform types.

51. The device of claim 44, wherein the plurality of transform subsets comprises three or more transform subsets.

52. The device of claim 44, wherein the candidate transforms are different transform types.

53. The device of claim 44, wherein to determine the plurality of transform subsets, the video encoder is configured to determine the plurality of transform subsets based on a size of the video block.

54. The device of claim 44, wherein the video encoder is configured to:
determine the predictive block; and
generate in the video bitstream information indicative of a prediction mode of the video block based on the predictive block.

55. The device of claim 44, wherein the predictive block is a block in the same picture as the video block based on the video block being intra-predicted or in a picture different than the picture that includes the video block based on the video block being inter-predicted.

56. The device of claim 44, wherein the video encoder is configured to:
determine the current transform block as a residual between the video block and the predictive block.

57. A device for decoding video data, the device comprising:
means for determining a plurality of transform subsets for transforming a current coefficient block of a video block encoded according to one of a plurality of prediction modes, the prediction modes comprising a plurality of intra-prediction modes and a plurality of inter prediction modes, each subset identifying one or more candidate transforms, wherein at least one transform subset identifies a plurality of candidate transforms, wherein the means for determining the plurality of transform subsets comprises means for determining either a first, same, one of the plurality of transform subsets for each of the intra-prediction modes, or a second, same, one of the plurality of transform subsets for each of the inter-prediction modes, wherein the plurality of transform subsets is the same for each of the intra-prediction modes, and wherein the plurality of transform subsets is the same for each of the inter-prediction modes;

means for selecting a first transform subset from the determined plurality of transform subsets for a first transform for the current coefficient block of the video data;

means for selecting a second transform subset from the determined plurality of transform subsets for a second transform for the current coefficient block of the video data;

means for determining the first transform from the selected first transform subset;

means for determining the second transform from the selected second transform subset;

means for determining a current transform block based on applying, to coefficients in the current coefficient block, a basis function defined by the first transform and a basis function defined by the second transform; and means for reconstructing the video block based on an addition of values of the current transform block to corresponding values of a predictive block.

58. A non-transitory computer-readable storage medium storing instructions that when executed cause a video decoder of a device for video decoding to:

determine a plurality of transform subsets for transforming a current coefficient block of a video block encoded according to one of a plurality of prediction modes, the prediction modes comprising a plurality of intra-prediction modes and a plurality of inter prediction modes, each subset identifying one or more candidate transforms, wherein at least one transform subset identifies a plurality of candidate transforms, wherein the instructions that cause the video decoder to determine the plurality of transform subsets comprise instructions that cause the video decoder to determine either a first, same, one of the plurality of transform subsets for each of the intra-prediction modes, or a second, same, one of the plurality of transform subsets for each of the inter-prediction modes, wherein the plurality of transform subsets is the same for each of the intra-prediction modes, and wherein the plurality of transform subsets is the same for each of the inter-prediction modes;

select a first transform subset from the determined plurality of transform subsets for a first transform for the current coefficient block of the video data;

select a second transform subset from the determined plurality of transform subsets for a second transform for the current coefficient block of the video data;

determine the first transform from the selected first transform subset;

determine the second transform from the selected second transform subset;

determine a current transform block based on applying, to coefficients in the current coefficient block, a basis function defined by the first transform and a basis function defined by the second transform; and reconstruct the video block based on an addition of values of the current transform block to corresponding values of a predictive block.

59. A device for encoding video data, the device comprising:

means for determining a plurality of transform subsets for transforming a current transform block of a video block encoded according to one of a plurality of prediction mode, the prediction modes comprising a plurality of intra-prediction modes and a plurality of inter-prediction modes, each subset identifying one or more candidate transforms, wherein at least one transform subset identifies a plurality of candidate transforms, wherein the means for determining the plurality of transform subsets comprises means for determining either a first, same, one of the plurality transform subsets for each of the intra-prediction modes, or a second, same, one of the plurality of transform subsets for each of the inter-prediction modes, wherein the plurality of transform subsets is the same for each of the intra-prediction modes, and wherein the plurality of transform subsets is the same for each of the inter-prediction modes;

means for selecting a first transform subset from the determined plurality of transform subsets for a first transform for the current transform block of the video block of the video data;

means for selecting a second transform subset from the determined plurality of transform subsets for a second transform for the current transform block of the video block of the video data;

means for determining the first transform from the selected first transform subset;

means for determining the second transform from the selected second transform subset;

means for determining a current coefficient block based on applying, to the current transform block, a basis function defined by the first transform and a basis function defined by the second transform; and means for generating a video bitstream that includes information indicative of coefficients of the current coefficient block used for reconstruction of the video block.

60. A non-transitory computer-readable storage medium storing instructions that when executed cause a video encoder of a device for video encoding to:

determine a plurality of transform subsets for transforming a current transform block of a video block encoded according to one of a plurality of prediction mode, the prediction modes comprising a plurality of intra-prediction modes and a plurality of inter-prediction modes, each subset identifying one or more candidate transforms, wherein at least one transform subset identifies a plurality of candidate transforms, wherein the instructions that cause the video encoder to determine the plurality of transform subsets comprise instructions that cause the video encoder to determine either a first, same, one of the plurality transform subsets for each of the intra-prediction modes, or a second, same, one of the plurality of transform subsets for each of the inter-prediction modes, wherein the plurality of transform subsets is the same for each of the intra-prediction modes, and wherein the plurality of transform subsets is the same for each of the inter-prediction modes;

select a first transform subset from the determined plurality of transform subsets for a first transform for the current transform block of the video block of the video data;

select a second transform subset from the determined plurality of transform subsets for a second transform for the current transform block of the video block of the video data;

determine the first transform from the selected first transform subset;

determine the second transform from the selected second transform subset;

determine a current coefficient block based on applying, to the current transform block, a basis function defined by the first transform and a basis function defined by the second transform; and generate a video bitstream that includes information indicative of coefficients of the current coefficient block used for reconstruction of the video block.

* * * * *